(12) United States Patent
Imanaka et al.

(10) Patent No.: US 6,502,065 B2
(45) Date of Patent: Dec. 31, 2002

(54) TELETEXT BROADCAST RECEIVING APPARATUS USING KEYWORD EXTRACTION AND WEIGHTING

(75) Inventors: Takeshi Imanaka, Nara (JP); Mitsuteru Kataoka, Katano (JP); Satoshi Matsuura, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/754,470

(22) Filed: Jan. 3, 2001

(65) Prior Publication Data

US 2002/0072895 A1 Jun. 13, 2002

Related U.S. Application Data

(62) Division of application No. 09/211,385, filed on Dec. 14, 1998, now Pat. No. 6,240,378, which is a division of application No. 08/560,394, filed on Nov. 17, 1995, now Pat. No. 6,064,952.

(30) Foreign Application Priority Data

| Nov. 18, 1994 | (JP) | ............................................ 6-285718 |
| Mar. 24, 1995 | (JP) | ............................................. 7-66340 |
| Sep. 29, 1995 | (JP) | ............................................ 7-253981 |

(51) Int. Cl.$^7$ .......................... G06F 17/27; G06F 17/21; H04N 5/445
(52) U.S. Cl. ................. 704/9; 704/1; 348/468
(58) Field of Search ....................... 704/1, 9, 10; 707/1, 707/3–7, 501, 530–534, 513; 348/468

(56) References Cited

U.S. PATENT DOCUMENTS

| 4,270,182 A | * | 5/1981 | Asija ............................. 704/8 |
| 4,959,785 A | | 9/1990 | Yamamoto et al. ......... 707/533 |
| 5,077,668 A | * | 12/1991 | Doi ............................. 707/531 |
| 5,251,131 A | * | 10/1993 | Masand et al. ................. 704/9 |
| 5,258,909 A | | 11/1993 | Damerau et al. ........... 707/533 |
| 5,297,027 A | * | 3/1994 | Morimoto et al. .......... 707/501 |
| 5,297,039 A | | 3/1994 | Kanaegami et al. ........... 707/5 |
| 5,355,170 A | * | 10/1994 | Eitz et al. ................... 348/467 |
| 5,371,673 A | * | 12/1994 | Fan ................................. 704/1 |
| 5,384,703 A | * | 1/1995 | Withgott et al. ............ 707/531 |
| 5,410,359 A | * | 4/1995 | Odijk et al. ................. 348/468 |
| 5,689,716 A | * | 11/1997 | Chen .......................... 707/500 |
| 5,715,469 A | | 2/1998 | Arning ....................... 707/533 |
| 5,778,397 A | * | 7/1998 | Kupiec et al. .............. 707/500 |
| 5,799,268 A | | 8/1998 | Boguraev ...................... 704/9 |
| 5,835,087 A | | 11/1998 | Herz et al. .................. 345/810 |
| 5,873,056 A | | 2/1999 | Liddy et al. ................... 704/9 |
| 5,880,789 A | * | 3/1999 | Inaba ......................... 348/468 |
| 5,931,907 A | | 8/1999 | Davies et al. ............... 709/218 |
| 6,064,952 A | * | 5/2000 | Imanaka et al. ............... 704/9 |

* cited by examiner

Primary Examiner—Patrick N. Edouard
(74) Attorney, Agent, or Firm—RatnerPrestia

(57) ABSTRACT

An information abstracting method and apparatus for extracting and displaying keywords as an information abstract. Given a large number of character string data sets divided into prescribed units, the extracted keywords are significant and effective in describing a topic common to the plurality of units. The information abstracting apparatus comprises an input section for accepting an input of character string data divided into prescribed units, with each individual character represented by a character code, and an output section for displaying the result of information abstracting. Keywords contained in each of the prescribed units are extracted by a keyword extracting section from the character string input data from the input section. A score is calculated for each keyword by a score calculating section, so that a higher score is given to a keyword extracted from a larger number of units. On the basis of the calculated scores, keywords are selected by an abstracting section and are outputted as an information abstract by the output section.

14 Claims, 38 Drawing Sheets

Fig. 4

UNIT 1
☆米朝局長官協議
合意
北朝鮮の核問題
をめぐる米朝高
官会議は、本国
の承認を条件に

UNIT 2
☆ロープウェイ
停止、全員救助
三重県の御斎所
ロープウェーが
強風で止まり、
ゴンドラ3台の

UNIT 3
▶政府は18日
の閣僚懇で特殊
法人の見直しに
向けて各省庁が
来年検討を始め

· · ·

UNIT n
米朝協議合意、
21日調印米朝
高官協議の米朝
一チ米首席代表
は18日、北朝

Fig. 5

UNIT 1

☆泉佐野でヘリ墜落
　大阪府警によると、泉佐野市で朝日新聞社取材用のヘリコプターが墜落、3人が死亡した。

☆新聞大会開く
　第47回新聞大会が、京都市で開幕、新聞販売の正常化を図る特別宣言が採択された。

☆電動茶せんを開発
　熟練と細かい手の動きが必要な抹茶たてを手軽にできるようにし、抹茶をもっと広めようと、京都府茶協同組合が電動茶せんを開発した。

☆米朝高官協議合意へ
　北朝鮮の核問題をめぐる米朝高官会議は、本国の承認を条件に合意に達し、承認されれば21日、ジュネーブで調印式が行われることになった。

UNIT 2

税制改革審議入り／授与を断念
◆衆院は税制改革関連4法案が審議入り。村山首相は「当面考えられる最前の改革」で、公約違反を否定。
◆与謝野文相は、大江健三郎氏への文化勲章授与を断念。「戦後民主主義は自体も自由」。再考は促さず。

特殊法人見直し／叙勲廃止論
◆特殊法人見直しの最終報告は、来年2月10日までに。政府はこの報告を受け、今年度中に見直し案策定。
◆井手厚相が記者会見で叙勲廃止論。「勲一等とか、国が人の一生を番号付けするのはいかがなるものか」。

核問題で合意／平和条約に仮調印
◆米朝高官協議で「核」包括解決に合意。使用済み燃料棒は最終的に移転し廃棄。特別査定は先送り。
◆イスラエルとヨルダンが、両国関係を正常化する平和条約に仮調印。アラブ諸国の中で、79年のエジプトに次ぎ2カ国目。

UNIT 3

▼朝鮮民主主義人民共和国の核疑惑を巡る米朝高官協議でガルーチ米代表は17日夜"原則合意に達し21日に双方がジュネーブで調印予定"と述べた。
▼北朝鮮が将来のIAEA査察受け入れを条件に米が軽水炉支援を先行実施するなどが内容とみられる。

▼18日午前大阪・泉佐野市で朝日新聞社のヘリが墜落し3人が死亡した事故は毎日新聞社のヘリと接触した直後に墜落したことが分かった。
▼18日の参院予算委で村山首相は政府の電力供給計画に沿い原発の新増設を認める考えを示した。

▼富士写真フィルム専務殺害事件で指名手配されていた山口組系の暴力団員が18日午後警察に出頭して犯行を認め殺人容疑で逮捕された。
▼逮捕されたのは岡本大介容疑者(25)で「沖野容疑者に頼まれてやった。後で5万円もらった」と供述。

UNIT 4

米朝協議合意、21日調印
　米朝高官協議のガルーチ米首席代表は18日、北朝鮮の核問題で合意、21日に調印すると発表。
　全面的核査察の受け入れと核拡防条約への完全復帰、軽水炉支援など包括的合意に達した模様。

日韓外相、合意内容を評価
　韓国外相は、米朝合意に核開発凍結の手順と南北対話の必要性を盛り込んでいることを評価、南北対話の年内再開に期待を表明。
　河野外相も「指示できる内容」と対話による解決を歓迎。

イラク議長も指示声明
　イラク国会議長は17日、政府が表明したクウェートの主権、国境線承認の方針を支持する声明。
　しかし、正式な承認決定発表までは対イラク経済制裁解除を国際社会が受け入れる見込みはない。

Fig. 15
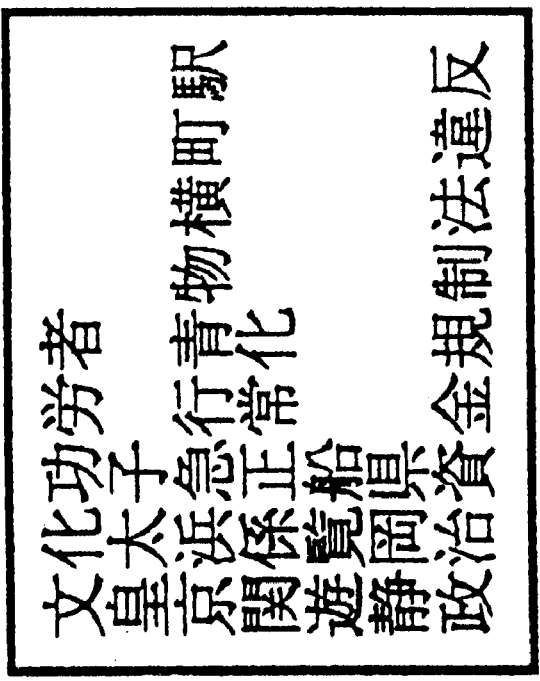
(b)
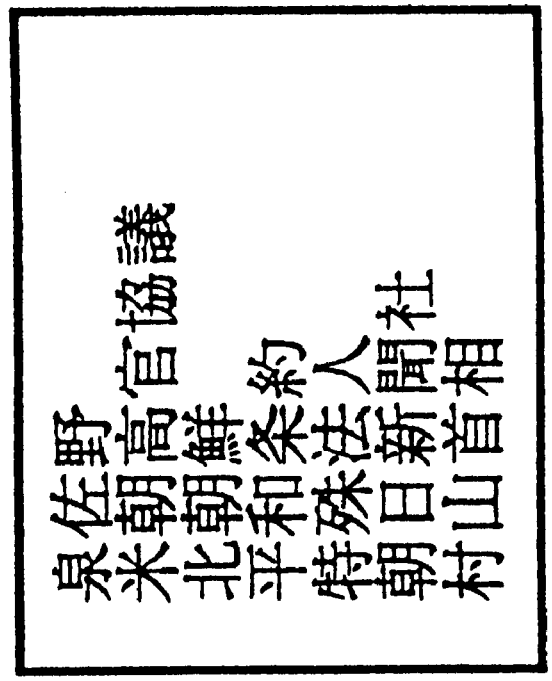
(a)

Fig. 37

UNIT 1

☆1984 U.S. Olympic champion Joan Benoit Samuelson featured in NYC Marathon.

☆Rosa Mota of Portugal wins Olympic marathon.

UNIT 3

◆A look at the homeless problem in South Korea, made worse by preparations for the Olympic Games.

◆Portugal's Rosa Mota wins the women's Olympic marathon; other track and field results included.

UNIT 2

▼U.S. runner Carlos Talbott wins gold medal in marathon as Intl. Paralympic Games end.

▼Gelindo Bordin of Italy wins Olympic marathon.

UNIT 4

Italy's Gelindo Bordin overtakes Ahmed Salah of Djibouti during final mile, wins Olympic marathon.

Portugal's Rosa Mota wins marathon

TELETEXT BROADCAST RECEIVING APPARATUS USING KEYWORD EXTRACTION AND WEIGHTING

This application is a division of U.S. patent application Ser. No. 09/211,385, filed Dec. 14, 1998, now U.S. Pat. No. 6,240,378, which is a division of U.S. patent application Ser. No. 08/560,394, filed Nov. 17, 1995, now U.S. Pat. No. 6,064,952.

BACKGROUND OF THE INVENTION

1. Field of the Invention

The present invention relates to an information abstracting method, an information abstracting apparatus, and a weighting method, which can be used when extracting prescribed keywords from a plurality of character string data sets divided into prescribed units, such as data provided by teletext services, and also relates to a teletext broadcast receiving apparatus.

2. Description of the Related Art

In recent years, with the advent of the multimedia age, a large variety of information has come to be provided not only in the form of packaged media such as CD-ROMs but also through communications networks, commercial broadcasts, and the like. Such information includes textual information, provided by electronic books, teletext broadcasts, etc., in addition to video and voice information. Textual information is made up of character codes, such as the ASCII code and the JIS code, that can be readily processed by computer. However, for human beings, textual information poses problems in that the amount of information that can be displayed at a time is small, and in that it takes a long time to grasp the main points in it as compared to image information. These problems will become an important concern when we consider increasing amounts of information as the information society advances. Possible approaches to these problems may be by developing techniques for automatically interpreting the content of a document and rendering it into an easy-to-understand form. One such approach is the study of natural language processing in the research field of artificial intelligence. For practical implementation, however, there are many problems yet to be overcome, such as the need for large dictionary and grammatical information and the difficulty in reducing the probability of erroneously interpreting the content of text to a practical level, and so far there are few practical applications.

On the other hand, in recent years, receivers designed to receive teletext broadcasts that are transmitted as character codes over the air have been developed and made commercially available, and textual information provided for homes has been rapidly increasing in volume. In teletext broadcasting, large numbers of programs are provided, and since the information provided is in the form of text, the user can obtain information by reading text displayed on a television screen. This in turn presents a problem in that to grasp the whole content of information the user has to read a large number of characters, turn over the pages in sequence, and so on. In fact, in the case of news or the like, the user usually has no previous knowledge of what will be provided as information, and therefore, is not aware of what information is of interest to him. It is therefore difficult for the user to extract only information that he needs; as a result, the user has to select by himself the necessary information after looking through the whole content of information. This means considerable time has to be spent in getting the necessary information, which has been a barrier to increasing the number of users who enjoy teletext broadcasts. A need, therefore, has been increasing to provide an information abstracting facility for abstracting the main points of information in teletext and displaying only the main points. Some teletext channels broadcast an abstract of major news, but there are still quite a few problems to be overcome, such as, the abstract itself consists of several pages, the content, format, and length of an abstract differ from one broadcast station to another, and so on.

Among information abstracting techniques for document data that have so far been put to practical use is the keyword extraction technique. Intended for scientific papers and the like, this technique involves calculating the frequencies of occurrence of technical terms and the like used in a paper and selecting keywords of high frequency of occurrence to produce an abstract of the paper. The reason that such a technique has been put to practical use is that it is intended for documents, such as papers in specific fields, where the number of frequently used terms is more or less limited. For such fields, it is relatively easy to prepare a dictionary of terms to be extracted as keywords. The keywords automatically extracted using this technique are appended to each paper and used for the sorting out and indexing of the papers.

However, if the above-described keyword extraction technique is applied to the abstracting of a teletext broadcast program, it simply extracts keywords of high frequency of occurrence from the keywords appearing in the program. The result is the extraction of many keywords relating to similar things, and an abstract constructed from such keywords will be redundant. Furthermore, in the case of teletext broadcasts, there often arises a need to extract topics common to a plurality of programs as timely information, besides an abstract of the content of a particular program. For example, when news programs are being broadcast on a plurality of channels, a need may occur to abstract information so that common topics can be extracted as the current trend from the news programs on the different channels. In such cases, a technique is necessary that distinguishes the keywords repeatedly appearing within the same program from the keywords appearing across the plurality of programs. Furthermore, if it is attempted to apply the conventional natural language processing technique to news programs, for example, since news programs tend to contain very many proper nouns, it is not possible to prepare an appropriate terminology dictionary in advance. Accordingly, the prior art techniques cannot be applied as they are. Hence, a need for an information abstracting technique that can handle information trends and that does not require a terminology dictionary.

Moreover, when using keywords as an abstract of information, if keyword extraction is performed simply on the basis of the frequency of occurrence, there arises the problem that many keywords relating to similar things are extracted and relations between keywords are not clear, with the result that the information obtained is short on substance for the number of keywords extracted. For example, when keywords were actually extracted in order of frequency from seven teletext news programs being broadcast in the same time slot, the results as shown in FIG. 15 were obtained, which shows the seven highest-use keywords. Parts (a) and (b) in FIG. 15 show the results of experiments conducted on news received at different times. As can be seen from these results, it is clear that the keyword extraction simply based on the frequency of occurrence has a problem as an information abstract. For example, in part (a), the first keyword "泉佐野" and the sixth keyword "朝日新聞社" both relate to the same topic, but this cannot be recognized from the simple listing of keywords shown in FIG. 15. A technique is therefore needed that avoids doubly extracting keywords having similar meanings and that explicitly indicates association between keywords in an information abstract. An approach to this need may be by preparing dictionary information describing keyword meanings and keyword associations, as practiced in the conventional natural language processing technique; however, when practical problems are considered, preparing a large volume of dictionary information presents a problem in terms of cost, and the dictionary information to be prepared in advance must be reduced as much as possible. Furthermore, in the case of teletext news programs, preparing a dictionary itself in advance is difficult since a large number of proper nouns are used. It is therefore necessary to provide a technique that automatically deduces association between keywords without using a dictionary and that abstracts information by also taking association between keywords into account.

The above-mentioned techniques are necessary not only for teletext broadcasts but for character string data in general provided in the form of character codes. For example, in the case of scientific papers also, there may arise a need to provide an abstract of a common topic in a scientific society, not just an abstract of each individual paper. Furthermore, in electronic mail equipment used in communications networks, these techniques will become necessary when extracting recent topics, etc. that are frequently discussed in all electronic mail messages.

Further, when extracting keywords based on the frequency of occurrence without using a dictionary, since a thesaurus cannot be prepared in advance, it becomes necessary to process keywords that describe the same thing but are expressed differently. For example, the name of an athlete may be written as "伊達公子" at one time and as "伊達選手" at other times. For such keywords expressed differently but used with the same meaning, the frequency of occurrence of each keyword must be added together to count the frequency. It is therefore imperative to develop a technique that treats different keywords, such as "伊達選手" and "伊達公子", as similar keywords without using a dictionary and that calculates the frequency of occurrence by taking into account the frequency of occurrence of such similar keywords.

Such differently expressed keywords are frequently used, for example, in teletext broadcasts in which data are provided from a plurality of broadcast stations with different people producing data at different stations. In particular, in the case of a broadcast, such as news, dealing with events happening in the real world, the problem is that, unlike the case of scientific topics, there is no predefined terminology. Accordingly, for a keyword describing the same event, different expressions may be used from one information source to another. Therefore, for application to teletext broadcasts, it is an important task to develop a technique for processing differently expressed keywords.

For calculating similarity between differently expressed keywords without using a dictionary, one method may be by using the number of common characters or its proportion between two keywords. For example, in the case of "伊達公子" and "伊達選手", the two characters "伊達" are common, that is, two of the four characters are the same between the keywords. In other words, not less than half the character string matches, so that these keywords can be considered similar. However, calculating the similarity simply based on the number of common characters has a problem because in the case of keywords, "伊達選手", "伊達公子", and "伊達政宗" having the two characters "伊達" in common, for example, the similarity among them will become the same. It is therefore imperative to devise a method of calculation that provides a large similarity between "伊達選手" and "伊達選手" but a small similarity between "伊達公子" and "伊達政宗".

Processing differently expressed keywords becomes necessary especially in teletext broadcasts, etc. in which data are provided from a plurality of broadcast stations with different people producing data at different stations. Specifically, in the case of a broadcast dealing with events happening in the real world, such as news, the problem is that, unlike the case of scientific topics, there is no predefined terminology. Furthermore, in the case of names of conferences, names of persons, names of companies, etc., similar keywords may be used to represent topics having no relations with each other. Therefore, for application to teletext broadcasts, it is an important task to develop a technique for processing differently expressed keywords.

Furthermore, when extracting keywords from data and producing an abstract on the basis of the frequency of occurrence of the extracted keywords, articles such as "a" and "the", prepositions, etc. in the English language, for example, are very frequent keywords. It is therefore necessary to remove such frequent keywords which do not have significance in representing topics.

In teletext broadcasts also, there may be a situation where English sentences are quoted. In such a situation, there is a possibility that the frequency of keywords, such as prepositions and articles, which are not significant in representing a topic, may become large. It is therefore imperative to develop a technique that does not output such keywords as an information abstract.

In view of the above-outlined problems with the prior art, it is an object of the present invention to provide an information abstracting method, an information abstracting apparatus, a weighting method, and a teletext broadcast receiving apparatus, which can be used to extract more appropriate keywords from data than the prior art can.

SUMMARY OF THE INVENTION

A first invention provides an information abstracting apparatus which comprises input means for accepting an input of character string data divided into prescribed units, with each individual character represented by a character code;

keyword extracting means for extracting a keyword for each of said prescribed units from the character string data input from said input means;

weighting means for weighting said extracted keyword by taking into account a state of occurrence, in the other prescribed units, of keywords that are identical to said extracted keyword;

keyword selecting means for selecting at least one keyword from said extracted keywords on the basis of the weighted result; and output means for outputting said selected keyword as an information abstract relating to said character string data.

A second invention provides a teletext broadcast receiving apparatus which comprises teletext broadcast receiving means for receiving a teletext broadcast;

channel storing means for storing a plurality of channels of prescribed programs;

keyword extracting means for extracting a keyword from each of said prescribed programs received by said teletext broadcast receiving means on said channels stored in said channel storing means;

weighting means for weighting said extracted keyword by taking into account a state of occurrence, in the other prescribed programs, of keywords that are identical to said extracted keyword;

keyword selecting means for selecting keywords from said extracted keywords on the basis of the weighted result; and display means for displaying all or part of said selected keywords as an information abstract relating to said teletext broadcast.

A third invention provides an information abstracting apparatus which comprises input means for accepting an input of character string data divided into prescribed units each subdivided into prescribed paragraphs, with each individual character represented by a character code;

keyword extracting means for extracting a keyword for each paragraph in each of said prescribed units from the character string data input from said input means;

keyword associating means for generating a keyword association by associating one keyword with another among keywords obtained from the same paragraph;

weighting means for weighting said extracted keyword by taking into account a state of occurrence, in the other prescribed units, of keywords that are identical to said extracted keyword, and for weighting said generated keyword association by taking into account a state of occurrence, in the other prescribed paragraphs; of keyword associations that are identical to said generated keyword association;

selecting means for selecting keywords and keyword associations from said extracted keywords and said generated keyword associations on the basis of the weighted results; and output means for outputting said selected keywords and keyword associations as an information abstract relating to said character string data.

A fourth invention provides a teletext broadcast receiving apparatus which comprises teletext broadcast receiving means for receiving a teletext broadcast;

channel storing means for storing a plurality of channels of prescribed programs;

keyword extracting means for extracting a keyword from each of said prescribed programs received by said teletext broadcast receiving means on said channels stored in said channel storing means;

keyword associating means for generating a keyword association by associating one keyword with another among keywords obtained from the same paragraph in the same program;

weighting means for weighting said extracted keyword by taking into account a state of occurrence, in the other prescribed programs, of keywords that are identical to said extracted keyword, and for weighting said generated keyword association by taking into account a state of occurrence, in the other prescribed paragraphs, of keyword associations that are identical to said generated keyword association;

selecting means for selecting keywords and keyword associations from said extracted keywords and said generated keyword associations on the basis of the weighted results; and display means for displaying all or part of said selected keywords and keyword associations as an information abstract relating to said teletext broadcast.

A fifth invention provides an information abstracting apparatus which comprises input means for accepting an input of character string data divided into prescribed units, with each individual character represented by a character code;

keyword extracting means for extracting a keyword for each of said prescribed units from said input character string data;

similarity calculating means for calculating similarity between keywords thus-extracted;

weighting means for weighting said extracted keyword by taking into account a state of occurrence, in the other prescribed units, of keywords that are identical or similar to said extracted keyword;

keyword selecting means for selecting keywords from said extracted keywords on the basis of the weighted result; and output means for outputting said selected keywords as an information abstract relating to said character string data.

A sixth invention provides a teletext broadcast receiving apparatus which comprises teletext broadcast receiving means for receiving a teletext broadcast;

channel storing means for storing a plurality of channels of prescribed programs;

keyword extracting means for extracting a keyword from each of said prescribed programs received by said teletext broadcast receiving means on said channels stored in said channel storing means;

similarity calculating means for calculating similarity between keywords thus extracted;

weighting means for weighting said extracted keyword by taking into account a state of occurrence, in the other prescribed programs, of keywords that are identical or similar to said extracted keyword;

keyword selecting means for selecting keywords from said extracted keywords on the basis of the weighted result; and display means for displaying all or part of said selected keywords as an information abstract relating to said teletext broadcast.

A seventh invention provides an information abstracting apparatus which comprises input means for accepting an input of character string data divided into prescribed units each subdivided into prescribed paragraphs, with each individual character represented by a character code;

keyword extracting means for extracting a keyword for each paragraph in each of said prescribed units from said character string data input from said input means;

keyword associating means for generating a keyword association by associating one keyword with another among keywords obtained from the same paragraph;

similarity calculating means for calculating similarity between keywords thus extracted, on the basis of a plurality of factors including said keyword association;

weighting means for weighting said extracted keyword by taking into account a state of occurrence, in the other prescribed units, of keywords that are identical or similar to said extracted keyword, and for weighting said generated keyword association by taking into account a state of occurrence, in the other prescribed paragraphs, of keyword associations that are identical to said generated keyword association;

selecting means for selecting keywords and keyword associations from said extracted keywords and said generated keyword associations on the basis of the weighted results; and outputting said selected keywords and keyword associations as an information abstract relating to said character string data.

A eighth invention provides a teletext broadcast receiving apparatus which comprises teletext broadcast receiving means for receiving a teletext broadcast;

channel storing means for storing a plurality of channels of prescribed programs;

keyword extracting means for extracting a keyword from each of said prescribed programs received by said teletext broadcast receiving means on said channels stored in said channel storing means;

keyword associating means for generating a keyword association by associating one keyword with another among keywords obtained from the same paragraph in the same program;

similarity calculating means for calculating similarity between keywords thus extracted, on the basis of a plurality of factors including said keyword association;

weighting means for weighting said extracted keyword by taking into account a state of occurrence, in the other prescribed programs, of keywords that are identical or similar to said extracted keyword, and for weighting said generated keyword association by taking into account a state of occurrence, in the other prescribed paragraphs, of keyword associations that are identical to said generated keyword association;

selecting means for selecting keywords and keyword associations from said extracted keywords and said generated keyword associationson the basis of the weighted results; and display means for displaying all or part of said selected keywords and keyword associations as an information abstract relating to said teletext broadcast.

A ninth invention provides an information abstracting apparatus which comprises exception keyword storing means for prestoring keywords which are not processed as keywords, wherein when extracting a keyword in each prescribed unit from the character string data input from input means, any keyword identical to a keyword stored in the exception keyword storing means is excluded from the group of keywords to be extracted.

A 10th invention provides a teletext broadcast receiving apparatus which comprises exception keyword storing means for prestoring keywords which are not processed as keywords, wherein when extracting a keyword from each of the programs received by the teletext broadcast receiving means on the channels stored in channel storing means, any keyword identical to a keyword stored in the exception keyword storing means is excluded from the group of keywords to be extracted.

According to the first invention, an input of character string data divided, for example, into prescribed units, with each individual character represented by a character code, is accepted, a keyword is extracted for each prescribed unit from the input character string data, the extracted keyword is weighted by taking into account the state of occurrence in the other prescribed units of keywords that are identical to the extracted keyword, keywords are selected on the basis of the weighted result, and the selected keywords are,output as an information abstract relating to the character string data.

Accordingly, keywords used in common among many units, for example, are preferentially selected as an information abstract. This means that keywords appearing in topics common to many units are selected and extracted as abstracted information representing the general trend in the character string data.

According to the second invention, the teletext broadcast receiving means receives a teletext broadcast, the channel storing means stores a plurality of channels of prescribed programs, the keyword extracting means extracts a keyword from each of the prescribed programs received by the teletext broadcast receiving means on the channels stored in the channel storing means, the weighting means weights the extracted keyword by taking into account the state of occurrence in the other prescribed programs of keywords that are identical to the extracted keyword, the keyword selecting means selects keywords on the basis of the weighted result, and the display means displays all or part of the selected keywords as an information abstract relating to the teletext broadcast.

In this invention, a score is calculated for each keyword in such a manner that a higher score is given, for example, to a keyword appearing in a larger number of programs. As a result, from the teletext programs being broadcast on the channels stored in the channel storing means, keywords in a topic raised in common among many programs, for example, can be extracted as an information abstract. That is, from ever-changing contents such as programs broadcast as teletext, the trend in the latest information is extracted and displayed as an information abstract.

According to the third invention, an input of character string data divided into prescribed units each subdivided into prescribed paragraphs, with each individual character represented by a character code, is accepted, a keyword is extracted for each paragraph in each prescribed unit from the input character string data, a keyword association is generated by associating one keyword with another among keywords obtained from the same paragraph, the extracted keyword is weighted by taking into account the state of occurrence in the other prescribed units of keywords that are identical to the extracted keyword, and also, the generated keyword association is weighted by taking into account the state of occurrence in the other prescribed paragraphs of keyword associations that are identical to the generated keyword association, keywords and keyword associations are selected on the basis of the weighted results, and the selected keywords and keyword associations are output as an information abstract relating to the character string data.

In this invention, a score is calculated for each keyword and for each keyword association in such a manner that a higher score is given, for example, to a keyword appearing in a larger number of units or a keyword association appearing in a larger number of paragraphs. Based on the thus calculated scores, keywords and keyword associations are selected and extracted as an information abstract. As a result, as compared to a case, for example, where keywords having high frequency of occurrence are simply selected, pairs of keywords having closer association and frequently occurring together can be extracted; when displaying an information abstract, if there are many keywords closely associated with each other, only representative keywords are displayed, and when displaying a plurality of associated keywords, the keywords are displayed by associating one keyword with another, thereby preventing the content of the information abstract from becoming redundant or difficult to understand.

According to the fourth invention, the teletext broadcast receiving means receives a teletext broadcast, the channel storing means stores a plurality of channels of prescribed programs, the keyword extracting means extracts a keyword from each of the prescribed programs received by the teletext broadcast receiving means on the channels stored in the channel storing means, the keyword associating means generates a keyword association by associating one keyword with another among keywords obtained from the same paragraph in the same program, the weighting means weights the extracted keyword by taking into account the state of occurrence in the other prescribed programs of keywords that are identical to the extracted keyword, and also weights the generated keyword association by taking into account the state of occurrence in the other prescribed paragraphs of keyword associations that are identical to the generated keyword association, the selecting means selects keywords and keyword associations on the basis of the weighted results, and the display means displays all or part of the selected keywords and keyword associations as an information abstract relating to the teletext broadcast.

In this invention, a score is calculated for each keyword and for each keyword association in such a manner that a higher score is given, for example, to a keyword appearing in a larger number of programs or a keyword association appearing in a larger number of paragraphs. Based on the thus calculated scores, keywords and keyword associations are selected and extracted as an information abstract. As a result, as compared to a case, for example, where keywords having high frequency of occurrence are simply selected, pairs of keywords having closer association and frequently occurring together can be extracted by associating one keyword with another. Especially, in teletext, when information obtained from the same information source, such as news, is broadcast on different channels, a plurality of common keywords occur in different programs to describe the same event; therefore, by removing redundant keywords from the abstract in accordance with keyword associations, and by clarifying their associations, an abstract rich in content can be presented for viewing. This makes it possible to grasp the main points in a large volume of information in a short time.

According to the fifth invention, an input of character string data divided into prescribed units, with each individual character represented by a character code, is accepted, a keyword is extracted for each prescribed unit from the input character string data, similarity between keywords thus extracted is calculated, the extracted keyword is weighted by taking into account the state of occurrence in the other prescribed units of keywords that are identical or similar to the extracted keyword;

keywords are selected on the basis of the weighted result; and the selected keywords are output as an information abstract relating to the character string data.

In this way, keywords which do not exactly match, for example, are treated as similar keywords, and higher scores are given as the number of similar keywords extracted increases, such keywords being displayed as an information abstract.

According to the sixth invention, the teletext broadcast receiving means receives a teletext broadcast, the channel storing means stores a plurality of channels of prescribed programs, the keyword extracting means extracts a keyword from each of the prescribed programs received by the teletext broadcast receiving means on the channels stored in the channel storing means, the similarity calculating means calculates similarity between keywords thus extracted, the weighting means weights the extracted keyword by taking into account the state of occurrence in the other prescribed programs of keywords that are identical or similar to the extracted keyword, the keyword selecting means selects keywords on the basis of the weighted result, and the display means displays all or part of the selected keywords as an information abstract relating to the teletext broadcast.

In this way, the frequencies of keywords which are similar to each other but are differently expressed in different programs, for example, are added together.

According to the seventh invention, an input of character string data divided into prescribed units each subdivided into prescribed paragraphs, with each individual character represented by a character code, is accepted, a keyword is extracted for each paragraph in each prescribed unit from the input character string, a keyword association is generated by associating one keyword with another among keywords obtained from the same paragraph, similarity between keywords thus extracted is calculated on the basis of a plurality of factors including the keyword association, the extracted keyword is weighted by taking into account the state of occurrence in the other prescribed units of keywords that are identical or similar to the extracted keyword, and also, the generated keyword association is weighted by taking into account the state of occurrence in the other prescribed paragraphs of keyword associations that are identical to the generated keyword association, keywords and keyword associations are selected on the basis of the weighted results, and the selected keywords and keyword associations are output as an information abstract relating to the character string data.

In this way, the scores of keywords which are similar to each other but are differently expressed in different programs, for example, are added together. By adding the scores in this manner, a high score is given to a keyword that is significant in expressing the information abstract even if the keyword is expressed differently.

According to the eighth invention, the teletext broadcast receiving means receives a teletext broadcast, the channel storing means stores a plurality of channels of prescribed programs, the keyword extracting means extracts a keyword from each of the prescribed programs received by the teletext broadcast receiving means on the channels stored in the channel storing means, the keyword associating means generates a keyword association by associating one keyword with another among keywords obtained from the same paragraph in the same program, the similarity calculating means calculates similarity between keywords thus extracted, on the basis of a plurality of factors including the keyword association, the weighting means weights the extracted keyword by taking into account the state of occurrence in the other prescribed programs of keywords that are identical or similar to the extracted keyword, and also weights the generated keyword association by taking into account the state of occurrence in the other prescribed paragraphs of keyword associations that are identical to the generated keyword association, the selecting means selects keywords and keyword associations on the basis of the weighted results, and the display means displays all or part of the selected keywords and keyword associations as an information abstract relating to said teletext broadcast.

In this way, for keywords differently expressed in different programs, for example, their similarity is calculated using their associated keywords, and if similar keywords are extracted, their scores are added together. In particular, for keywords similar in expression but used in totally different topics, there occurs no similarity between their associated keywords, so that the resulting similarity decreases. This ensures accurate calculation of similarity.

According to the ninth invention, when extracting a keyword in each prescribed unit from the character string data input from the input means, any keyword identical to a keyword stored in the exception keyword storing means is excluded from the group of keywords to be extracted.

In this way, when, for example, data written in English is input, if articles, prepositions, etc. are prestored in the exception keyword storing means, these keywords can be prevented from being included in the group of keywords displayed as an information abstract.

According to the 10th invention, when extracting a keyword from each of the programs received by the teletext broadcast receiving means on the channels stored in the channel storing means, any keyword identical to a keyword stored in the exception keyword storing means is excluded from the group of keywords to be extracted.

In this way, when, for example, English sentences, etc. are included in a teletext program, keywords such as articles, prepositions, etc. which are not significant in describing a topic, will not be included in the information abstract.

BRIEF DESCRIPTION OF THE DRAWINGS

FIG. 4 is a diagram showing an example of input data in the same embodiment;

FIG. 5 is a diagram showing an example of input data in the same embodiment;

FIG. 15 is a diagram showing output examples of information abstracting based only on keyword frequency;

FIG. 37 is a diagram showing an example of input data described in English;

DESCRIPTION OF THE REFERENCE NUMERALS

1 . . . INPUT SECTION, 2 . . . OUTPUT SECTION, 3 . . . KEYWORD EXTRACTING SECTION (KEYWORD EXTRACTING MEANS), 4 . . . SCORE CALCULATING SECTION (WEIGHTING MEANS), 5 . . . ABSTRACTING SECTION (KEYWORD SELECTING MEANS), 11 . . . VRAM, 12 . . . MAIN STORAGE, 13 . . . EXTERNAL STORAGE, 14 . . . CPU, 21 STORING SECTION, 23 . . . TELETEXT KEYWORD EXTRACTING SECTION (KEYWORD EXTRACTING MEANS), 24 . . . TELETEXT SCORE CALCULATING SECTION (WEIGHTING MEANS), 25 . . . TELETEXT ABSTRACTING SECTION (KEYWORD SELECTING MEANS), 26 . . . DISPLAY SECTION, 31 . . . KEYWORD ASSOCIATING SECTION, 32 33 . . . ASSOCIATION ABSTRACTING SECTION (SELECTING MEANS), 41 . . . TELETEXT KEYWORD ASSOCIATING SECTION (KEYWORD ASSOCIATING MEANS), 42 . . . TELETEXT ASSOCIATION SCORE CALCULATING SECTION (WEIGHTING MEANS), 43 . . . TELETEXT ASSOCIATION ABSTRACTING SECTION (SELECTING MEANS), 51 . . . SIMILARITY SCORE CALCULATING SECTION (SIMILARITY CALCULATING MEANS, WEIGHTING MEANS), 61 . . . TELETEXT SIMILARITY SCORE CALCULATING SECTION (SIMILARITY CALCULATING MEANS, WEIGHTING MEANS), 71 . . . SIMILARITY/ASSOCIATION CALCULATING SECTION (SIMILARITY CALCULATING MEANS, WEIGHTING MEANS), 81 . . . TELETEXT SIMILARITY/ASSOCIATION CALCULATING SECTION (SIMILARITY CALCULATING MEANS, WEIGHTING MEANS), 91 . . . EXCEPTION KEYWORD STORING SECTION, 92 . . . EXCEPTION KEYWORD EXTRACTING SECTION, 101 . . . EXCEPTION TELETEXT KEYWORD EXTRACTING SECTION, 111 . . . DATA DESIGNATING MEANS (KEYWORD DESIGNATING MEANS), 112 . . . DATA STORING SECTION (WORK AREA), 113 . . . SEARCH SECTION, 114 . . . DATA PRESENTING SECTION (OUTPUT MEANS), 121 . . . KEYWORD FINDING SECTION, 122 . . . NOTIFYING SECTION (OUTPUT MEANS)

DESCRIPTION OF THE PREFERRED EMBODIMENTS

The preferred embodiments of the present invention will now be described below with reference to the accompanying drawings.

Figure 1:
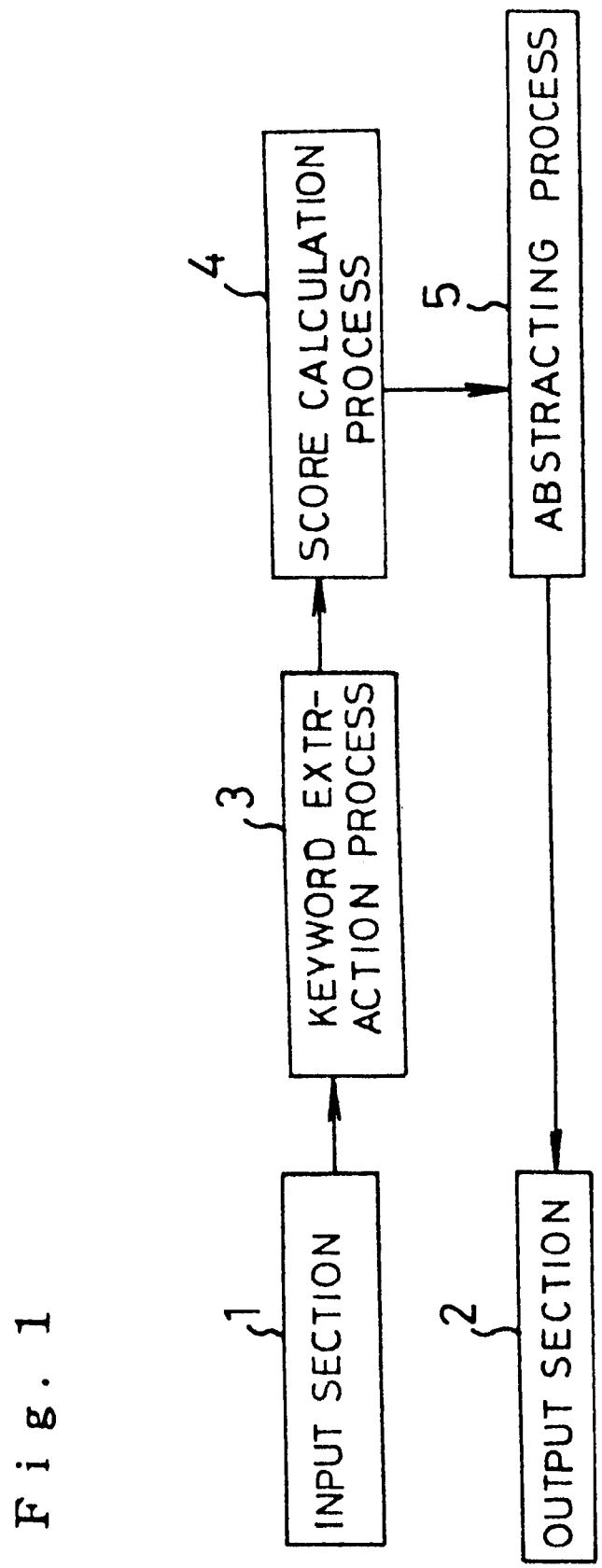
FIG. 1 is a block diagram showing the system configuration for an information abstracting method and an information abstracting apparatus according to one embodiment of the first invention.

FIG. 1 is a diagram showing the system configuration of an information abstracting apparatus according to one embodiment of the first invention. Referring to the figure, the information abstracting apparatus will be described along with an information abstracting method according to the embodiment of the first invention.

In FIG. 1, reference numeral 1 is an input section for accepting an input of character string data divided in prescribed units, with each individual character represented by a character code; 2 is an output section for displaying the result of information abstracting; 3 is a keyword extracting section for extracting keywords contained in each prescribed unit from the character string data input from the input section 1; 4 is a score‚calculating section for calculating a score for each keyword in such a manner that a higher score is given to a keyword extracted from a larger number of units; and 5 is an abstracting section for selecting keywords on the basis of the scores calculated by the score calculating section 4 and for outputting the keywords as an information abstract to the output section 2.

Figure 2:
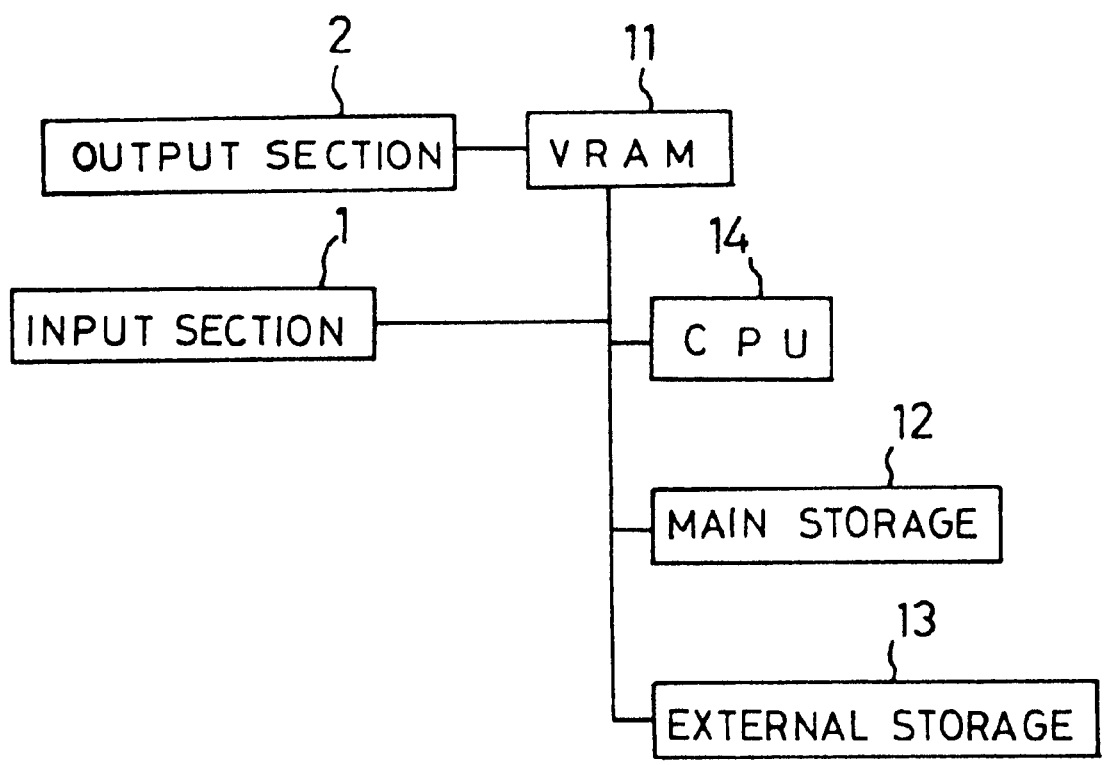
FIG. 2 is a diagram showing an example of the hardware configuration of the same embodiment.

A hardware configuration for implementing the above-configured system is shown in FIG. 2. The configuration shown is fundamentally the same as that of a general-purpose computer system, and includes the input section 1 and the output section 2 which were described as constituent parts of the system configuration shown in FIG. 1. Of the constituent parts in FIG. 2, the same parts as those shown in the system configuration of FIG. 1 are designated by the same reference numerals, and explanation of such parts will not be repeated. In FIG. 2, reference numeral 11 is a VRAM for storing data for display on the output section 2; 12 is a main storage for storing programs and data for processing during execution; 13 is an external storage for storing programs and data; and 14 is a CPU for executing the programs stored in the external storage 14 by transferring them to the main storage 12.

The operation of the thus configured information abstracting apparatus and information abstracting method will be described with reference to the flowchart shown in FIG. 3.

In step a1, character string data is input through the input section 1. The input character string data is data divided into prescribed units as shown in FIG. 4. In the example of FIG. 4, there are n character-string data sets, each as one prescribed unit. As an example, articles in sports newspapers may be input with articles from different newspapers stored in the respective units 1 to n. As another example, research papers in a specific field may be input with papers from different scientific societies stored in the respective units. 1 to n. Using the information abstracting method and information abstracting apparatus of this embodiment, in the former example major topics in the sports world can be obtained in the form of an abstract, while, in the latter example, information about what is the foremost topic in the field, beyond the boundaries of individual societies, can be obtained as the result of information abstracting. To use as an example in the description of the following steps, it is assumed here that the latest news articles have been input in step a1 as data with articles from different newspapers stored in the respective units 1 to n. An example of input data is shown in FIG. 5. These data are taken from teletext broadcasts currently in service.

In step a2, one unit of data is extracted from the character string data input in step a1.

Each unit is extracted from the character string data in a predetermined order, for example, in the order of input. Therefore, by repeatedly performing step a2, there will be left no more units that can be extracted from the input data. In that case, the process proceeds to step a5, as shown in the flowchart.

In step a3, the keyword extracting section 3 extracts a keyword from the unit of character string data extracted in step a2. For keyword extraction, various methods have previously been studied that involves natural language processing techniques, and any method may be employed. However, the present embodiment uses a method that extracts keywords on the basis of the difference in character type without using dictionary information, by considering the following two points: One is that methods requiring a large memory capacity such as dictionary information will pose big barriers to practical implementation, and the other is that, in the case of news or the like, dictionary information cannot be prepared in advance because of a large number of proper nouns used. More specifically, keywords containing three consecutive kanji, numeric, or katakana characters are extracted; however, those words which begin with a numeric character when extracted as keywords, are omitted from the candidates to be treated as keywords. If the data extracted in-step a2 was unit 1 of the data shown in FIG. 4, for example, "米朝高官　協議合意", "北朝鮮", "核問題", "米朝高官　会議", etc. are extracted as keywords. When keywords are extracted on the basis of the difference in character type in this manner, meaningless keywords may also be extracted, depending on data, but some of such meaningless keywords are corrected in subsequent step a7 by partial match against keywords from other units. Further, in step a3, if a keyword occurs that is identical to the one already extracted, such a keyword is also extracted and stored regardless of how many times it occurs.

In step a4, the score calculating section 4 classifies the keywords extracted in step a3 into groups of identical keywords, and calculates the number of keywords in each group as the frequency of occurrence. For example, when four identical keywords "国際平和維持軍" have been extracted in step a3, these keywords "国際平和維持軍" are combined into one keyword and its frequency of occurrence is calculated as 4. However, in the present embodiment, when two nonidentical keywords A and B have been extracted, for example, if the keyword B is a subset of the keyword A, and if the subset portion is longer than half the character length of the keyword A, the frequency of occurrence of the keyword A is added to the frequency of occurrence of the keyword B, and the keyword A is deleted. For example, when five identical keywords "米朝高官 協議合意" and three identical keywords "米朝高官 協議" have been extracted, the frequency of occurrence of the keyword "米朝高官 協議" is set to 8, and the keyword "米朝高官 協議合意" is deleted. As an example, consider the situation that "泉佐野", "ヘリ墜落", "大阪府警", "泉佐野市", "朝日新聞社 取材用", "ヘリコプター", "新聞大会開", "第　回新聞大会", "京都市", "新聞販売", "正常化", "特別宣言", "電動茶", "京都府茶協同組合", "電動茶", "米朝高官 協議合意", "北朝鮮", "核問題", "会議国際平和維持軍", "ジュネーブ" and "調印式" have been extracted as keywords in step a3. In this case, identical keywords are grouped together and the keyword count results as shown in Table 1 below are obtained.

TABLE 1

| Keyword | Frequency of occurrence |
| --- | --- |
| 泉佐野 | 2 |
| ヘリ墜落 | 1 |
| 大阪府警 | 1 |
| 朝日新聞社取材用 | 1 |
| ヘリコプター | 1 |
| 新聞大会開 | 1 |
| 第47回新聞大会 | 1 |
| 京都市 | 1 |
| 新聞販売 | 1 |
| 正常化 | 1 |
| 特別宣言 | 1 |
| 電動茶 | 2 |
| 京都府茶協同組合 | 1 |
| 米朝高官協議合意 | 1 |
| 北朝鮮 | 1 |
| 核問題 | 1 |
| 米朝高官会議 | 1 |
| ジュネーブ | 1 |
| 調印式 | 1 |

The keyword count results thus obtained are stored (pushed) onto a FILO (first-in-last-out) stack.

In step a5, one keyword/frequency pair is retrieved from the stack stored in step a4. The retrieved data is deleted from the stack. Therefore, by repeatedly executing step a5, there will be left no data that can be retrieved from the stack. When all data have been removed, the process proceeds to step a10.

In step a6, the value in the "keyword" item of the pair retrieved in step a5 is retrieved.

Steps a7 to a9 are performed in the score calculating section 4. In step a7, using the keyword retrieved in step a6 it is judged whether any keyword identical to it exists in a keyword frequency list. The keyword frequency list is constructed as shown in Table 2 below and, initially, the values are set empty. Therefore, when this step is called for the first time, the process automatically proceeds to step a9.

Table 2 looks as if it consists only of the keywords extracted from unit 1 in the data example shown in FIG. 5, but actually, the keyword frequency table eventually contains the keywords extracted from all the units. In the description of this embodiment, only a part of the keyword frequency table is shown as an example, since the whole table is too large to be shown here.

TABLE 2

| Keyword | Intra-unit frequency | Inter-unit share count |
|---|---|---|
| 泉佐野 | 2 | 0 |
| ヘリ墜落 | 1 | 0 |
| 大阪府警 | 1 | 0 |
| 朝日新聞社取材用 | 1 | 0 |
| ヘリコプター | 1 | 0 |
| 新聞大会開 | 1 | 0 |
| 第47回新聞大会 | 1 | 0 |
| 京都市 | 1 | 0 |
| 新聞販売 | 1 | 0 |
| 正常化 | 1 | 0 |
| 特別宣言 | 1 | 0 |
| 電動茶 | 2 | 0 |
| 京都府茶協同組合 | 1 | 0 |
| 米朝高官協議合意 | 1 | 0 |
| 北朝鮮 | 1 | 0 |
| 核問題 | 1 | 0 |
| 米朝高官会議 | 1 | 0 |
| ジュネーブ | 1 | 0 |
| 調印式 | 1 | 0 |

The judging operation in step a7 is performed by sequentially comparing the keyword retrieved in step a6 against the keywords in the "keyword" item in the keyword frequency table. However, meaningless keywords may have been extracted as keywords in the keyword extracting operation, as described in connection with step a3; therefore, if one of the keywords compared one against each other is a subset of the other and the character count of the subset portion is longer than half the keyword length, such as "容疑者浮" versus "容疑者", then these keywords are regarded as a match, and the keyword is treated as consisting of the common portion "容疑者".

Step a8 is performed when the keyword retrieved in step a6 matches a keyword already entered in the keyword frequency list. This means that identical keywords exist in more than one unit. In this case, 1 is added to the value of "Inter-unit share count" in the keyword table format shown in Table 2. As for the value of "Intra-unit frequency", the value in the "frequency of occurrence" item of the pair retrieved in step a5 is entered in the item of "Intra-unit frequency". For example, in the keyword frequency table such as Table 2, consider the case where the pair retrieved in step a5 is 米朝高官協議, 3). In this case, by performing step a8 the keyword frequency table as shown below (Table 3) is obtained.

TABLE 3

| Keyword | Intra-unit frequency | Inter-unit share count |
|---|---|---|
| 泉佐野 | 2 | 0 |
| ヘリ墜落 | 1 | 0 |
| 大阪府警 | 1 | 0 |
| 朝日新聞社取材用 | 1 | 0 |
| ヘリコプター | 1 | 0 |
| 新聞大会開 | 1 | 0 |

TABLE 3-continued

| Keyword | Intra-unit frequency | Inter-unit share count |
|---|---|---|
| 第47回新聞大会 | 1 | 0 |
| 京都市 | 1 | 0 |
| 新聞販売 | 1 | 0 |
| 正常化 | 1 | 0 |
| 特別宣言 | 1 | 0 |
| 電動茶 | 2 | 0 |
| 京都府茶協同組合 | 1 | 0 |
| 米朝高官協議 | 4 | 1 |
| 北朝鮮 | 1 | 0 |
| 核問題 | 1 | 0 |
| 米朝高官会議 | 1 | 0 |
| ジュネーブ | 1 | 0 |
| 調印式 | 1 | 0 |

As shown in Table 3, by performing step a8 changes are made to the keyword, intra-unit frequency, and inter-unit share count in the row of the keyword "米朝高官協議". In Table 2, the keyword was "米朝高官協議合意" but during the comparison performed in step a7, since this keyword contains "米朝高官協議" within it and the common portion is longer than half the keyword length, these keywords are treated as the same keyword and combined as one common keyword "米朝高官協議".

Step a9 is performed when the keyword retrieved in step a6 does not match any keywords stored in the keyword frequency table. In this case, the keyword retrieved in step a6 is added to the keyword frequency table, and the intra-unit frequency is set to the same value as the frequency of occurrence of the pair retrieved in step a5. The inter-unit share count is set to 0.

In step a10, the abstracting section 5 retrieves keywords from the keyword frequency list in decreasing order of inter-unit share count and outputs as many keywords as can be displayed to the output section 2 for display. For example, when a maximum of three keywords can be displayed, the keywords, "米朝高官協議", "北朝鮮", and "核問題", are selected in sequence from the keyword frequency table such as shown in Table 4.

TABLE 4

| Keyword | Intra-unit frequency | Inter-unit share count |
|---|---|---|
| 泉佐野 | 3 | 1 |
| ヘリ墜落 | 1 | 0 |
| 大阪府警 | 1 | 0 |
| 朝日新聞社 | 2 | 1 |
| ヘリコプター | 1 | 0 |
| 新聞大会開 | 1 | 0 |
| 第47回新聞大会 | 1 | 0 |
| 京都市 | 1 | 0 |
| 新聞販売 | 1 | 0 |
| 正常化 | 2 | 1 |
| 特別宣言 | 1 | 0 |
| 電動茶 | 2 | 0 |
| 京都府茶協同組合 | 1 | 0 |
| 米朝高官協議 | 3 | 3 |
| 北朝鮮 | 3 | 2 |
| 核問題 | 3 | 2 |
| 米朝高官会議 | 1 | 0 |
| ジュネーブ | 2 | 1 |

TABLE 4-continued

| Keyword | Intra-unit frequency | Inter-unit share count |
|---|---|---|
| 調印式 | 1 | 0 |

Between keywords having the same inter-unit share count, the keyword having the higher intra-unit frequency is selected first. Another method of keyword selection is to calculate priority on the basis of the weighted sum of the inter-unit share count and the intra-unit frequency and display the keywords in order of priority. In this method, constants, S and T, denoting weights, are determined first, and then, (intra-unit frequency ×S+inter-unit share count ×T) is calculated for each keyword, and keywords are selected in decreasing order of this value. Still another method is possible which considers the keyword length in making selection. In this method, priority is determined based on a weighted sum calculated by taking keyword character count into account. For example, in addition to S and T, a constant U is determined first, and then, (intra-unit frequency ×S+inter-unit share count ×T+keyword character count ×U) is calculated, and keywords are selected in decreasing order of this value.

Figure 6:
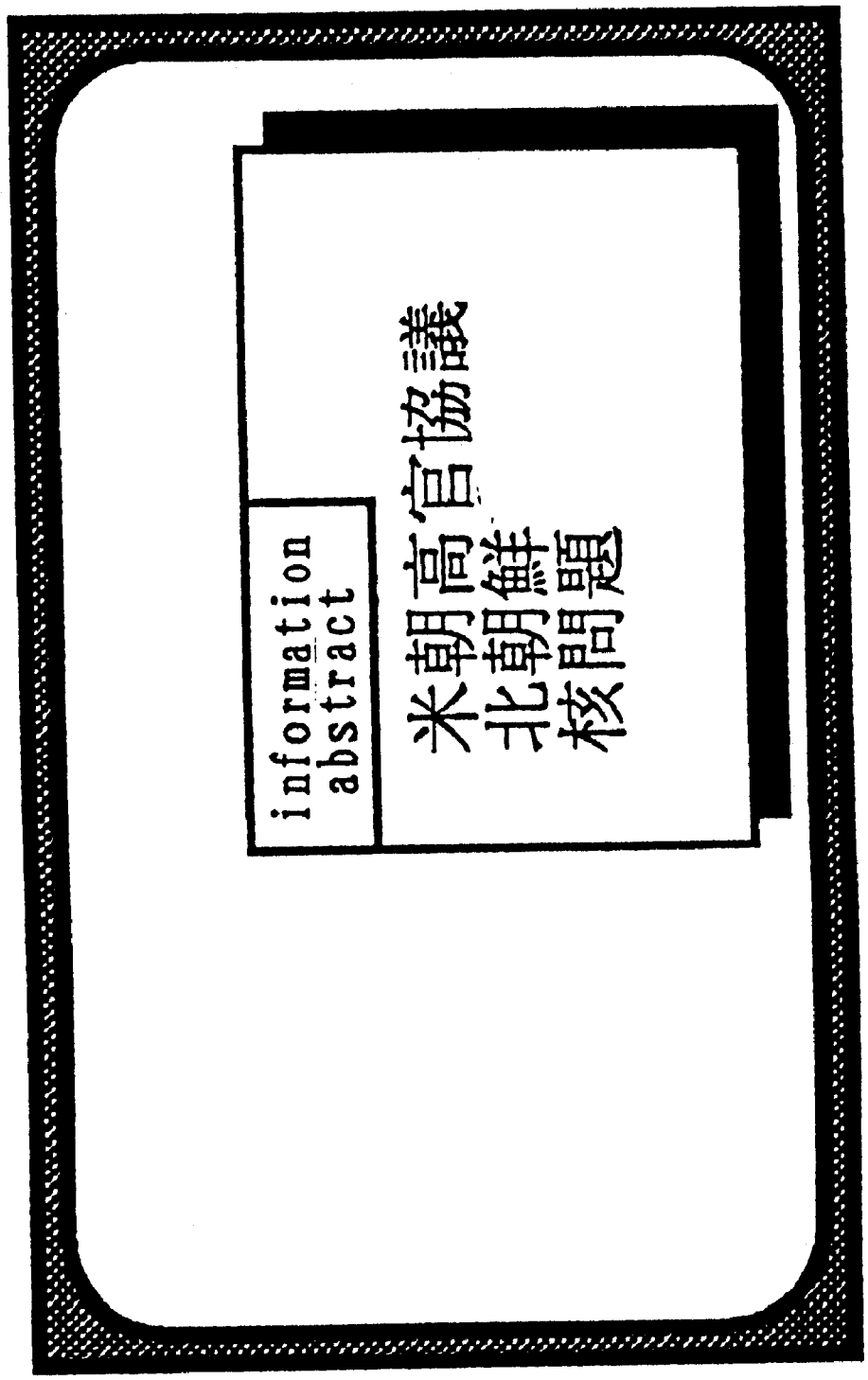
FIG. 6 is a diagram showing an output example in the same embodiment.

The selected keywords are displayed as an information abstract on the output section 2. For example, when the keywords " 米朝高官 協議 ", " 北朝鮮 ", and " 核問題 " have been selected, an output result such as the one shown in FIG. 6 is obtained.

Table 4 does not consist only of the keywords extracted from unit 1, but consists of the keywords extracted from all the units. In an alternative method of extracting keywords as an information abstract, the inter-unit share count is compared only among the keywords selected from one unit, and keywords are extracted in decreasing order of inter-unit share count. In this manner, keywords contained in one unit, but also used in other units, can be extracted.

Next, the operation will be described when the embodiment of the first invention is applied to another example. In the example hereinafter described, data input through the input section 1 is described in English. For example, consider the data example shown in FIG. 37. The units in this dada example consist of data representing abstracts of articles carried in Los Angeles Times, Chicago Tribune, *USA TODAY*, Atlanta Constitution, etc. In the following description, the differences of processing of English text data from that of Japanese text data will be explained in detail. The flowchart of FIG. 3, the same one used for explaining the processing of Japanese text data, will be used.

Steps a1 and a2 are the same as described in the processing of Japanese text data.

In step a3, in the case of Japanese data a keyword was extracted based on the difference in character type, but in the case of the English language, since words are already separated by a space, a keyword is extracted with the space as a delimiter. Therefore, the processing is simple compared to the case of the Japanese language. In the present embodiment, only words consisting of more than one character in the case of a word beginning with an upper-case letter, and words consisting of more than five characters in the case of a word beginning with a lower-case letter, are extracted as keywords. This is to avoid extracting articles and prepositions as keywords. Further, when there occurs a succession of words each beginning with an upper-case letter, such words are concatenated and regarded as one word. For example, from "Rosa Mota of Portugal", "Rosa Mota" and "Portugal" are extracted as keywords. A succession of words, each beginning with an upper-case letter, is thus regarded as one word because the names of persons and the like should be treated as inseparable words. As an example, from the first paragraph of unit 1 in FIG. 37, {"U.S. Olympic", "champion", "Joan Benoit Samuelson", "featured", "NYC Marathon"} are extracted. In the input data example of FIG. 37, it is assumed that the paragraphs in each unit are separated from each other by a blank line.

In step a4, the same processing as for Japanese text data is performed. From the keywords extracted from unit 1 in FIG. 37, for example, Table 5 shown below is obtained as the keyword count results.

TABLE 5

| Keyword | Frequency of occurrence |
|---|---|
| Olympic | 2 |
| champion | 1 |
| Joan Benoit Samuelson | 1 |
| featured | 1 |
| marathon | 2 |
| Rosa Mota | 1 |
| Portugal | 1 |

In Table 5, the frequency of occurrence of "Olympic" is 2. This is because "U.S. Olympic" and "Olympic", which were separately selected, have been combined into one keyword since "Olympic" is contained within "U.S. Olympic" and the contained portion is longer than half the keyword length, as in the processing of Japanese text data. For "marathon" also, the frequency of occurrence is 2 because "NYC Marathon" and "marathon" have been combined into one keyword. It will also be noted that when judging whether a keyword is a subset of another keyword or when judging a match between keywords, no distinction is made between upper-case and lower-case letters.

In step a5 to step a9, the same processing as for Japanese text data is performed. For example, Table 6 shown below is obtained as the keyword frequency table.

TABLE 6

| Keyword | Intra-unit frequency | Inter-unit share count |
|---|---|---|
| Olympic | 6 | 3 |
| champion | 1 | 0 |
| Joan Benoit Samuelson | 1 | 0 |
| featured | 1 | 0 |
| marathon | 7 | 3 |
| Rosa Mota | 3 | 2 |
| Portugal | 3 | 2 |

Figure 38:
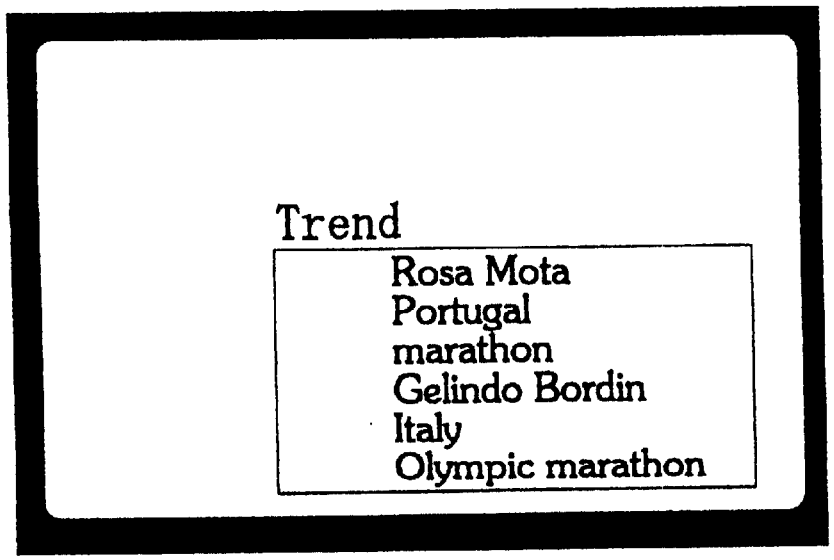
FIG. 38 is a diagram showing an output example when input data described in English was processed.

In step a10, the same processing as for Japanese text data is performed. For example, a prescribed number of keywords are retrieved in decreasing order of inter-unit share count from the keyword frequency table such as shown in Table 6. When three keywords are to be retrieved from Table 6, for example, "Olympic", "marathon", and "Rosa Mota" are retrieved. Here, "Portugal" and "Rosa-Mota" are equal both in inter-unit share count and in intra-unit frequency, but "Rosa Mota" consists of 9 characters including the space while "Portugal" consists of 8 characters. In such a case, the one that has the larger character count is selected. The selected keywords are output to the output section 2, as shown in FIG. 38. In Japanese, the title is "情報要約", but in English, "Trend" is the title.

Next, one embodiment of the second invention will be described with reference to drawings.

Figure 7:
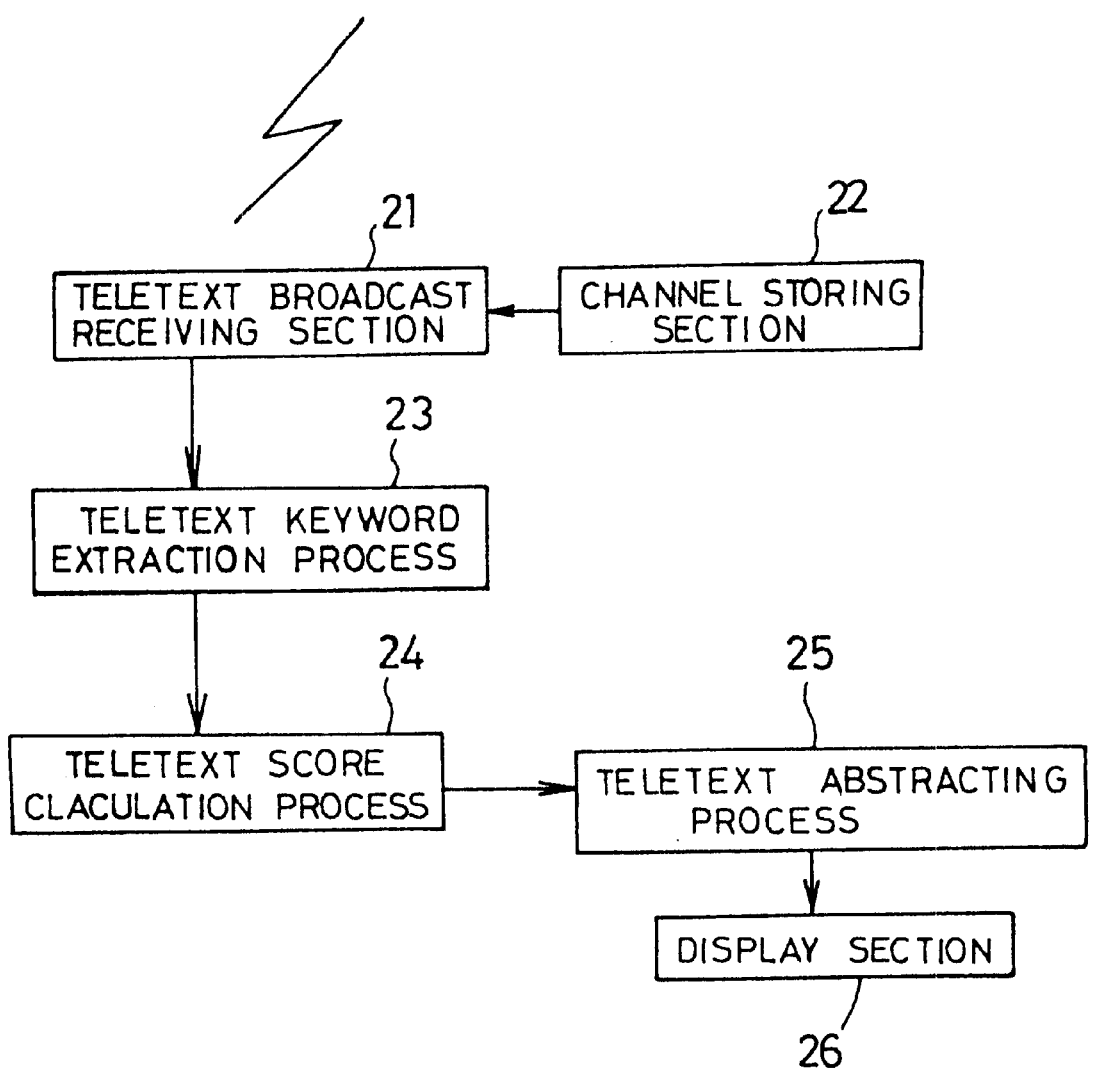
FIG. 7 is a diagram showing the system configuration for a teletext broadcast receiving apparatus according to one embodiment of the second invention.

As one embodiment of the second invention, a teletext broadcast receiving apparatus is shown in which an information abstracting method is employed. FIG. 7 is a diagram showing the system configuration for the embodiment of the second invention. In FIG. 7, reference numeral 21 is a teletext broadcast receiving section for receiving a teletext broadcast; 22 is a channel storing section for storing channels of prescribed programs; 23 is a teletext keyword extracting section for extracting keywords contained in received programs on a program-by-program basis; 24 is a teletext score calculating section for calculating a score for each keyword in such a manner that a higher score is given to a keyword appearing in a larger number of programs; 25 is a teletext abstracting section for selecting keywords on the basis of the calculated scores and for extracting them as an information abstract; and 26 is a display section for displaying the result of abstracting.

Figure 8:
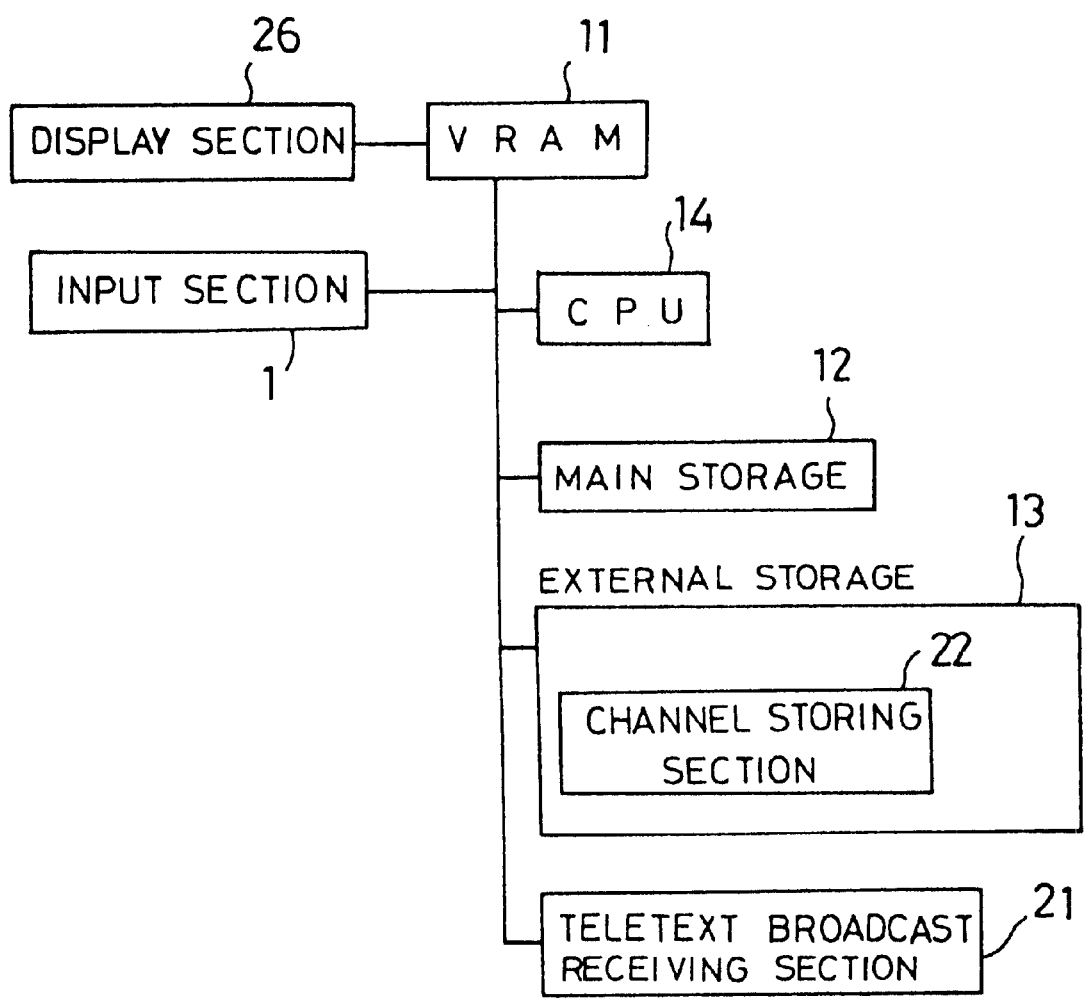
FIG. 8 is a diagram showing an example of the hardware configuration of the same embodiment.

A hardware configuration for implementing the above-configured system is shown in FIG. 8. The configuration shown in FIG. 8 is fundamentally the same as that of a general-purpose computer system, and consists of the constituent parts of the hardware configuration shown in FIG. 2 as one embodiment of the first invention, plus the constituent parts of the system configuration shown in FIG. 7 as one embodiment of the second invention. Accordingly, the same constituent parts between them are designated by the same reference numerals, and their detailed explanation will not be repeated here.

The operation of the thus configured teletext broadcast receiving apparatus will be described below with reference to the flowchart of FIG. 9. Since this invention is not directed to the teletext broadcast receiving system itself, the teletext broadcast receiving portion of the system is simply treated as one constituent part, that is, the teletext broadcast receiving section 21, and will not be described in detail here.

In steps b1 and b2, one of the channels stored in the channel storing section 22 is retrieved, and in accordance with the retrieved channel, a broadcast is received by the teletext broadcast receiving section 21. In step b1, since one channel is retrieved from the channel storing section 22 each time the step is called, there will be left no more channels that can be retrieved when the step has been called for the (N+1)th time where N is the number of channels stored. In that case, the process proceeds to step b5, as shown in the flowchart. The channels stored in the channel storing section 22 are as shown in Table 7 below.

TABLE 7

| Channels | |
|---|---|
| 4 ch | 02# |
| 6 ch | 101# |
| . | . |
| . | . |
| . | . |

When the data shown in Table 7 are stored in the channel storing section 22, data 4ch and 02# are retrieved when step b1 is called for the first time. Such a channel designation is used because in the current teletext broadcast system a program is designated by a channel number plus a number followed by #. In step b2, the contents of the received teletext program are stored in the main storage 12. The contents may be stored in the external storage 13 instead. By storing in the channel storing section 22 a plurality of channels on which programs in a specific genre are broadcast, such as news programs or sports programs, for example, the recent trend in that specific genre can be extracted as the result of abstracting according to the present embodiment.

In step b3, the teletext keyword extracting section 23 extracts a keyword from the contents of the teletext program stored in step b2. The keyword extraction is performed in the same manner as done in step a3 in the embodiment of the first invention. One program received on teletext broadcasting corresponds to one unit in the embodiment of the first invention.

In step b4, the number of keywords extracted in step b3 is counted and stored (pushed) onto the stack in the same manner as in step a4 in the embodiment of the first invention. The keyword count results are stored in the stack in the same format as that of the count result table (Table 1) shown in the embodiment of the first invention.

The processing in steps b5 to b9 is the same as steps a5 to a9 performed in the embodiment of the first invention. However, in the embodiment of the first invention, the format of the keyword frequency table is defined as shown in Table 2, but in the embodiment of the second invention, since teletext programs are used instead of units, the item names are changed as shown in Table 8 below.

TABLE 8

| Keyword | Intra-program frequency | Inter-program share count |
|---|---|---|

The processing itself is the same as that performed in the embodiment of the first invention; that is, the same processing performed on the intra-unit frequency is performed on the intra-program frequency, and the same processing performed on the inter-unit share count is performed on the inter-program share count. Further, the processing performed by the score calculating section 4 in the embodiment of the first invention is performed by the teletext score calculating section 24 in the embodiment of the second invention.

In step b10, the same processing as that in step a10 in the embodiment of the first invention is performed in the teletext abstracting section 25. The data example shown in FIG. 5 used in the description of the embodiment of the first invention is taken from teletext broadcasts, and the output result is the same as the example shown in FIG. 6 in the embodiment of the first invention. The output result is displayed on the display section 26.

The processing performed when the embodiment of the second invention is applied to English text data is the same as the processing explained in connection with the embodiment of the first invention, and therefore, the explanation will not be repeated here. Data described in English can also be handled in the second invention, as in the first invention.

Next, one embodiment of the third invention will be described below with reference to drawings.

Figure 10:
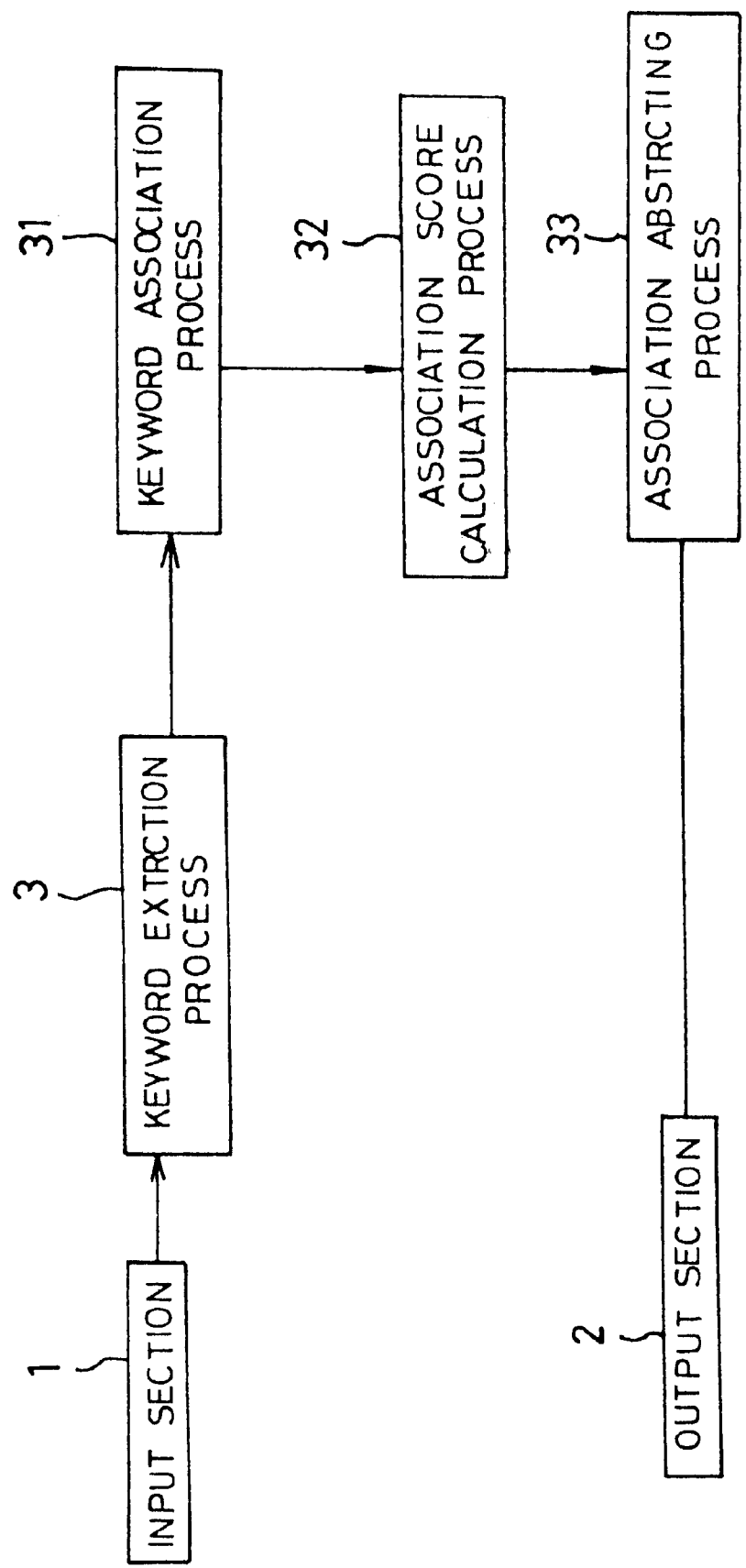
FIG. 10 is a block diagram showing the system configuration for an information abstracting method and an information abstracting apparatus according to one embodiment of the third invention.

As one embodiment of the third invention, an information abstracting method and an information abstracting apparatus are shown wherein associations between keywords are considered in abstracting information. FIG. 10 is a diagram showing the system configuration for the embodiment of the third invention. Some of the constituent parts in FIG. 10 are the same as those shown in the configurational example of the embodiment of the first embodiment; therefore, the same constituent parts are designated by the same reference numerals and detailed explanation of such parts will not be given here. In FIG. 10, reference numeral 31 is a keyword associating section for establishing associations between the keywords extracted by the keyword extracting section 3 from the same paragraph within the same unit; 32 is an association score calculating section for calculating scores for the keywords extracted by the keyword extracting section 3 and the keyword associations established by the keyword associating section 31, in such a manner that higher scores are given to keywords and keyword associations appearing in a larger number of units; and 33 is an association abstracting section for selecting keywords and keyword associations on the basis of the scores calculated by the association score calculating section 32, and for displaying them as an information abstract on the output section 2.

The hardware configuration for implementing the above-configured system is the same as the hardware configuration of the one embodiment of the first invention shown in FIG. 2. Therefore detailed explanation will not be given here.

Figure 11:
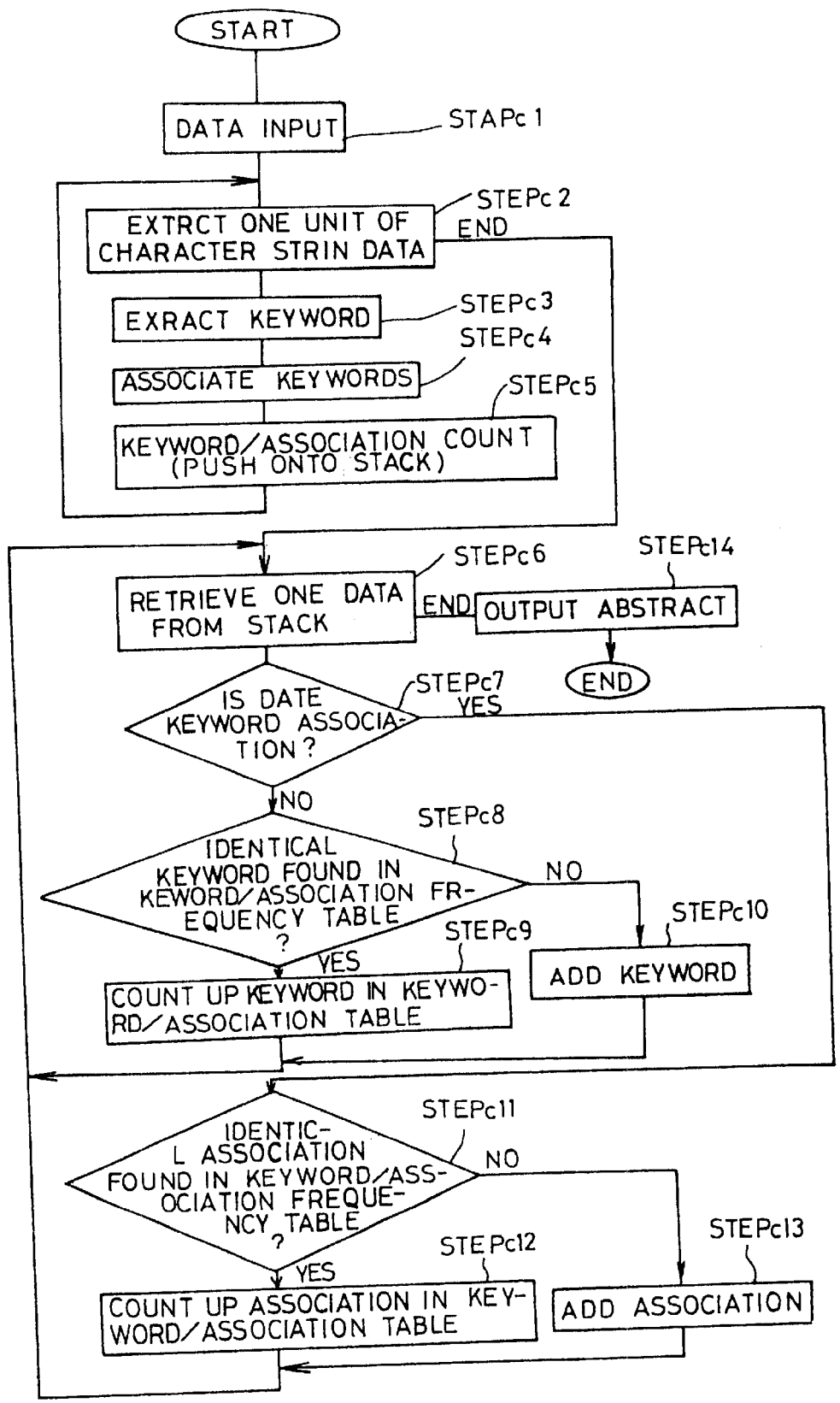
FIG. 11 is a flowchart showing an operating procedure for the information abstracting method and information abstracting apparatus according to the same embodiment.

The operation of the thus configured information abstracting apparatus and information abstracting method wherein keyword associations are considered will be described with reference to the flowchart shown in FIG. 11.

The processing in steps c1 to c3 is the same as steps a1 to a3 performed in the embodiment of the first invention.

In step c4, keywords extracted from the same paragraph within the same unit are associated with each other in the keyword associating section 31. In keyword association, two keywords are paired together. Within each keyword pair consisting of two associated keywords, the order of the keywords is insignificant. That is, (Keyword 1, Keyword 2) and (Keyword 2, Keyword 1) are both regarded as the same associated keyword pair. Of separately extracted two keywords, if one is a subset of the other, these are regarded as the same keyword in the same manner as described in connection with step a4, and after combining such keywords into one keyword, the keyword association is performed. In unit 1 of the data example shown in FIG. 5, for example, the paragraphs are separated from each other by a blank line. From the first paragraph in unit 1 of this data example are extracted the keywords "泉佐野", "ヘリ墜落", "大阪府警", "朝日新聞社取材用" and "ヘリコプター", for which keyword associations 泉佐野, ヘリ墜落, 大阪府警, 泉佐野 朝日新聞社 取材用, 泉佐野 ヘリコプター, ヘリ墜落 大阪府警, ヘリ墜落, 朝日新聞社, 取材用, ヘリ墜落, ヘリコプター, 大阪府警, 朝日新聞社, 取材用, 大阪府警, ヘリコプター, and 朝日新聞社 取材用, ヘリコプター are generated. From the illustrated data example, "泉佐野" and "泉佐野市" are extracted as keywords, but these are combined into one keyword "泉佐野" in the same manner as previously described in connection with a4.

In step c5, the keywords and the keyword associations extracted in steps c3 and c4 are arranged in the form of a count table, and are stored (pushed) onto a FILO (first-in-last-out) stack in the same manner as in step a4 described in the embodiment of the first invention. When the same keyword or keyword association occurs more than one time, such keywords or keyword associations are added together and the total count is stored in the item of the frequency of occurrence. The format of the count table is as shown in Table 9 below.

TABLE 9

| Keyword or Keyword association | Frequency of occurrence |
| --- | --- |

In the item of "Keyword or Keyword association" in Table 9, a specific keyword or keyword association is entered as an item value. In the case of a keyword association, since two keywords are paired, the item value is entered in the format of (Keyword 1, Keyword 2). The count table obtained, for example, from the keywords and keyword associations extracted from the first paragraph in unit 1 of the data example shown in FIG. 5, will be as shown in Table 10 below.

TABLE 10

| Keyword or Keyword association | Frequency of occurrence |
| --- | --- |
| 泉佐野 | 2 |
| ヘリ墜落 | 1 |
| 大阪府警 | 1 |
| 朝日新聞社取材用 | 1 |
| ヘリコプター | 1 |
| (泉佐野, ヘリ墜落) | 2 |
| (泉佐野, 大阪府警) | 2 |
| (泉佐野, 朝日新聞社取材用) | 2 |
| (泉佐野, ヘリコプター) | 2 |
| (ヘリ墜落, 大阪府警) | 1 |
| (ヘリ墜落, 朝日新聞社取材用) | 1 |
| (ヘリ墜落, ヘリコプター) | 1 |
| (大阪府警, 朝日新聞社取材用) | 1 |
| (大阪府警, ヘリコプター) | 1 |
| (朝日新聞社取材用, ヘリコプター) | 1 |

In Table 10, the frequency of occurrence of each keyword association is set to the same value as that of the keyword having the higher frequency of occurrence of the two associated keywords.

In step c6, data consisting of a keyword or keyword association paired with its frequency of occurrence, stored in stack in step c5, is retrieved.

In step c7, the value of the item "Keyword or Keyword association" in the data retrieved in step c6 is retrieved. If the value represents a keyword, the process proceeds to step c8; on the other hand, if the value represents a keyword association, the process proceeds to step c11. Whether the retrieved item value represents a keyword or a keyword association is judged in the following manner: if the item value is a combination of two keywords such as (keyword 1, keyword 2), the value is judged as representing a keyword association, and if it is simply one keyword such as Keyword 1, the value is judged as representing a keyword.

In step c8 to c10, the same processing as in steps a7 to a9 in the one embodiment of the first invention is performed by the association score calculating-section 32. The format of the keyword frequency table, however, is as shown in Table 11 below.

TABLE 11

| Keyword or Keyword association | Intra-unit frequency | Inter-field share count |
| --- | --- | --- |

The keyword frequency table shown in Table 11 is similar in format to the table shown in Table 2, the only difference being that the item name "Keyword" is changed to the item name "Keyword or Keyword association". This is because not only a keyword but a keyword association is also stored as the item value. The processing in steps c8 to c10 is performed only when the value of the item "Keyword or Keyword association" in the data retrieved in step c6 represents a keyword; therefore, the processing is the same as that in steps a7 to a9, except that the item name is different.

Step c11 is performed when the data retrieved in step c6 concerns a keyword association, in which case it is judged whether the keyword frequency table contains an association identical to the retrieved association. This is accomplished by sequentially comparing the keyword association retrieved in step c6 against the values in the item "Keyword or Keyword association" in the keyword frequency table. This judgement may be performed by using another efficient method. In judging the keyword association, association designations (Keyword 1, Keyword 2) and (Keyword 2, Keyword 1) are regarded as the same association, as previously described in connection with step c4. Further, when one keyword is a subset of another keyword, such keywords are combined into one keyword by using the same criterion and method as previously described in connection with step a7.

Step c12 is performed when the keyword association retrieved in step c6 matches a keyword association already entered in the keyword frequency list. This means that identical keyword associations exist in different paragraphs. In this case, 1 is added to the value of "Inter-unit share count" in the keyword frequency table. Since keywords are associated on a paragraph basis, not on a unit basis, the item names "Inter-unit share count" and "Intra-unit frequency" should actually be "Inter-paragraph share count" and "Intra-paragraph frequency", respectively, but to share the same keyword frequency table with keywords, the item names for keywords are also used for keyword associations. As for the value of "Intra-unit frequency", the value of the frequency of occurrence of the pair retrieved in step c6 is added to the value of the item "Intra-unit frequency". For example, consider the case where the pair retrieved in step c6 is ( (米朝高官 協議 北朝鮮, 2). In this case, the value of the intra-unit frequency is increased by 2 and the value of the inter-unit share count is increased by 1 for the data whose item value of the attribute "Keyword or Keyword association" in the keyword frequency table is 米朝高官 協議 北朝鮮).

Step c13 is performed when the keyword association retrieved in step c6 does not match any keyword associations stored in the keyword frequency table. In this case, the associated keyword pair retrieved in step c6 is added to the keyword frequency table, and the intra-unit frequency is set to the same value as the frequency of occurrence of the pair retrieved in step c6. The inter-unit share count is set to 0. The above steps c11 to c13 are performed in the association score calculating section 32.

Figure 12:
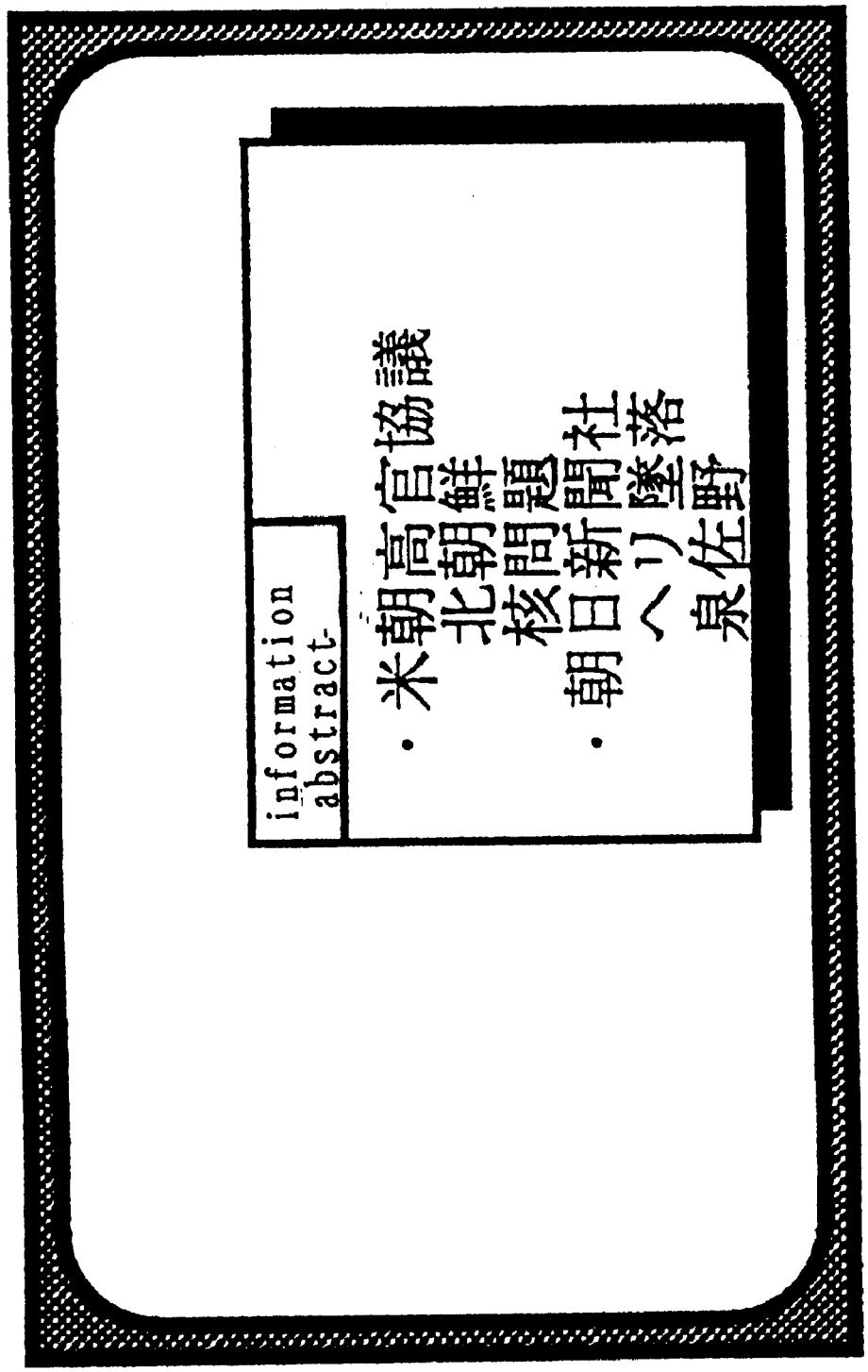
FIG. 12 is a diagram showing an output example in the same embodiment.

In step c14, the association abstracting section 33 retrieves a predetermined number of keywords from the keyword frequency table in decreasing order of inter-unit share count. Next, for each keyword retrieved, a predetermined number of associations are retrieved from keyword associations containing that keyword, in decreasing order of inter-unit share count. Finally, the results thus retrieved are displayed on the output section 2. For keywords or keyword associations having the same inter-unit share count, priority is given in decreasing order of intra-unit frequency. If the intra-unit frequency also is the same, priority is given in retrieval in decreasing order of character counts in the case of keywords and in decreasing order of character counts of associated keywords in the case of keyword associations. Consider, for example, the case where two keywords and two associations for each of the keywords are retrieved from the keyword frequency table shown in Table 12 on page 133. In this case, if two keywords are selected in decreasing order of inter-unit share count, "米朝高官 協議" and "朝日新聞社" are retrieved. The keyword "国際平和維持軍" has the same inter-unit count as the keyword "ヘリ墜落" or "北朝鮮", but "朝日新聞社" is selected based on its intra-unit frequency. When keyword associations containing the retrieved keywords are selected based on their inter-unit share counts, then (米朝高官 協議, 北朝鮮) (米朝高官, 協議, 核問題, 朝日新聞社, ヘリ墜落) and (泉佐野, 朝日新聞社) are retrieved, the associated keywords being "北朝鮮", "核問題", "ヘリ墜落", and "泉佐野". A display example of the thus retrieved keywords and keyword associations is shown in FIG. 12. In FIG. 12, a combination of three keywords represents one topic. Another method of selecting keywords and keyword associations may be by retrieving predetermined numbers of keywords and keyword associations in decreasing order of the weighted sum of the intra-unit frequency and inter-unit share count. To obtain the weighted sum, constants S and T denoting weights are determined first, and then, (intra-unit frequency×S+inter-unit share count×T) is calculated for each keyword.

As another method of extracting the result of abstracting in step c14, a method that can extract topics more accurately will be described below. First, a keyword that has the largest inter-unit share count is selected, and this selected keyword is denoted by A. Then, of the keywords associated with the keyword A, a keyword that provides the largest inter-unit share count when associated with the keyword A, is selected, and this selected keyword is denoted by B. Next, of keywords associated with both of the selected keywords A and B, a keyword that provides the largest combined inter-unit share count when associated with the respective keywords, is selected, and this selected keyword is denoted by C. Then, the keywords A, B, and C are combined to represent a first topic. To extract a second topic, first the keywords representing the first topic and the keyword associations containing these keywords are deleted from the keyword frequency table, and then the same processing as described above is performed. In making selection, if there are two or more keywords or keyword associations having the same inter-unit share count, their intra-unit frequencies, keyword lengths, etc. are compared, as described earlier.

As an example, the processing performed when extracting two topics from Table 12 will be described below. When extracting the first topic, "米朝高官 協議" is selected as the keyword A, and "北朝鮮" which provides the largest inter-unit share count when associated with the keyword A, is selected as the keyword B. Further, "核問題", which is associated with both of these keywords, and which provides the largest combined inter-unit share count when associated with the respective keywords, is selected as the keyword C. When extracting the second topic, first the keywords "米朝高官 協議", "北朝鮮", and "核問題", used to extract the first topic, and the keyword associations containing these keywords, are deleted from the keyword frequency table, and then the keywords A, B, and C are selected in the same manner as described above. From Table 12, "ヘリ墜落", "朝日新聞社", and "泉佐野" are selected as the keywords representing the second topic.

Next, the operation will be described when the embodiment of the third invention is applied to another example. In the example hereinafter described, data input through the input section 1 is described in English. For example, consider the data example shown in FIG. 37, as in the case of the embodiment of the first invention previously described. The following description deals with the processing of English text data, focusing on differences from the processing of Japanese text data. The flowchart of FIG. 11, the same one used for explaining the processing of Japanese text data, will be used.

The processing in steps c1 and c2 is the same as described in the processing of Japanese text data.

In step c3, the difference from the processing of Japanese text data is the same as that described in connection with step a3 when the embodiment of the first invention was applied to the English data example.

The processing in steps c4 to c14 is the same as described in the processing of Japanese text data. An example of the count table obtained in step c5 is shown in Table 13.

TABLE 13

| Keyword or Keyword association | Frequency of occurrence |
|---|---|
| Olympic | 2 |
| champion | 1 |
| Joan Benoit Samuelson | 1 |
| featured | 1 |
| marathon | 2 |
| Rosa Mota | 1 |
| Portugal | 1 |
| (Olympic, champion) | 2 |
| (Olympic, Joan Benoit Samuelson) | 2 |
| (Olympic, featured) | 2 |
| (Olympic, marathon) | 2 |
| (Olympic, Rosa Mota) | 2 |
| (Olympic, Portugal) | 2 |
| (champion, Joan Benoit Samuelson) | 1 |
| (champion, featured) | 1 |
| (champion, marathon) | 2 |
| (Joan Benoit Samuelson, featured) | 1 |
| (Joan Benoit Samuelson, marathon) | 2 |
| (featured, marathon) | 2 |
| (marathon, Rosa Mota) | 2 |
| (marathon, Portugal) | 2 |
| (Rosa Mota, Portugal) | 1 |

Figure 39:
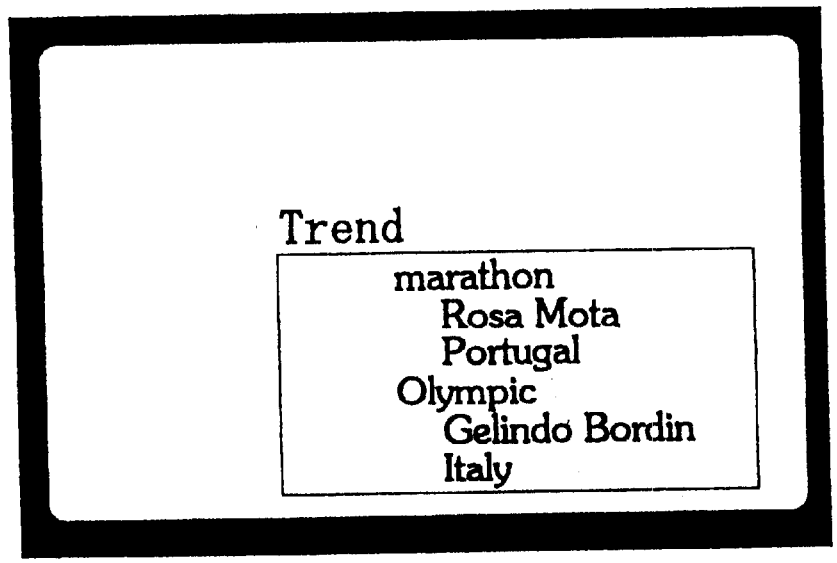
FIG. 39 is a diagram showing an output example when input data described in English was processed by considering association between keywords.

An example of the keyword frequency table is shown in Table 14. In step c14, first a keyword that has the largest inter-unit share count is selected from the keyword frequency table, and this selected keyword is denoted by A. Then, of the keywords associated with the keyword A, a keyword that provides the largest inter-unit share count when associated with the keyword A, is selected, and this selected keyword is denoted by B. Next, of keywords associated with both of the selected keywords A and B, a keyword that provides the largest combined inter-unit share count when associated with the respective keywords, is selected, and this selected keyword is denoted by C. Then, the combination of the keywords A, B, and C is output as data representing one topic. More than one topic represented by such a keyword combination may be extracted. For example, when two such topics are extracted from entries whose values are explicitly given in Table 14, two keyword combinations {marathon, Rosa Mota, Portugal} and {Olympic, Gelindo Bordin, Italy} are obtained. When extracting the second topic, first the keywords representing the first topic and the keyword associations containing these keywords are deleted from the keyword frequency table, and then the second topic is extracted in the same manner as described above. An example of the output result is shown in FIG. 39.

TABLE 14

| Keyword or Keyword association | Intra-unit frequency | Inter-unit share count |
|---|---|---|
| Olympic | 6 | 5 |
| champion | 1 | 0 |
| Joan Benoit Samuelson | 1 | 0 |
| . | . | . |
| . | . | . |
| . | . | . |
| (Olympic, champion) | 1 | 0 |
| (Olympic, Joan Benoit Samuelson) | 1 | 0 |
| . | . | . |
| . | . | . |
| Rosa Mota | 3 | 2 |
| Portugal | 3 | 2 |
| marathon | 7 | 6 |
| . | . | . |
| . | . | . |
| (Rosa Mota, Portugal) | 3 | 2 |
| (Rosa Mota, marathon) | 3 | 2 |
| (Rosa Mota, Olympic) | 2 | 1 |
| (Portugal, marathon) | 3 | 2 |
| . | . | . |
| . | . | . |
| Gelindo Bordin | 2 | 1 |
| Italy | 2 | 1 |
| overtakes | 1 | 0 |
| . | . | . |
| . | . | . |
| (Gelindo Bordin, Italy) | 2 | 1 |
| (Gelindo Bordin, overtakes) | 2 | 0 |
| (Gelindo Bordin, Olympic) | 6 | 1 |
| (Gelindo Bordin, marathon) | 7 | 1 |
| (Italy, Olympic) | 2 | 1 |
| . | . | . |
| . | . | . |

In the above embodiment, processing has been performed on the same paragraph within the same unit, but processing may be performed on a sentence-by-sentence basis, instead of a paragraph-by-paragraph basis.

Further, in the above-described invention, both the intra-unit frequency and the inter-unit share count were calculated for each keyword, based on which the keywords to be displayed as an abstract were selected. Another method of selection is also possible that relies only on the inter-unit share count. Such a method is effective because there are cases in which the same keyword appears repeatedly within the same unit simply because of rephrasing or for reasons of expression; in such cases, the intra-unit frequency may become large because of reasons of expression rather than the importance as a keyword. Therefore, a method is also needed that performs processing by using only the inter-unit share count without calculating the intra-unit frequency, for simplicity of processing.

When displaying keywords as an abstract of a document, often the general content of the document can be communicated by a combination of keywords; in such cases, the abstracting method can be simplified and the implementation in an actual apparatus can be facilitated by treating only the importance of association between keywords rather than treating the importance of each individual keyword. Such a method will be described below.

First, in step c5, the processing on keywords is not performed, but the processing is performed only on keyword associations. Further, the processing on the frequency of occurrence is also not performed. More specifically, keywords are not stored in the stack, but only keyword associations are stored in the stack. In this case, since the processing on the frequency of occurrence is not performed, the item of "Frequency of occurrence" is removed from the count table format shown in Table 9. That is, the table consists only of the item "Keyword or Keyword association" where only a keyword association is entered as an item value. Identical keyword associations are combined into one association. An example of the count table is shown in Table 15.

TABLE 15

| Keyword or Keyword association |
| --- |
| (泉佐野, ヘリ墜落) |
| (泉佐野, 大阪府警) |
| (泉佐野、朝日新聞社取材用) |
| (泉佐野, ヘリコプター) |
| (ヘリ墜落, 大阪府警) |
| (ヘリ墜落, 朝日新聞社取材用) |
| (ヘリ墜落, ヘリコプター) |
| (大阪府警, 朝日新聞社取材用) |
| (大阪府警, ヘリコプター) |
| (朝日新聞社取材用, ヘリコプター) |

Further, steps c8 to c10 are eliminated, and in step c7, no judging operation is performed and the branch to step c11 is always followed. In steps c12 and c13, since the data retrieved in step c6 does not contain the item "Frequency of occurrence", the processing on the intra-unit frequency, which uses the value of this item, is not performed. As a result of the above processing, a keyword frequency table such as shown in Table 16 is obtained which consists only of the keyword associations found in the keyword frequency table shown in Table 12 and does not have the item "Intra-unit frequency".

TABLE 16

| Keyword or Keyword as association | Inter-unit share count |
| --- | --- |
| (泉佐野, 朝日新聞社) | 1 |
| (泉佐野, ヘリ墜落) | 0 |
| (泉佐野, 朝日新聞社) | 0 |
| (朝日新聞社, ヘリ墜落) | 2 |
| (朝日新聞社, 毎日新聞社) | 0 |
| (米朝高官協議, 北朝鮮) | 3 |
| (米朝高官協議, 調印式) | 0 |
| (米朝高官協議, 核問題) | 2 |
| (米朝高官協議, 燃料棒) | 0 |
| (北朝鮮, 調印式) | 0 |
| (北朝鮮, 核問題) | 1 |
| (核問題, 燃料棒) | 0 |
| (平和条約, 仮調印) | 1 |
| (平和条約, イスラエル) | 0 |
| (平和条約, ヨルダン) | 0 |
| (仮調印, イスラエル) | 0 |
| (仮調印, ヨルダン) | 0 |
| (イスラエル, ヨルダン) | 0 |

Further, in step c14, a keyword association that has the largest inter-unit share count is retrieved from among the keyword associations in the keyword frequency table. For example, ((米朝高官協議, 北朝鮮, 3) is retrieved from Table 16. Next, of the keywords associated with both of the two keywords A and B constituting the retrieved keyword association, a keyword that provides the largest combined inter-unit share count when associated with A and B, is selected. When we consider the keyword frequency table shown in Table 16, for example, the keywords A and B correspond to "米朝高官協議" and "北朝鮮", and the keyword associated with both of them and having the largest combined inter-unit share count is "核問題". Accordingly, the keyword "核問題" is selected. The keywords A and B and the keyword selected in the above manner are combined together to represent one topic. When obtaining another topic as an information abstract, the keyword associations containing the keywords already selected are deleted from the keyword frequency table, and from among the remaining keyword associations, three keywords are selected in the same manner as described above. More specifically, in the above example, first the keywords "米朝高官協議", "北朝鮮", and "核問題" are selected, and then the keyword associations containing these keywords are deleted; after that, ((朝日新聞社,) ヘリ墜落), 2) is retrieved as the keyword association having the largest inter-unit share count. In this case, the keywords A and B are "朝日新聞社" and "ヘリ墜落", and the keyword associated with both of them and having the largest combined inter-unit share count is "泉佐野", which is therefore selected. As a result, {"米朝高官協議", "北朝鮮", "核問題"} and {"朝日新聞社", "ヘリ墜落", "泉佐野"} are retrieved as information abstracts, producing an output result as shown in FIG. 12.

It will be recognized that the method that relies only on the inter-unit share count, as described above, can also be applied to English text data, with the earlier described differences in processing from Japanese text data.

Next, one embodiment according to the fourth invention will be described with reference to drawings.

Figure 13:
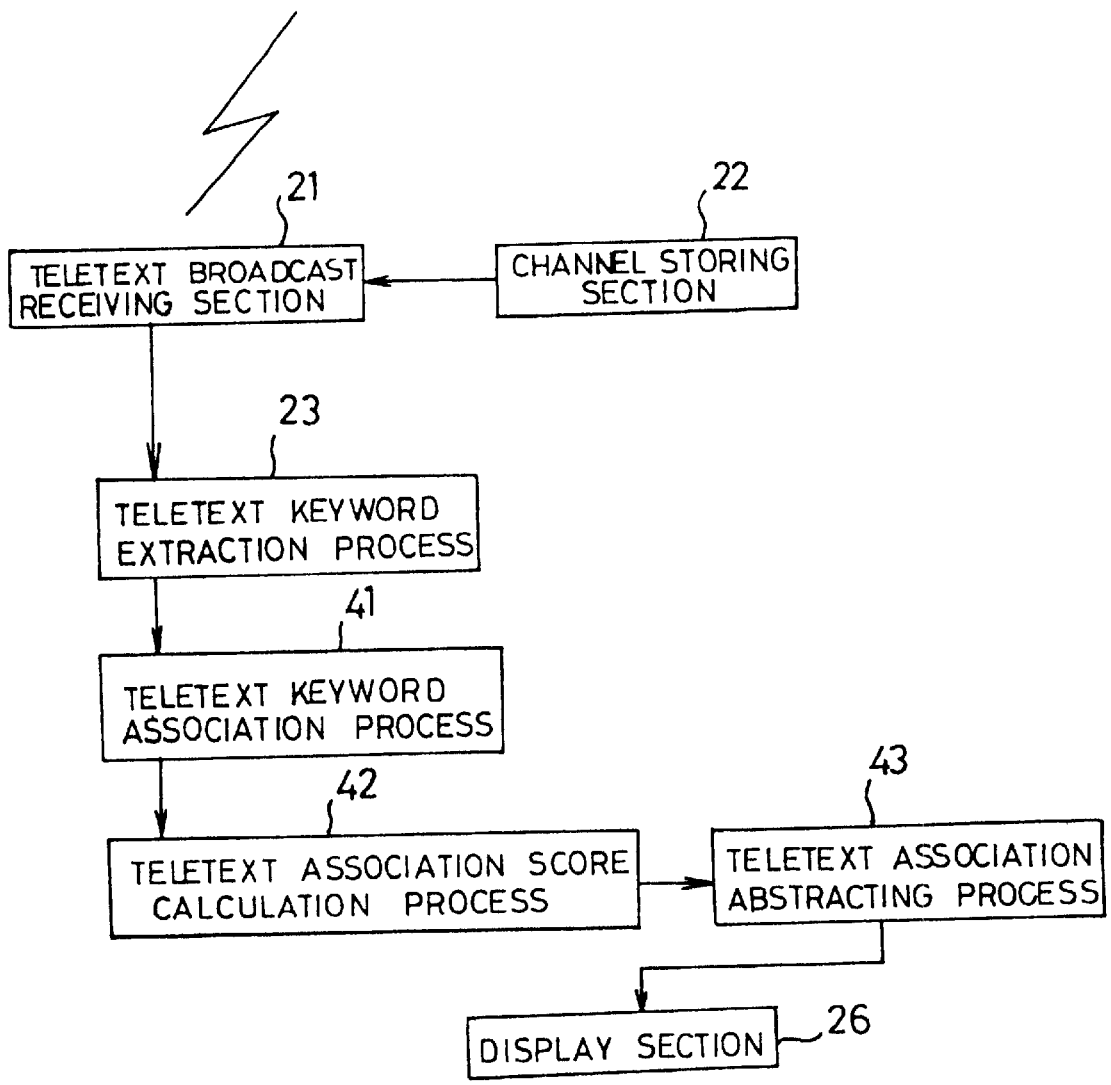
FIG. 13 is a diagram showing the system configuration for a teletext broadcast receiving apparatus according to one embodiment of the fourth invention.

As one embodiment of the fourth invention, a teletext broadcast receiving apparatus is shown which is equipped with an information abstracting function wherein associations between keywords are considered in abstracting information. FIG. 13 is a diagram showing the system configuration for the embodiment of the fourth invention. Some of the constituent parts in FIG. 13 are the same as those shown in the configurational example of the embodiment of the second invention; therefore, the same constituent parts are designated by the same reference numerals and detailed explanation of such parts will not be given here. In FIG. 13, reference numeral 41 is a teletext keyword associating section for establishing associations between the keywords extracted by the teletext keyword extracting section 23 from the same paragraph within the same program; 42 is a teletext association score calculating section for calculating scores for each keyword and each keyword association in such a manner that a higher score is given to a keyword or keyword association appearing in a larger number of programs; and 43 is a teletext association abstracting section for selecting keywords and keyword associations on the basis of the scores calculated by the teletext association score calculating section 42, and for displaying them on the output section 26.

The hardware configuration for implementing the above-configured system is the same as the hardware configuration of the embodiment of the second invention shown in FIG. 8. Therefore detailed explanation will not be given here.

Figure 14:
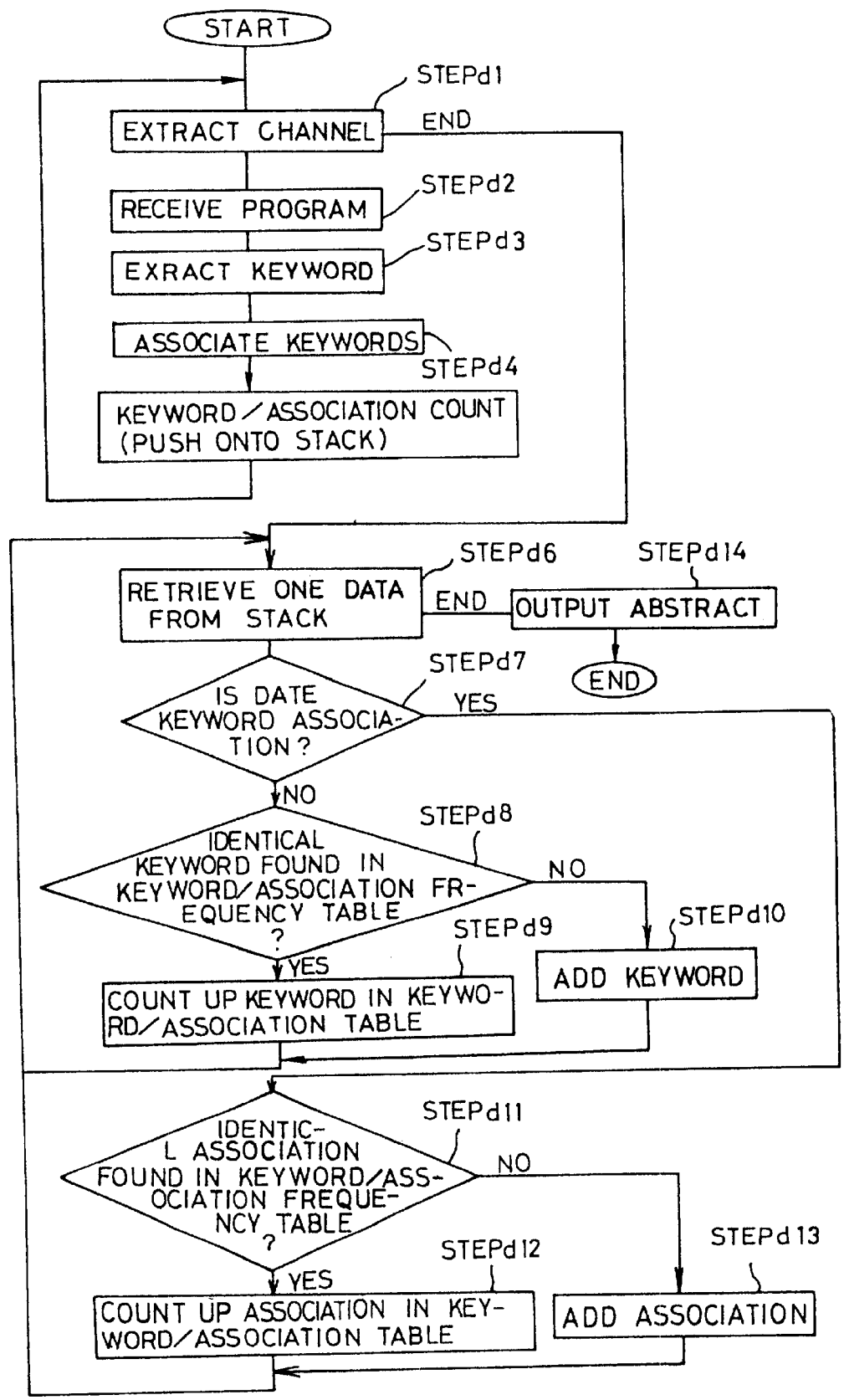
FIG. 14 is a flowchart showing an operating procedure for the teletext broadcast receiving apparatus according to the same embodiment.

The operation of the thus configured teletext broadcast receiving apparatus equipped with an information abstracting function wherein keyword associations are considered will be described with reference to the flowchart shown in FIG. 14.

The processing in steps d1 to d3 is the same as steps b1 to b3 performed in the embodiment of the second invention.

In steps d4 to d14, the same processing as steps c4 to c14 in the embodiment of the third invention is performed, except that step d4 is performed in the teletext keyword associating section 41, steps d8 to d13 in the teletext association score calculating section 42, and step d14 in the teletext association abstracting section 43.

In this invention, as in the third invention, a method of selection is considered that relies only on the inter-unit share count. Since the processing in steps d4 to d14 is fundamentally the same as the processing performed in steps c4 to c14, this method can be implemented by making the same modifications as described in connection with the third invention, and therefore detailed explanation will not be given here. Further, a method can also be considered that performs processing only on keyword associations, as described in the embodiment of the third invention.

Next, one embodiment according to the fifth invention will be described with reference to drawings.

Figure 16:
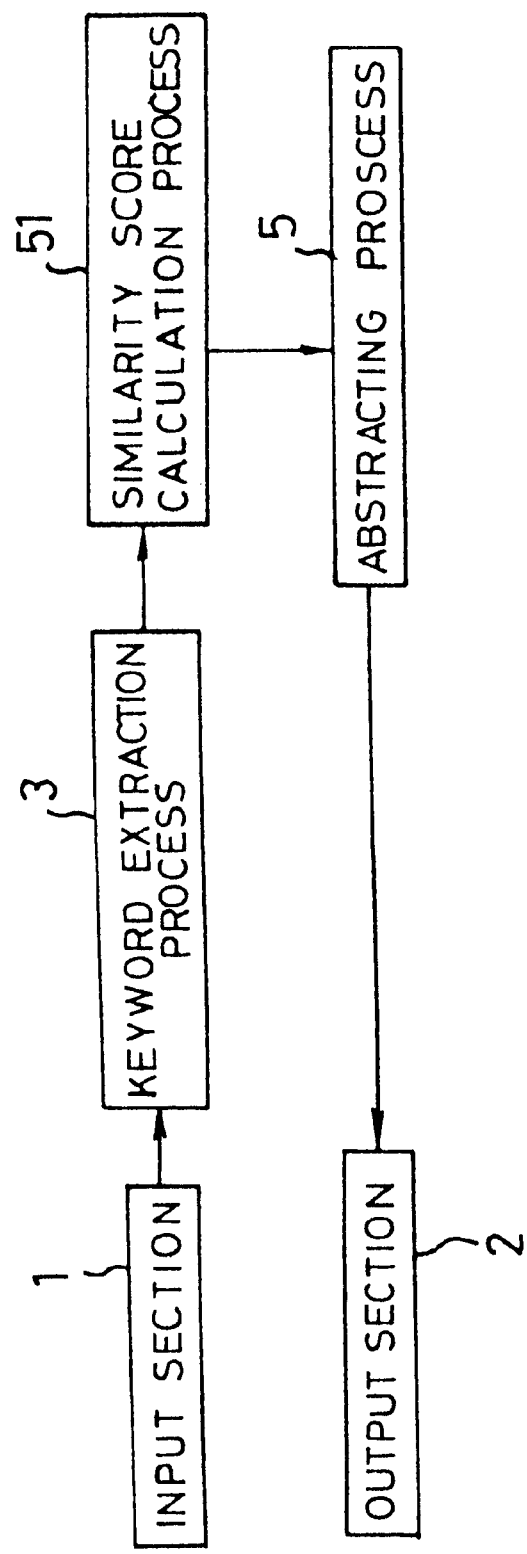
FIG. 16 is a block diagram showing the system configuration for an information abstracting method and an information abstracting apparatus according to one embodiment of the fifth invention.

As one embodiment of the fifth invention, an information abstracting method and an information abstracting apparatus are shown. FIG. 16 is a diagram showing the system configuration for the embodiment of the fifth invention. Some of the constituent parts in FIG. 16 are the same as those shown in the configurational example of the embodiment of the first invention; therefore, the same constituent parts are designated by the same reference numerals and detailed explanation of such parts will not be given here. FIG. 16 differs from the system configuration of the embodiment of the first invention in that a similarity score calculating section 51 is provided which calculates similarity between keywords extracted by the keyword extracting section 3.

The hardware configuration for implementing the above-configured system is the same as the hardware configuration of the embodiment of the first invention shown in FIG. 2.

Figure 17:
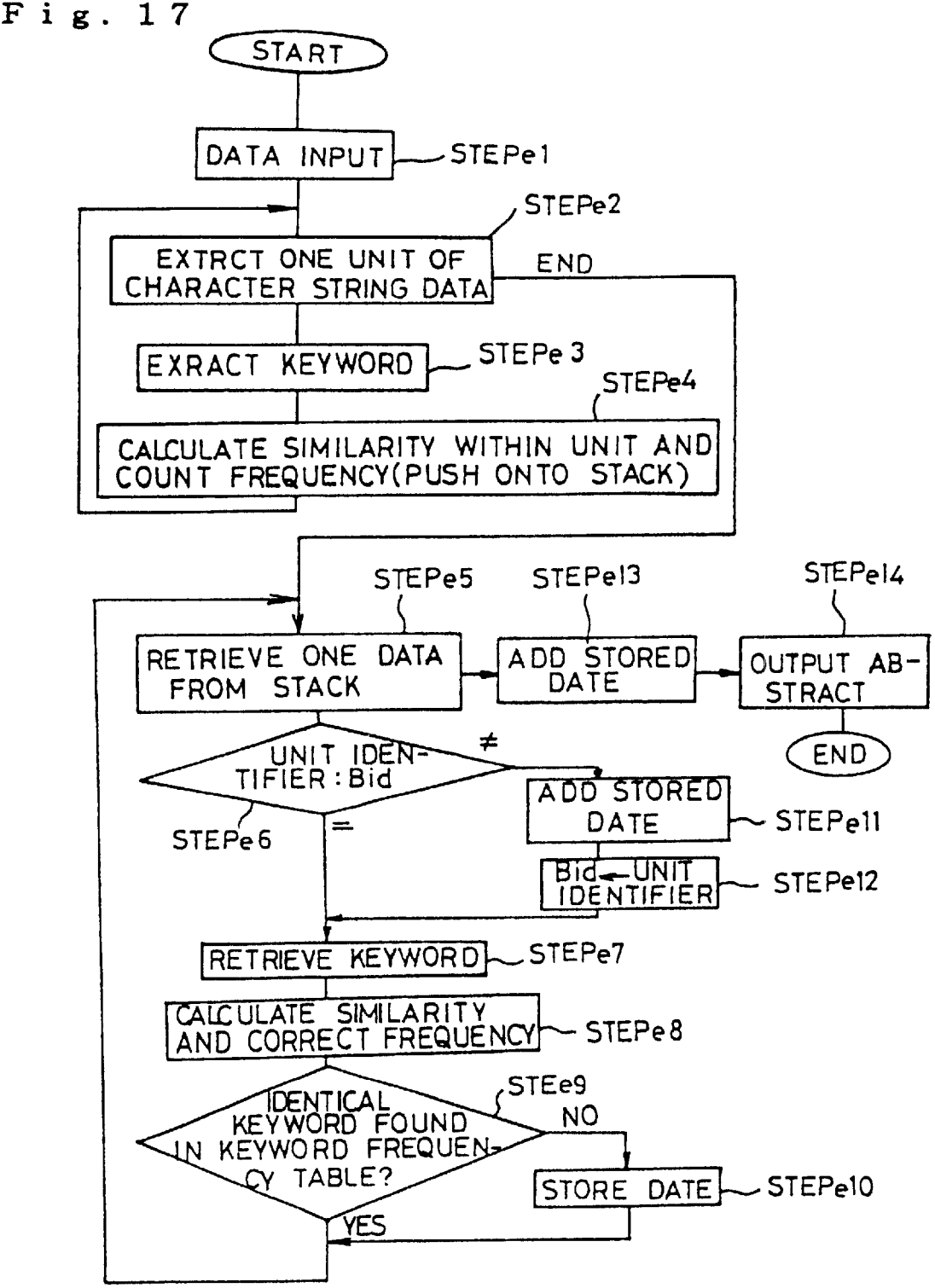
FIG. 17 is a flowchart showing an operating procedure for the information abstracting method and information abstracting apparatus according to the same embodiment.

The operation of the thus configured information abstracting apparatus and information abstracting method will be described with reference to the flowchart shown in FIG. 17.

The processing in steps e1 to e3 is the same as steps a1 to a3 performed in the embodiment of the first invention.

Steps e4 to e9 are performed in the similarity score calculating section 51.

In step e4, for the keywords extracted in step e3 the frequency of occurrence is calculated by taking similarity into account. In calculating the frequency of occurrence, keywords that exactly match are combined and the frequency of occurrence is set to the same value as the number of exactly matching keywords. For example, when four identical keywords "国際平和維持軍" are extracted, these keywords "国際平和維持軍" are combined into one keyword and its frequency of occurrence is set to 4. Next, for nonidentical keywords A and B, the number of characters that match in both character and character order between them is divided by the mean between the character counts of the keywords A and B, and the resulting value is used as the similarity. For example, between "米朝高官会議" and "米朝高官協議", "米朝高官議" is common, so that five characters match in both character and character order between them. The mean between the character counts of the two keywords is 6 characters. As a result, the similarity between the two characters is calculated as ⅚=0.83 (calculated down to two decimal places). Further, denoting the similarity calculated between the two keywords A and B as S, (S×frequency of occurrence of B) is added to the frequency of occurrence of A, and (S×frequency of occurrence of A) is added to the frequency of occurrence of B. For example, suppose that, before the additions to the frequency of occurrence using the similarity, the frequency of occurrence of "米朝高官会議" was 3 and that of "米朝高官協議" was 5. Then, using the similarity 0.83, the occurrence of frequency of "米朝高官会議" is calculated as 3+5×0.83=7.17, and the occurrence of frequency of "米朝高官協議" is calculated as 5+3×0.83=7.49. Such keyword similarity is calculated for every combination of keywords extracted in step e3. To reduce the calculation time, one method that can be considered is by calculating similarity only for keyword combinations in which more than half the number of characters match between two keywords. Since the frequency of occurrence is calculated on the basis of similarity as described above, the keyword count results obtained include frequencies expressed by numbers other than integers, as shown in Table 17 on page 134.

The keyword count results obtained are each stored (pushed), with an identifier identifying the unit, onto the FILO (first-in-last-out) stack. In the embodiment of the first invention, in step a4, keywords that are considered identical are combined into one keyword, and similarity between the keywords is not taken into account. Therefore, when updating the intra-unit frequency and inter-unit share count in the keyword frequency table in the subsequent steps a5 to a9, the situation cannot occur where a keyword extracted from one unit is considered identical to another keyword extracted from the same unit, even if the keyword is not stored in the stack with an identifier identifying the unit. As a result, the situation cannot occur where keywords extracted from the same unit are considered identical in step a7 and the inter-unit share count is updated in the subsequent step a8. On the other hand, when keyword similarity has been taken into account, as in the present embodiment, if an identifier identifying the unit were not stored in the stack, similarity would be calculated, when updating the keyword frequency table, regardless of whether the keywords were extracted from the same unit or from different units. As a result, it would become impossible to distinguish between a keyword extracted from a different unit and a keyword extracted from the same unit, and the inter-unit share count, which indicates an occurrence of an identical keyword in a different unit, could not be calculated in the frequency correction operation in step e7 hereinafter described. For this reason, an identifier identifying the unit is attached to each keyword stored in the stack, which is a feature different from the embodiment of the first invention. The identifier need only identify one unit from the other, and may be generated such as b1, b2, . . . , during the processing.

The processing in step e5 is the same as that performed in step a5 in the embodiment of the first invention, the only difference from step a5 being that the data retrieved in step e5 has an unit identifier attached to it.

In step e6, the identifier identifying the unit attached to the data retrieved in step e5 is compared with the contents of a variable Bid. The initial value of the variable Bid is so set as to be equal to any identifier and, at the same time, have the value of the identifier to be compared. For example, an integer larger than 0 is assigned to the unit identifier, and the initial value of Bid is set to −1; in step e6, the comparison is performed by first substituting the identifier to be compared into Bid only when Bid is −1. When they match as the result of the comparison, the process proceeds to step e7; otherwise, the process proceeds to step e11.

In step e7, the same processing as that in step a6 in the embodiment of the first invention is performed.

In step e8, similarity is calculated between the keyword retrieved in step e7 and each keyword in the keyword item in the keyword frequency table, such as shown in Table 2 in the embodiment of the first invention. In calculating the similarity, a flag variable or the like is used to identify whether an identical keyword (similarity=1) exists in the keyword frequency table so that the existence of any identical keyword can be identified in the subsequent step e9. Next, if the similarity is greater than or equal to 0.5, the intra-unit frequency and inter-unit share count in the keyword frequency table are updated. The following method is used to update the intra-unit frequency and inter-unit share count. The keyword item value of the data retrieved in step e5 is denoted by A, the item value of the frequency of occurrence by F, the keyword item value in the keyword frequency table by B, the intra-unit frequency by Fi, and the inter-unit share count by Fe. When the similarity between keywords A and B is S, the value of the intra-unit frequency in the keyword frequency table is updated to Fi+S×F, and the inter-unit share count is updated to Fe +S. For example, consider the case in which the data extracted in step e5 is (Keyword, Similarity)=(米朝高官会議, 2.63) and update operations are performed on the keyword frequency table shown in Table 18 below. Note, however, that the numeric values used in this example are not calculated from actual data, but are given only for explanation purposes.

TABLE 18

| Keyword | Intra-unit frequency | Inter-unit share count |
| --- | --- | --- |
| 電動茶 | 2.32 | 1.87 |
| 京都府茶協同組合 | 1.67 | 0 |
| 米朝高官協議 | 4.15 | 2.71 |
| 米朝高官会議 | 3.34 | 2.68 |
| . | . | . |
| . | . | . |
| . | . | . |

In Table 18, the keywords having a similarity of 0.5 or greater with respect to "米朝高官会議" are "米朝高官協議" and "米朝高官会議". The similarity between "米朝高官 泉佐野 協議" is 0.67, and the similarity between "米朝高官会議" and "米朝高官会議" is 0.83 (fractions rounded off to two decimal places). As a result, (Keyword, Intra-unit frequency, Inter-unit share count)={(米朝高官協議, 4.15, 2.71), (米朝高官会議, 3.34, 2.68)} in the keyword frequency table shown in Table 18 are updated to {(米朝高官協議, 4.15+0.67×2.63, 2.71+0.67), (米朝高官会議, 3.34+0.83×2.63, 2.68+0.83)}.

In the present embodiment, of the keywords in the keyword frequency table, only the keywords having a similarity of 0.5 or greater with respect to the data retrieved in step e5 are updated, but other criteria may be used. Update operations are performed on keywords having a similarity of 0.5 or greater in order to reduce the number of update operations. When step e8 is called for the first time after initiating the flowchart of FIG. 17, the keyword frequency table is empty, so that the process proceeds to step e9 without performing any operations in step e8.

In step e9, it is judged whether any keyword identical to the keyword retrieved in step e7 has been found in the keyword frequency table during the updating of the keyword frequency table in step e8. If any identical keyword has been found, the process returns to step e5; otherwise, the process proceeds to step e10.

In step e10, the data retrieved in step e5 is temporarily stored in a storage area such as a stack. This stack is a different stack from the one used in step e4.

In step e11, the data stored in a storage area such as a stack are retrieved one by one and added to the keyword frequency table. The processing performed when adding each data to the keyword frequency table is the same as that performed in step a9 in the embodiment of the first invention. Further, in step e11, the retrieved data is deleted from the storage area. Therefore, each time this step is completed, the stack becomes emptied of all data stored in step e10.

In step e12, the identifier identifying the unit of the data retrieved in step e5 is substituted into the variable Bid.

In step e13, the same processing as in step e11 is performed.

In step e14, the same processing as in step a10 in the embodiment of the first invention is performed, though it is different in that the values of the keyword frequency of occurrence, intra-unit frequency, and inter-unit share count are not integers but real numbers having fractional parts.

Next, one embodiment of the sixth invention will be described with reference to drawings.

Figure 18:
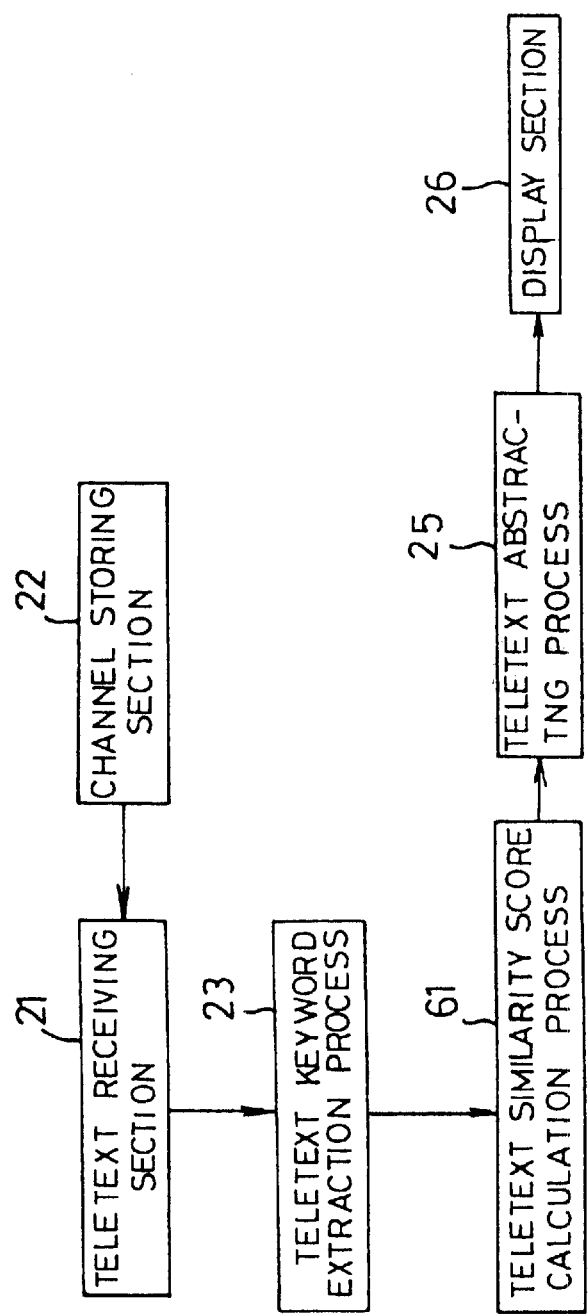
FIG. 18 is a diagram showing the system configuration for a teletext broadcast receiving apparatus according to one embodiment of the sixth invention.

As one embodiment of the sixth invention, a teletext broadcast receiving apparatus equipped with an information abstracting function is shown. FIG. 18 is a diagram showing the system configuration for the embodiment of the sixth invention. Some of the constituent parts in FIG. 18 are the same as those shown in the configurational example of the embodiment of the second invention; therefore, the same constituent parts are designated by the same reference numerals and detailed explanation of such parts will not be given here. In FIG. 18, reference numeral 61 is a teletext similarity score calculating section for calculating similarity between the keywords extracted by the teletext keyword extracting section 23.

The hardware configuration for implementing the above-configured system is the same as the hardware configuration of the embodiment of the second invention shown in FIG. 8. Therefore detailed explanation will not be given here.

Figure 19:
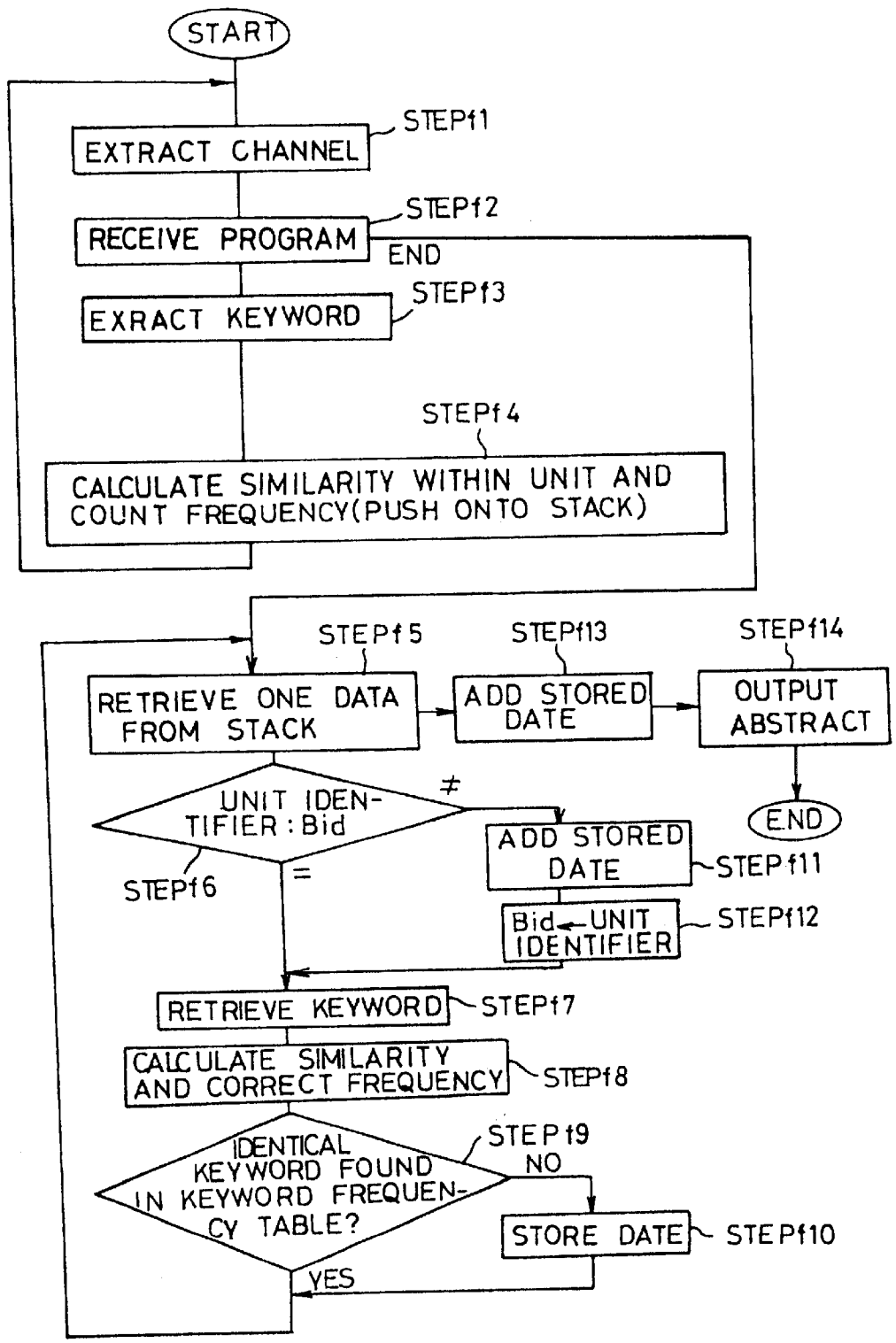
FIG. 19 is a flowchart showing an operating procedure for the teletext broadcast receiving apparatus according to the same embodiment.

The operation of the thus configured teletext broadcast receiving apparatus equipped with an information abstracting function wherein similarity between keywords is considered will be described below with reference to the flowchart shown in FIG. 19.

In steps f1 to f3, the same processing as in steps b1 to b3 in the embodiment of the second invention is performed.

Steps f4 to f13 are performed in the teletext similarity score calculating section 61.

The processing in steps f4 to f13 is the same as that in steps e4 to e13 performed in the embodiment of the fifth invention, except that the item names of the keyword frequency table are the same as that used in the embodiment of the second invention, and that the same processing as performed on the intra-unit frequency in the fifth invention is performed on the intra-program frequency and the same processing as performed on the inter-unit share count is performed on the inter-program share count.

In step f14, the same processing as in b10 in the embodiment of the second invention is performed, the only difference being that the values of the keyword frequency of occurrence, intra-unit frequency, and inter-unit share count are not integers but real numbers having fractional parts.

Next, one embodiment of the seventh invention will be described with reference to drawings.

Figure 20:
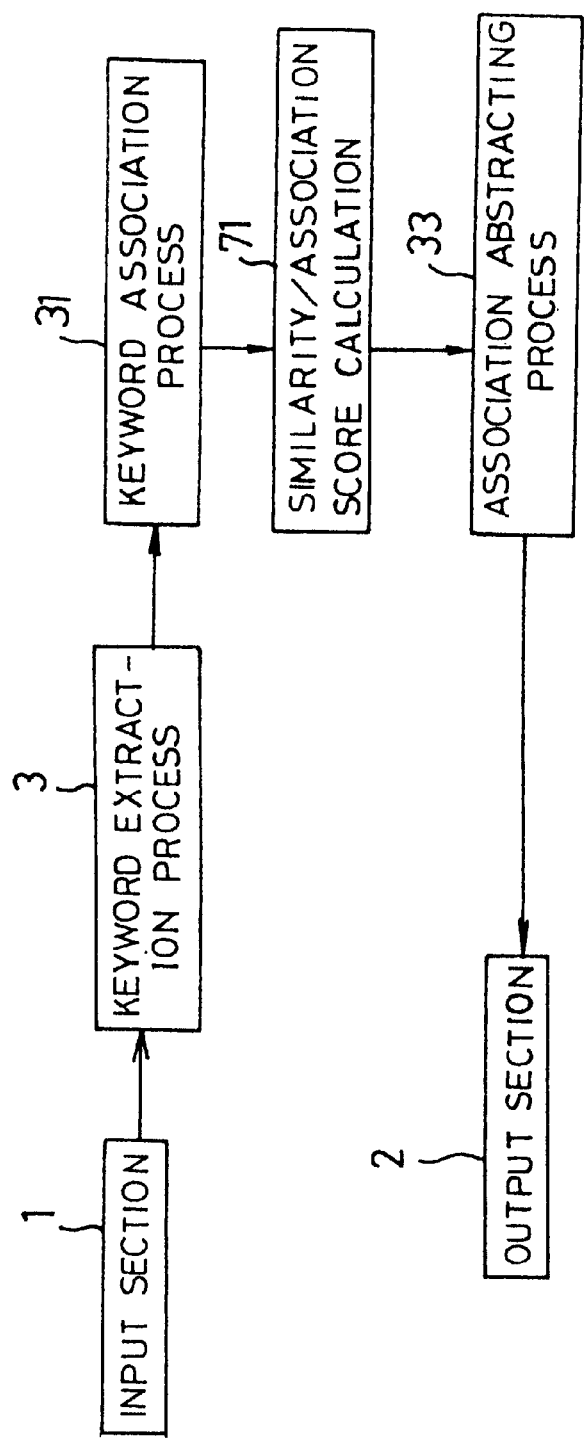
FIG. 20 is a block diagram showing the system configuration for an information abstracting method and an information abstracting apparatus according to one embodiment of the seventh invention.

As one embodiment of the seventh invention, an information abstracting method and an information abstracting apparatus are shown in which both keyword similarity and keyword association are considered in abstracting information. FIG. 20 is a diagram showing the system configuration for the embodiment of the seventh invention. Some of the constituent parts in FIG. 20 are the same as those shown in the configurational example of the embodiment of the third invention; therefore, the same constituent parts are designated by the same reference numerals and detailed explanation of such parts will not be given here. In FIG. 20, reference numeral 71 is a similarity/association score calculating section for calculating similarity between keywords on the basis of a plurality of factors including association between keywords.

The hardware configuration for implementing the above-configured system is the same as the hardware configuration of the embodiment of the first invention shown in FIG. 2. Therefore detailed explanation will not be given here.

Figure 21:
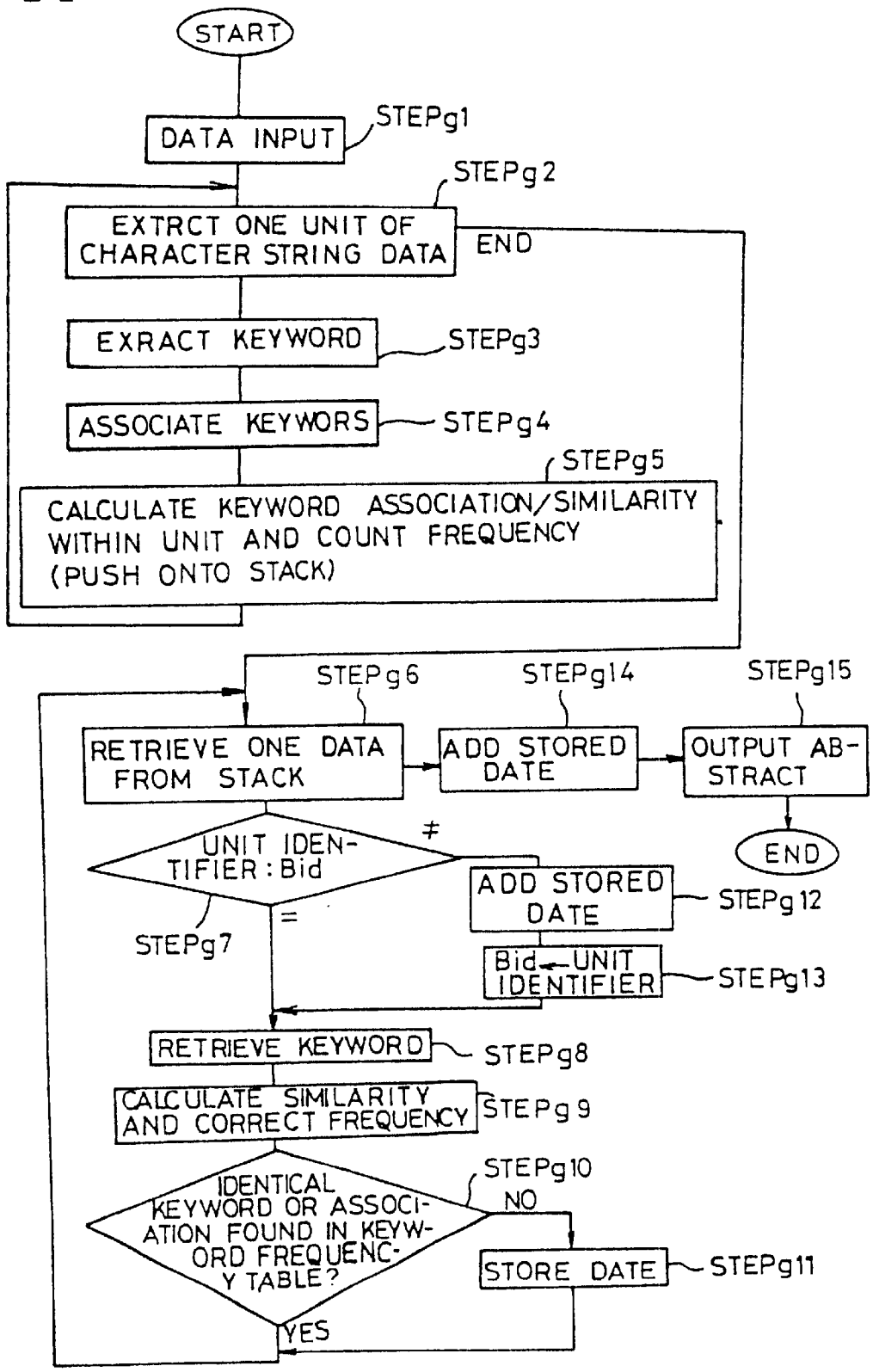
FIG. 21 is a flowchart showing an operating procedure for the information abstracting method and information abstracting apparatus according to the same embodiment.

The operation of the thus configured information abstracting apparatus and information abstracting method will be described below with reference to the flowchart shown in FIG. 21.

In steps g1 to g3, the same processing as in steps e1 to e3 in the embodiment of the fifth invention is performed.

In step g4, the same processing as in step c4 in the embodiment of the third invention is performed. However, in step c4, when one of two keywords is a subset of the other, such keywords are considered identical, but in the present embodiment, no keywords will be considered identical unless they exactly match. Of course, in this embodiment also, processing may be performed by considering two keywords to be identical when one is a subset of the other.

In step g5, the same processing as in step e4 in the embodiment of the fifth invention is performed on the keywords extracted in step g3. Of the keyword associations established in step g4, exactly matching associations are grouped together and the frequency of occurrence of each combined keyword association is set to the value equal to the number of associations thus extracted. For example, when four identical associations (泉佐野、ヘリ墜落) are extracted, these identical associations (泉佐野、ヘリ墜落) are grouped together and its frequency of occurrence is set to 4. The obtained keywords and association count results, with unit identifiers attached to them, are stored (pushed) onto a FILO (first-in-first out) stack, the keywords first. The method of attaching identifiers identifying units and the reason for attaching the identifiers are the same as described in connection with step e4 in the embodiment of the fifth invention. Keyword associations are stored first, because, when reading data from the stack in the subsequent step g6, the keyword associations are retrieved first and then the keywords are retrieved so that the first retrieved associations can be used when calculating keyword similarity.

In step g5, similarity between associations may also be calculated for two keyword associations (K1, K2) and (L1, L2) containing nonidentical keywords, and based on the similarity thus calculated, the frequency of occurrence may be updated. To calculate the similarity between such keyword associations, the similarity between K1 and L2 and the similarity between K2 and L2 are calculated in the same manner as in step e4 in the embodiment of the fifth invention, and the average is taken between the two calculated results. Further, the similarity between K1 and L2 and the similarity between K2 and L1 are calculated, and if the average between them is larger, then this average value is taken as the similarity between the keyword associations. For example, the similarity between associations (米朝高官 会議, 核問題) and (協議 核問題, 討議) can be obtained by calculating the similarity, 0.83, between "米朝高官 会議" and "協議" and the similarity, 0.75, between "核問題" and "核問題 討議" and by calculating the average as (0.83+0.75)/2=0.79 (fractions rounded off to two decimal places). Once the similarity between associations is calculated, the same processing as performed in step e4 is performed on the keywords. Denoting the similarity calculated between two associations A and B by S, {S×(frequency of occurrence of B)} is added to the frequency of occurrence of A, and {S×(frequency of occurrence of A)} is added to the frequency of occurrence of B. Suppose, for example, that before calculating the similarity, the frequency of occurrence of the association (米朝高官 会議, 核問題) was 3 and that of the association (米朝高官 協議 核問題 討議) was 5. Then, using the similarity 0.79, the occurrence of frequency of (米朝高官 会議, 核問題) is calculated as 3+5×0.79=6.95, and the occurrence of frequency of (米朝高官 協議, 核問題 討議) is calculated as 5+3×0.79=7.37. Such association similarity is calculated for every combination of keywords extracted in step e3. To reduce the calculation time, one method that can be considered is by calculating similarity only for keyword combinations in which more than half the number of characters match between them.

In steps g6 to g8, the same processing as in steps e5 to e7 in the embodiment of the fifth invention is performed, the only difference being that the processing performed on keywords in the fifth invention is also performed on keyword associations.

In step g9, different processing is performed when the data retrieved in step g6 is a keyword than when it is a keyword association. When the retrieved data is a keyword association, the same processing as in step e8 in the embodiment of the fifth invention is performed; in step g9, however, the similarity between associations is calculated and, based on that, the intra-unit frequency and the inter-unit share count of the association are calculated and updated, which is different from step e8 where the similarity between keywords was calculated and, based on that, the intra-unit frequency and the inter-unit share count were calculated. The similarity between associations is calculated in the same manner as described in connection with step g5.

When the data retrieved in step g6 is a keyword, the inter-unit share count is calculated and updated on the basis of macro similarity calculated by taking into account not only the similarity of the keyword but also the similarity of keywords associated with that keyword. The intra-unit frequency is updated in the same manner as in step e8 in the embodiment of the fifth invention, that is, on the basis of the similarity between keywords. To calculate the inter-unit share count, keyword associations containing the keyword retrieved in step g6 are retrieved from among the data stored in step g11, and this set of associations is denoted as a set I. Next, for the keyword in the keyword frequency table, a set J of associations containing that keyword is retrieved from the keyword frequency table. Assume, for example, the keyword frequency table shown in Table 19 on page 135. Assume here that the keyword in the data retrieved in step g6 is "調印式典". Also assume that before that data was retrieved, the data stored in step g11 were as shown in Table 20 below.

TABLE 20

| Keyword or Keyword association | Frequency of occurrence | Unit identifier |
| --- | --- | --- |
| (米朝高官会談, 調印式典) | F1 | Bid1 |
| (核問題, 調印式典) | F2 | Bid1 |
| 北朝鮮 | F3 | Bid1 |

The set I then consists of {((米朝高官 会議, 調印式典), F1, Bid1), ((核問題, 調印式典), F2 Bid1)}.

The calculation of the similarity between the retrieved keyword and the keywords in the keyword frequency table and the updating of the frequency are performed in sequence on the keywords in the keyword frequency table. The following describes how the similarity with "調印式" in the keyword frequency table is calculated. Here, the set J consists of {((核問題 調印式), Fi4, Fe4), ((調印式, 米朝高官 協議), Fi5, Fe5)}. Once the sets I and J have been obtained, the keywords associated with the keyword whose similarity is to be calculated are retrieved from the respective sets, and similarity is calculated between these keywords. Since these are sets of keywords, keywords are retrieved one by one from the set I and each retrieved keyword is sequentially compared against all the keywords in the set J to calculate the similarity between them; then, the largest similarity obtained is determined as the similarity with the keyword retrieved from the set I. The similarity with each keyword in the set I is obtained in this manner, and their average is taken as the set similarity K between the sets I and J. More specifically, in the above example, { 米朝高官 会議, 核問題 } is retrieved from the set I and { 核問題, 米朝高官 協議 } from the set J; in this case, for "米朝高官 会議" in the set I, "米朝高官 協議" in the set J provides the largest similarity, which is 0.67, and for "核問題", "核問題" in the set J provides the largest similarity, which is 1.0. The average of these similarities is 0.84 (fractions rounded off to two decimal places). Therefore, the set similarity K between the set I and the set J is 0.84. The weighted sum of the set similarity K and the similarity, S=0.86, between the keywords "調印式" and "調印式典" is determined as the macro similarity between the keywords.

The weights are predetermined constants X and Y, and the macro similarity is calculated as X×K+Y×S. Once the macro similarity has been obtained, the intra-unit frequency and inter-unit share count in the keyword frequency table are updated in the same manner as described in connection with step e8 in the embodiment of the fifth invention. In the present embodiment, however, macro similarity is used instead of keyword similarity used in step e8. The result of this is that the macro similarity decreases when similar keywords are used in different topics and increases when they are used in the same topic. For example, when the keyword retrieved in step g6 was "調印式典", as previously described, if the keyword to be compared in the keyword frequency table is "仮調印式", then the set J is {ヨルダン, イスラエル}. As a result, though the similarity between "調印式典" and "仮調印式" is as high as 0.75, the similarity between the set I and the set J is 0, and therefore, the macro similarity between "調印式典" and "仮調印式" is small. That is, the value of the macro similarity shows that the keywords relate to the same thing but in different topics.

In the present embodiment, the set similarity K is calculated without using the values of the frequency of occurrence, intra-unit frequency, and inter-unit share count of the keywords contained in the sets I and J, but these values may be used in the calculation. If these values are used, the calculation will become complicated, but the macro similarity can be calculated by taking into account the degree of association between keywords (that is, the number of associations).

In steps g10 to 14, the same processing as in steps e9 to e13 in the embodiment of the fifth invention is performed, the only difference being that the processing performed on keywords in the fifth invention is also performed on keyword associations.

The processing in step g15 is the same as that in step c14 in the embodiment of the third invention, except that the values of the frequency of occurrence, intra-unit frequency, and inter-unit share count of the keywords and keyword associations are not integers but real numbers having fractional parts.

In this invention, as in the third and fourth inventions, a method may be considered that uses only keyword associations or that uses only inter-unit share counts. In particular, a method that does not use keywords but uses only keyword associations and that does not use intra-unit frequencies but uses only inter-unit share counts, will be described below, focusing only on differences from the steps described in the above embodiment of this invention.

First, in step g5, the processing on keywords is not performed, but only the processing on keyword associations is performed. Further, in the processing performed between associations, the calculation of similarity and the processing relating to the frequency of occurrence are also not performed. That is, keywords are not stored in the stack, but only keyword associations are stored in the stack. Since the processing relating to the frequency of occurrence is not performed, the format of the resulting count table will be like the one shown in Table 15 described in connection with the third invention.

In steps g6 and g8, the contents of processing are fundamentally the same as previously described, the only difference being that the data retrieved in step g6 is always a keyword association since no keywords are retrieved.

In step g9, since the data retrieved in step g6 is always a keyword association, the processing performed when the data retrieved in step g6 is a keyword is not necessary. Therefore, only the processing performed when the data is a keyword association is performed. As a result, the macro similarity calculation used to calculate similarity between keywords is also not necessary. Further, as described in connection with the embodiment of the third invention, since abstracting is performed based only on the inter-unit share count, the format of the keyword frequency table will be like the one shown in Table 16, and in the processing of step g9, only the processing on the inter-unit share count is performed, omitting the processing on the intra-unit frequency.

In step g15, keywords can be selected in the same manner as the processing performed on Table 16 described in connection with the embodiment of the third invention, the only difference being that the values of the inter-unit share counts are real numbers.

Next, one embodiment of the eighth invention will be described with reference to drawings.

Figure 22:
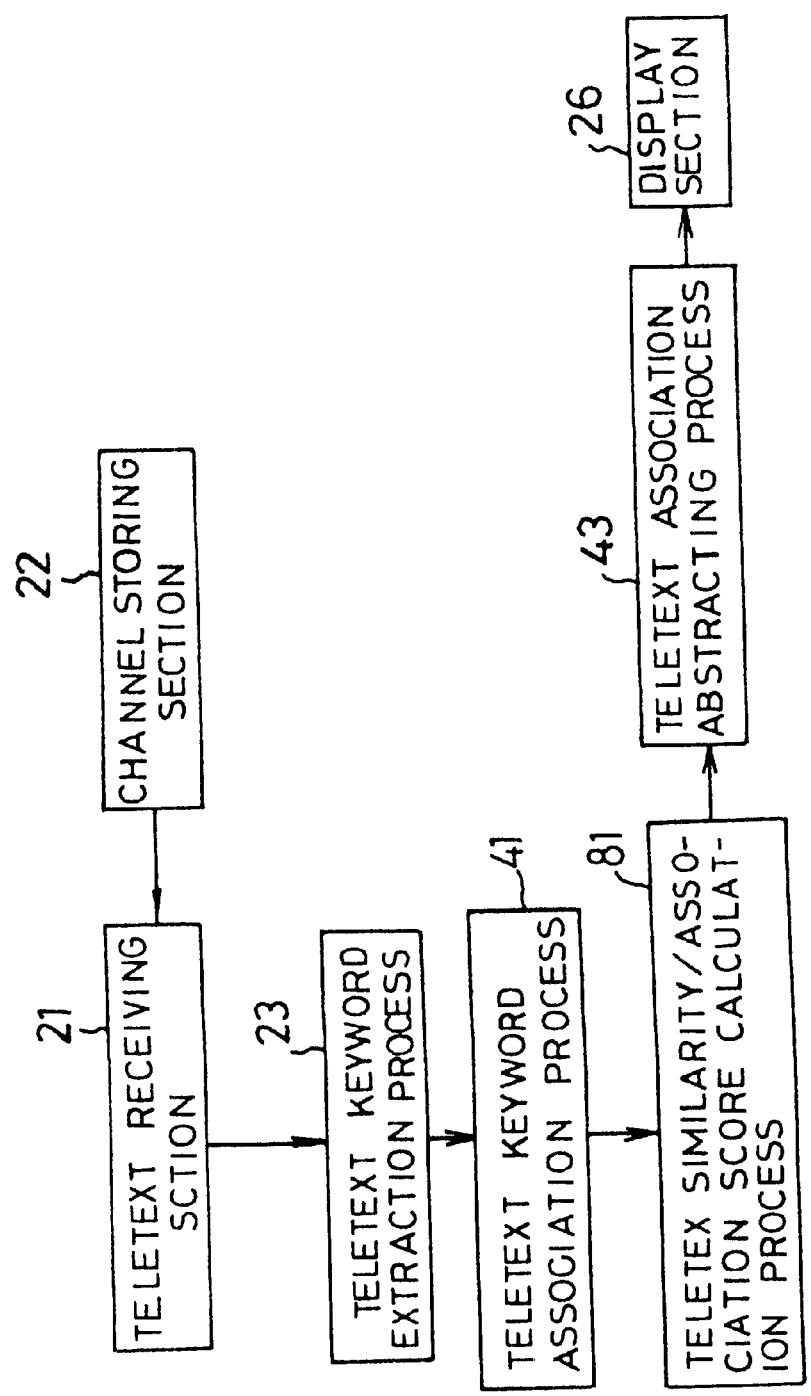
FIG. 22 is a diagram showing the system configuration for a teletext broadcast receiving apparatus according to one embodiment of the eighth invention.

As one embodiment of the eighth invention, a teletext broadcast receiving apparatus equipped with an information abstracting function is shown. FIG. 22 is a diagram showing the system configuration for the embodiment of the eighth invention. Some of the constituent parts in FIG. 22 are the same as those shown in the configurational example of the embodiment of the fourth invention; therefore, the same constituent parts are designated by the same reference numerals and detailed explanation of such parts will not be given here. In FIG. 22, reference numeral 81 is a teletext similarity/association score calculating section for calculating a score for each keyword extracted by the teletext keyword extracting section 23, by taking similarity into account.

The hardware configuration for implementing the above-configured system is the same as the hardware configuration of the embodiment of the second invention shown in FIG. 8. Therefore detailed explanation will not be given here.

Figure 23:
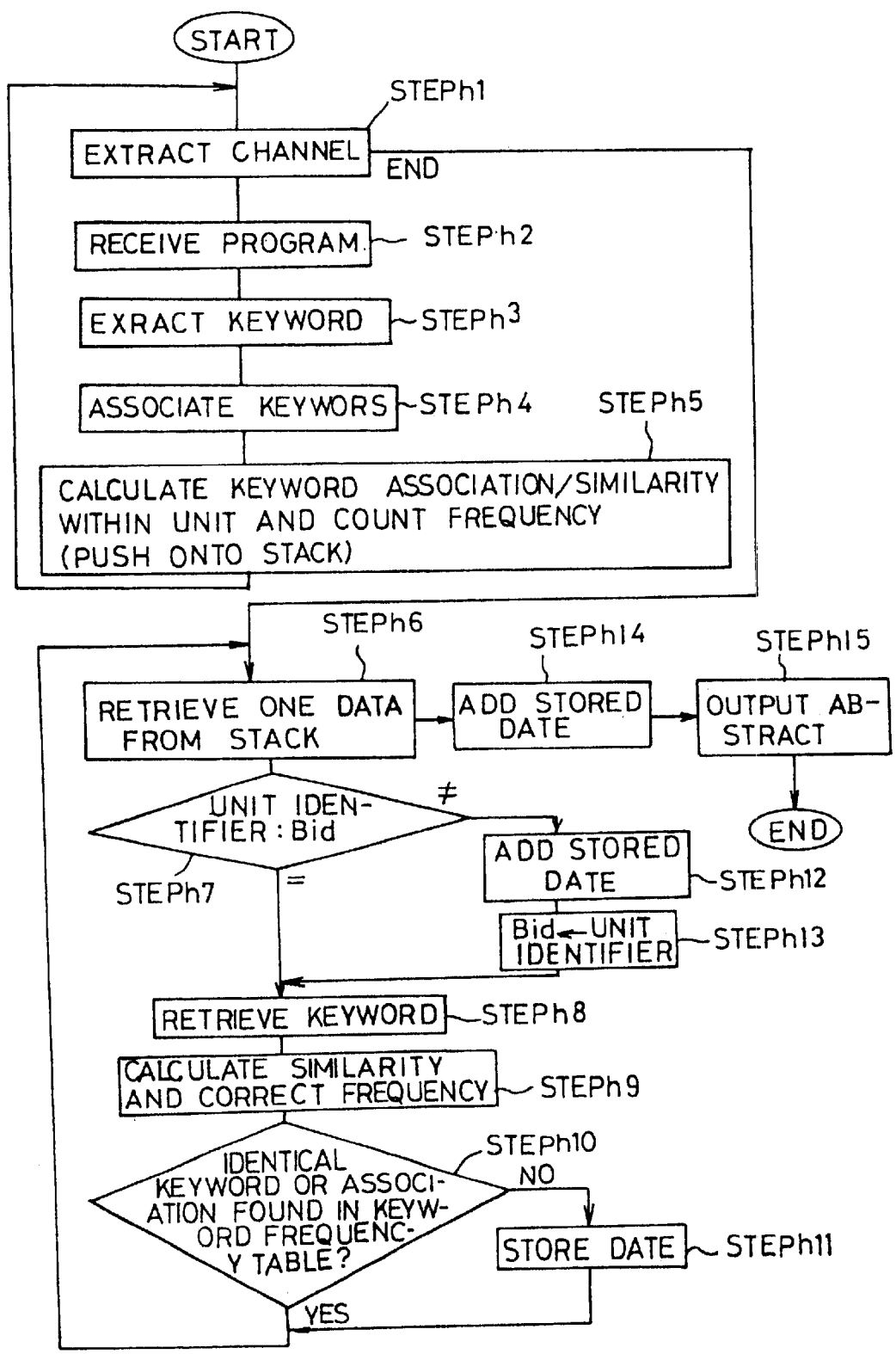
FIG. 23 is a flowchart showing an operating procedure for the teletext broadcast receiving apparatus according to the same embodiment.

The operation of the thus configured teletext broadcast receiving apparatus equipped with an information abstracting function wherein similarity between keywords is considered will be described below with reference to the flowchart shown in FIG. 23.

In steps h1 to h2, the same processing as in steps b1 to b2 in the embodiment of the second invention is performed.

Steps h3 to h14 are performed in the teletext similarity/association score calculating section 81.

The processing in steps h3 to h14 is the same as that performed in steps g3 to g14 in the embodiment of the seventh invention, except that the item names of the keyword frequency table are different, that is, the intra-unit frequency and inter-unit share count are replaced by the intra-program frequency and inter-program share count, respectively. However, the processing is fundamentally the same, and the same processing as performed on the intra-unit frequency in the seventh invention is performed on the intra-program frequency and the same processing as performed on the inter-unit share count is performed on the inter-program share count. In step h15, the same processing as in step g15 in the embodiment of the seventh invention is performed, except that the results are output to the display section 26, instead of the output section 2.

In this invention, as in the seventh invention, a method may be considered that selects keywords based only on the inter-unit share count or on keyword associations. Such a method can be implemented fundamentally by the same process as described in connection with the seventh invention, and therefore, detailed explanation will not be given here.

Next, one embodiment of the ninth invention will be described with reference to drawings.

Figure 24:
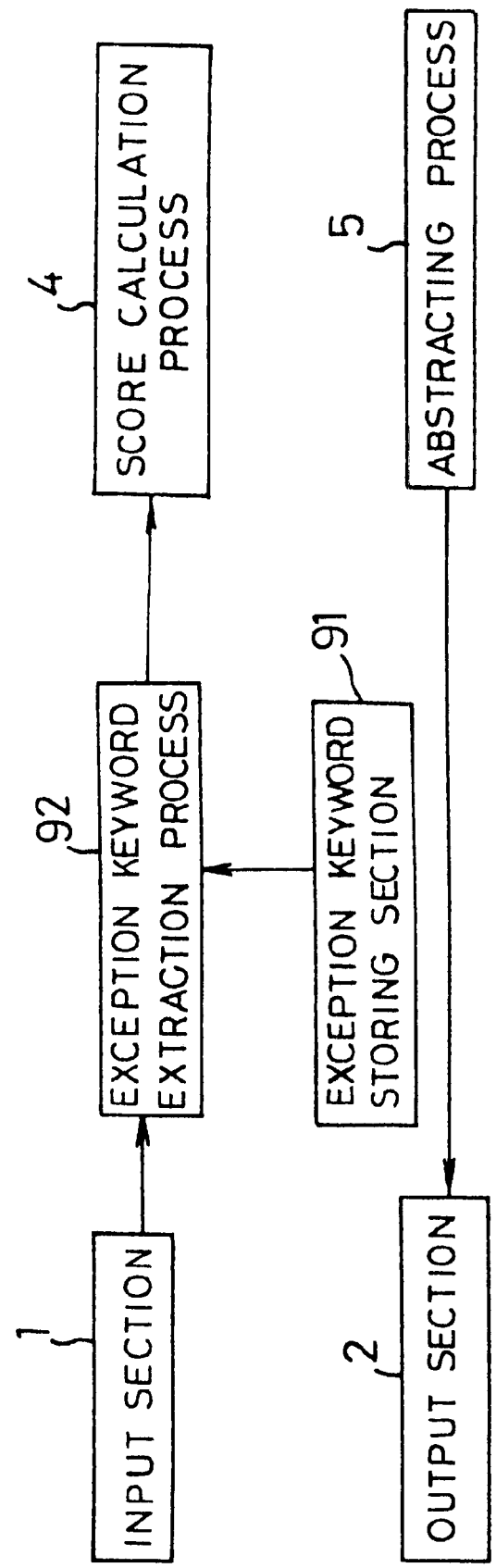
FIG. 24 is a block diagram showing the system configuration for an information abstracting method and an information abstracting apparatus according to one embodiment of the ninth invention.

As one embodiment of the ninth invention, an information abstracting method and an information abstracting apparatus are shown wherein exception keywords that cannot be used as keywords are considered. FIG. 24 is a diagram showing the system configuration for the embodiment of the ninth invention. Some of the constituent parts in FIG. 24 are the same as those shown in the configurational example of the embodiment of the first invention; therefore, the same constituent parts are designated by the same reference numerals and detailed explanation of such parts will not be given here. In FIG. 24, reference numeral 91 is an exception keyword storing section for storing keywords which are not treated as keywords, and 92 is an exception keyword extracting section for extracting keywords by reference to the keywords stored in the exception keyword storing section 91.

Figure 25:
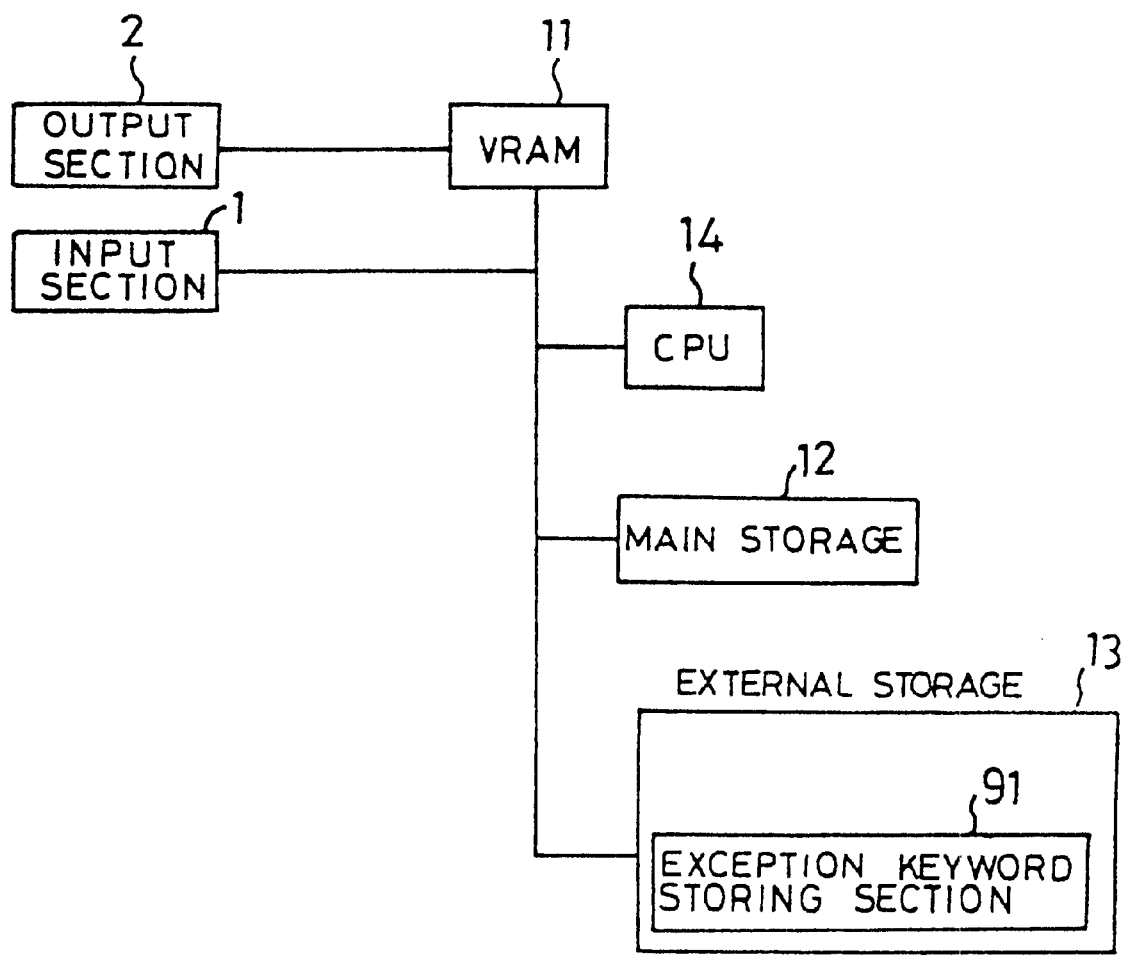
FIG. 25 is a diagram showing an example of the hardware configuration of the same embodiment.

A hardware configuration for implementing the thus-configured system is shown in FIG. 25. The hardware configuration shown in FIG. 25 consists of the constituent parts of the hardware configuration shown as one embodiment of the first invention, plus the constituent parts of the system configuration shown in FIG. 24; therefore, the same constituent parts are designated by the same reference numerals and detailed explanation of such parts will not be given here.

Figure 3:
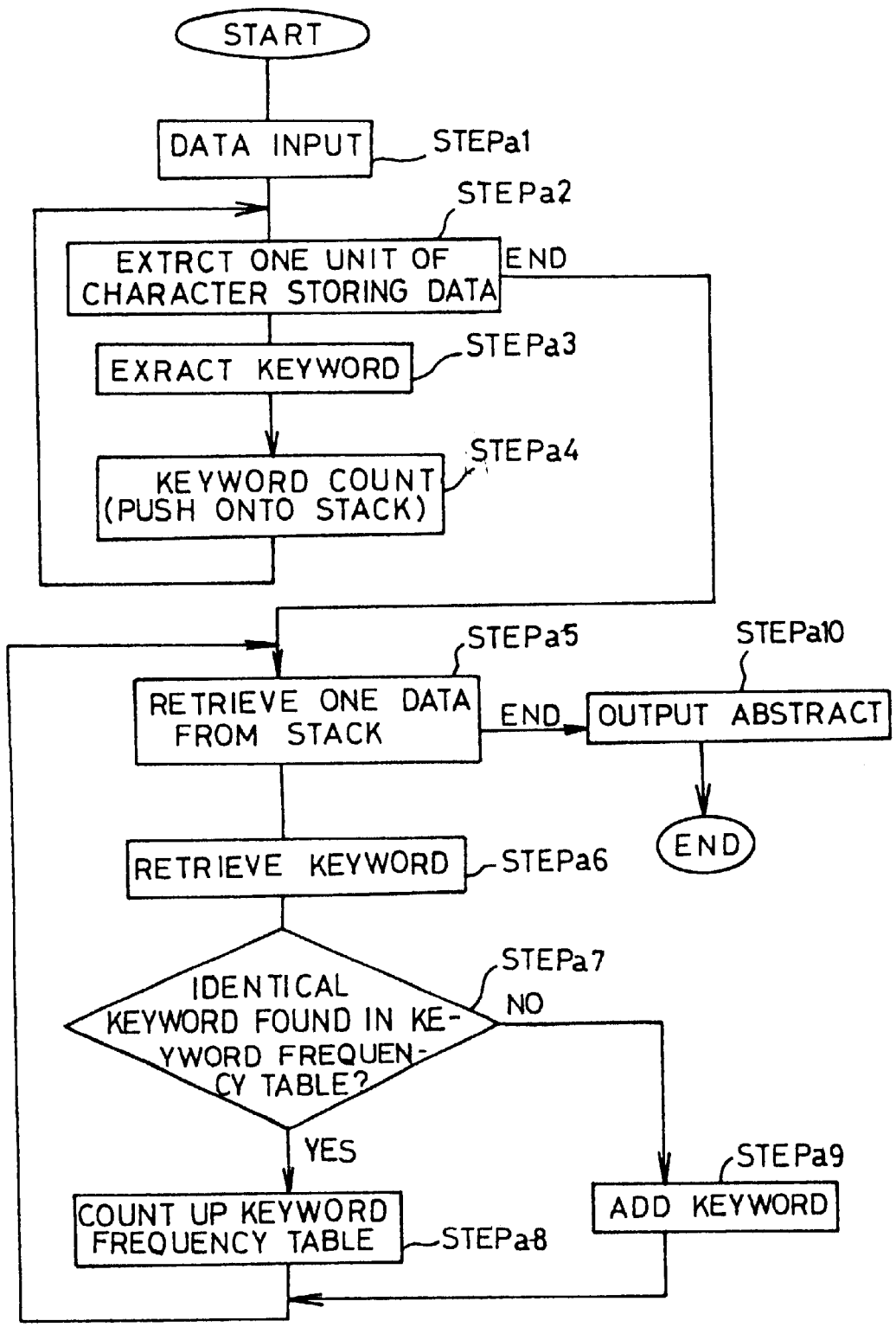
FIG. 3 is a flowchart showing an operating procedure for the information abstracting method and information abstracting apparatus according to the same embodiment.
Figure 26:
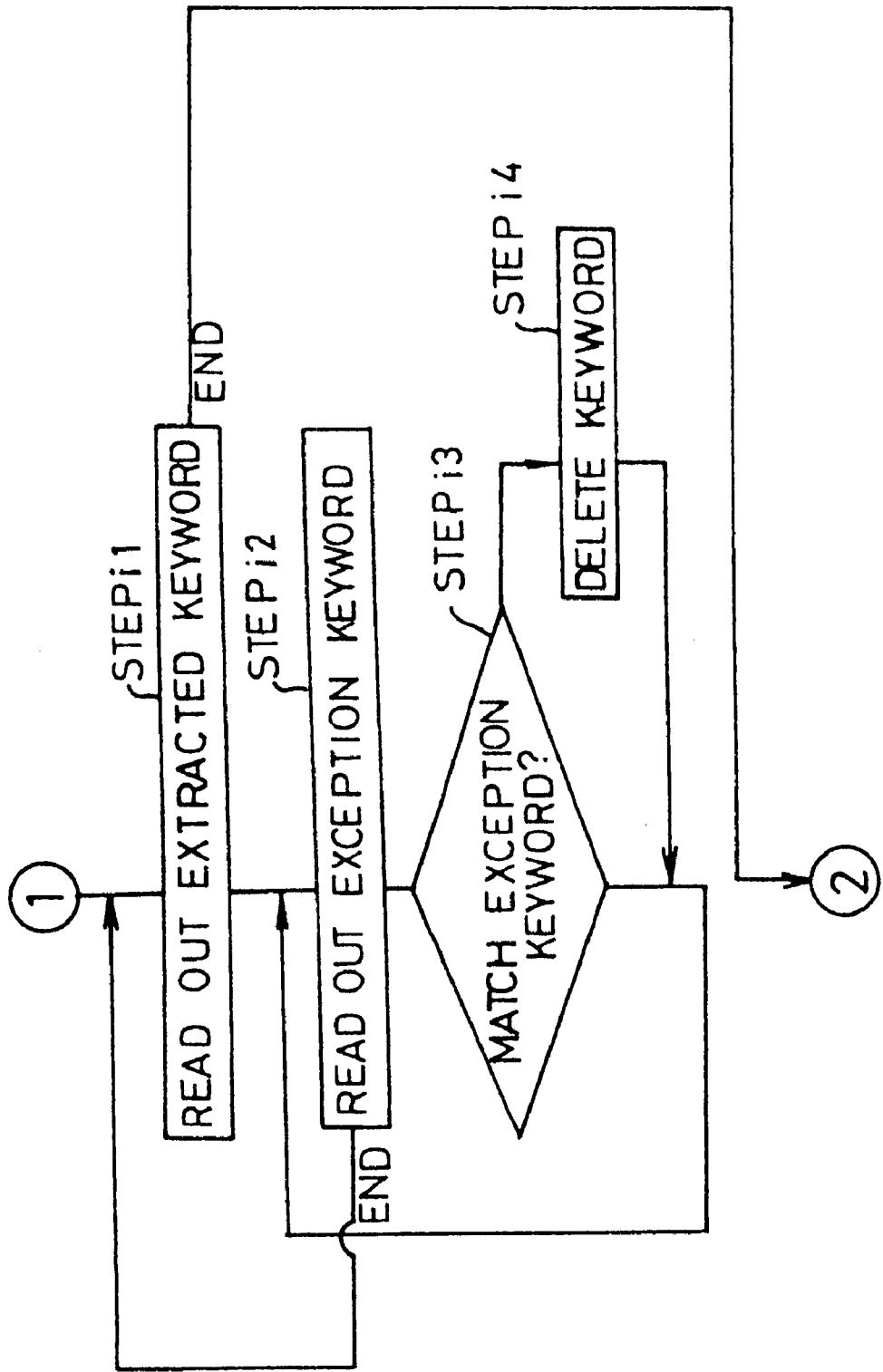
FIG. 26 is a flowchart showing an operating procedure for the information abstracting method and information abstracting apparatus according to the same embodiment.

The flowchart illustrating the operation of the above-configured information abstracting apparatus and information abstracting method is the same as the flowchart shown in FIG. 3 illustrating the operation of the embodiment of the first invention, except that the steps shown in the flowchart of FIG. 26 are inserted between the steps a3 and a4 in the flowchart of FIG. 3. Therefore, only the steps shown in FIG. 26 will be described here. Also note that in this embodiment, step a3 is performed in the exception keyword extracting section 92.

In step i1, the keywords extracted in step a3 are sequentially read out, one keyword each time step i1 is executed. This step is repeated called until all the keywords extracted in step a3 have been read out. When there are no keywords left to be read out, the END branch in the flowchart of FIG. 26 is followed. In this step, data are only read out sequentially but are not deleted. Step i1 is performed in the exception keyword extracting section 92.

In step i2, the keywords stored in the exception keyword storing section 91 are read out one at a time. In the exception keyword storing section 91, keywords that are not treated as keywords are prestored as shown in Table 21 below.

TABLE 21

| Exception keywords |
| --- |
| a |
| the |
| into |
| according |
| . |
| . |
| . |

As this step is executed, the process proceeds to read the next keyword from the exception keyword storing section 91. For example, when this step is executed for the first time, "a" is read out of Table 21, and when the step is executed the next time, "the" is read out. The read operation is repeated in this manner until all data have been read out. In that case, the END branch in the flowchart of FIG. 26 is followed.

In step i3, the keyword read out in step i1 is compared with the keyword read out in step i2. If they match as the result of the comparison, the process proceeds to step i4; otherwise, the process returns to step i2.

In step i4, the keyword read out in step i1 is deleted from among the keywords extracted in step a3. The deleted keyword is thus excluded from the processing in step a4 and subsequent steps.

Figure 29:
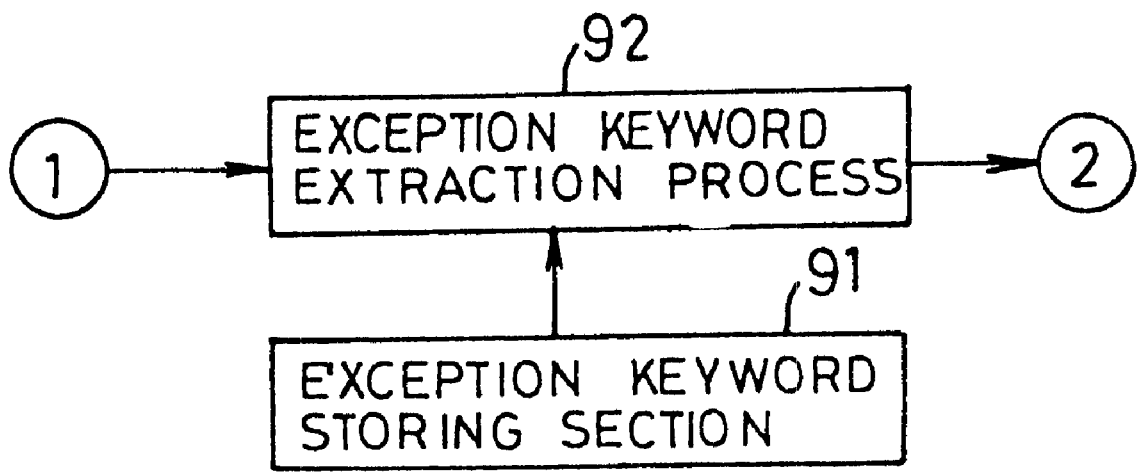
FIG. 29 is a diagram showing a portion of the system configuration according to second, third, and fourth embodiments of the ninth invention.

Next, as a second embodiment of the ninth invention, a system configuration is shown which is fundamentally the same as the system configuration of one embodiment of the third invention shown in FIG. 10, except that the keyword extracting section 3 is replaced by the configuration shown in FIG. 29. In this configuration, the input section 1 is connected to the terminal 1 in FIG. 29, and the terminal 2 in FIG. 29 is connected to the keyword associating section 31. The operation of this embodiment comprises the steps shown in the flowchart of FIG. 11, with the steps in FIG. 26 inserted between the steps c3 and c4 in FIG. 11. These additional steps have already been explained and detailed explanation will not be given here. The hardware configuration is the same as that of the first embodiment shown in FIG. 25.

Next, as a third embodiment of the ninth invention, a system configuration is shown which is fundamentally the same as the system configuration of one embodiment of the fifth invention shown in FIG. 16, except that the keyword extracting section 3 is replaced by the configuration shown in FIG. 29. In this configuration, the input section 1 is connected to the terminal 1 in FIG. 29, and the terminal 2 in FIG. 29 is connected to the similarity score calculating section 51. The operation of this embodiment comprises the steps shown in the flowchart of FIG. 17, with the steps in FIG. 26 inserted between the steps e3 and e4 in FIG. 17. These additional steps have already been explained and detailed explanation will not be given here. The hardware configuration is the same as that of the first embodiment shown in FIG. 25.

Next, as a fourth embodiment of the ninth invention, a system configuration is shown which is fundamentally the same as the system configuration of one embodiment of the seventh invention shown in FIG. 20, except that the keyword extracting section 3 is replaced by the configuration shown in FIG. 29. In this configuration, the input section 1 is connected to the terminal 1 in FIG. 29, and the terminal 2 in FIG. 29 is connected to the keyword associating section 31. The operation of this embodiment comprises the steps shown in the flowchart of FIG. 21, with the steps in FIG. 26 inserted between the steps g3 and g4 in FIG. 21. These additional steps have already been explained and detailed explanation will not be given here. The hardware configuration is the same as that of the first embodiment shown in FIG. 25.

Next, one embodiment of the 10th invention will be described with reference to drawings.

Figure 27:
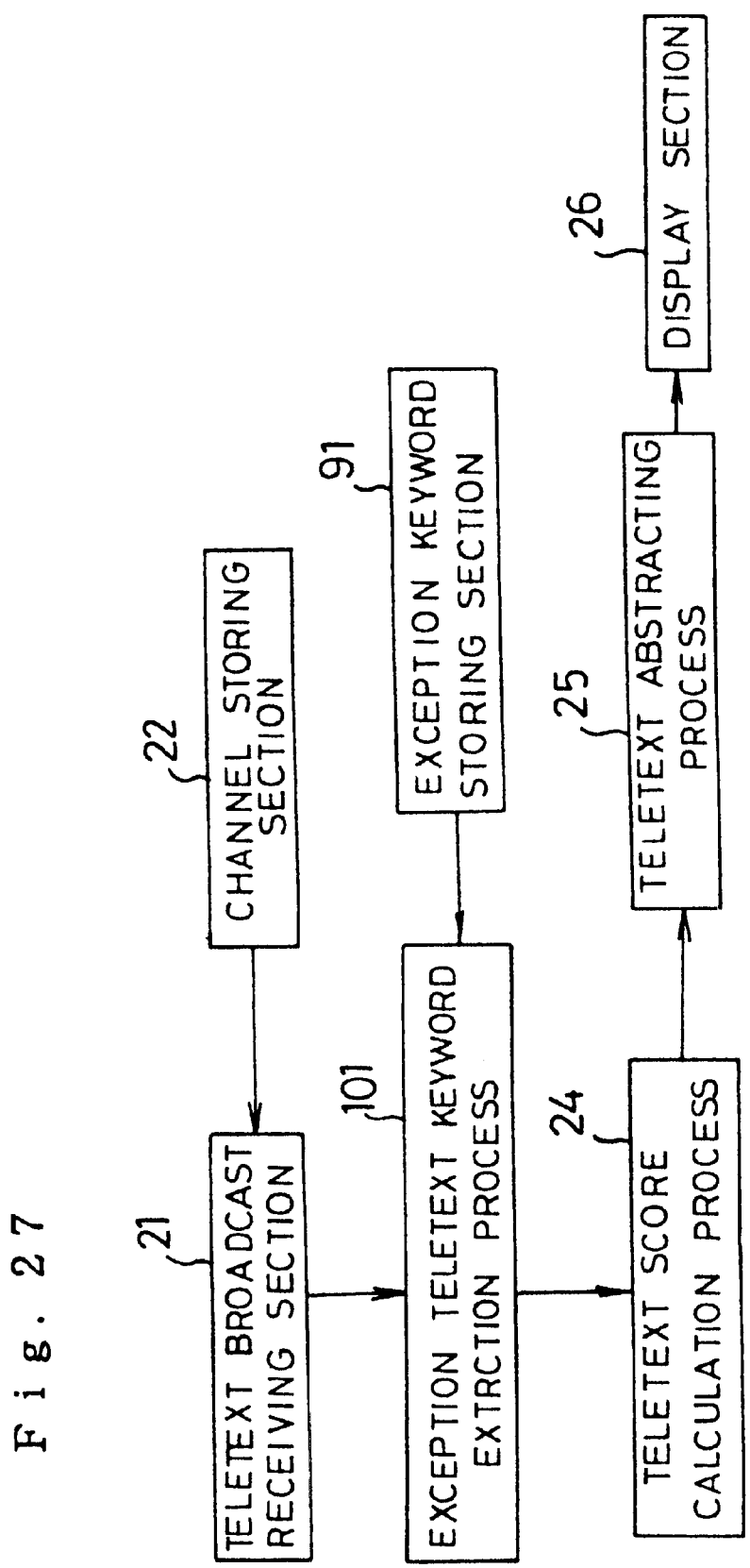
FIG. 27 is a diagram showing the system configuration for a teletext broadcast receiving apparatus according to one embodiment of the 10th invention.

As one embodiment of the 10th invention, a teletext broadcast receiving apparatus is shown wherein exception keywords that cannot be used as keywords are considered. FIG. 27 is a diagram showing the system configuration for the embodiment of the 10th invention. FIG. 27 includes the same constituent parts as those shown in the configurational example of the embodiment of the second invention and in the first embodiment of the ninth invention; therefore, the same constituent parts are designated by the same reference numerals and detailed explanation of such parts will not be given here. In FIG. 27, reference numeral 101 is an exception teletext keyword extracting section for extracting keywords from a received teletext program by reference to the keywords stored in the exception keyword storing section 91.

Figure 28:
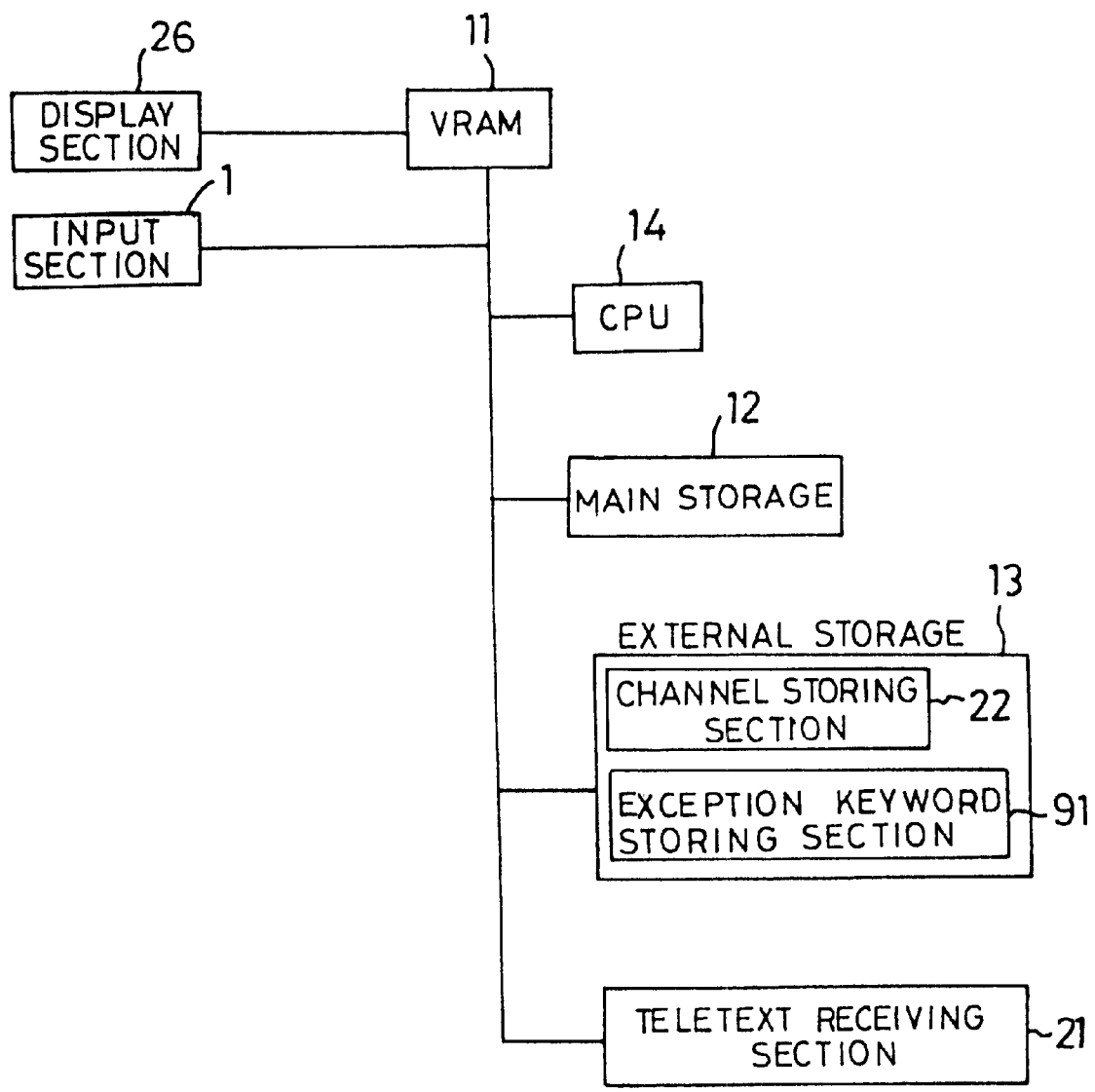
FIG. 28 is a diagram showing an example of the hardware configuration of the same embodiment.

A hardware configuration for implementing the thus-configured system is shown in FIG. 28. The hardware configuration shown in FIG. 28 consists of the constituent parts of the hardware configuration shown as one embodiment of the second invention, plus the constituent parts of the system configuration shown in FIG. 27; therefore, the same constituent parts are designated by the same reference numerals and detailed explanation of such parts will not be given here.

Figure 9:
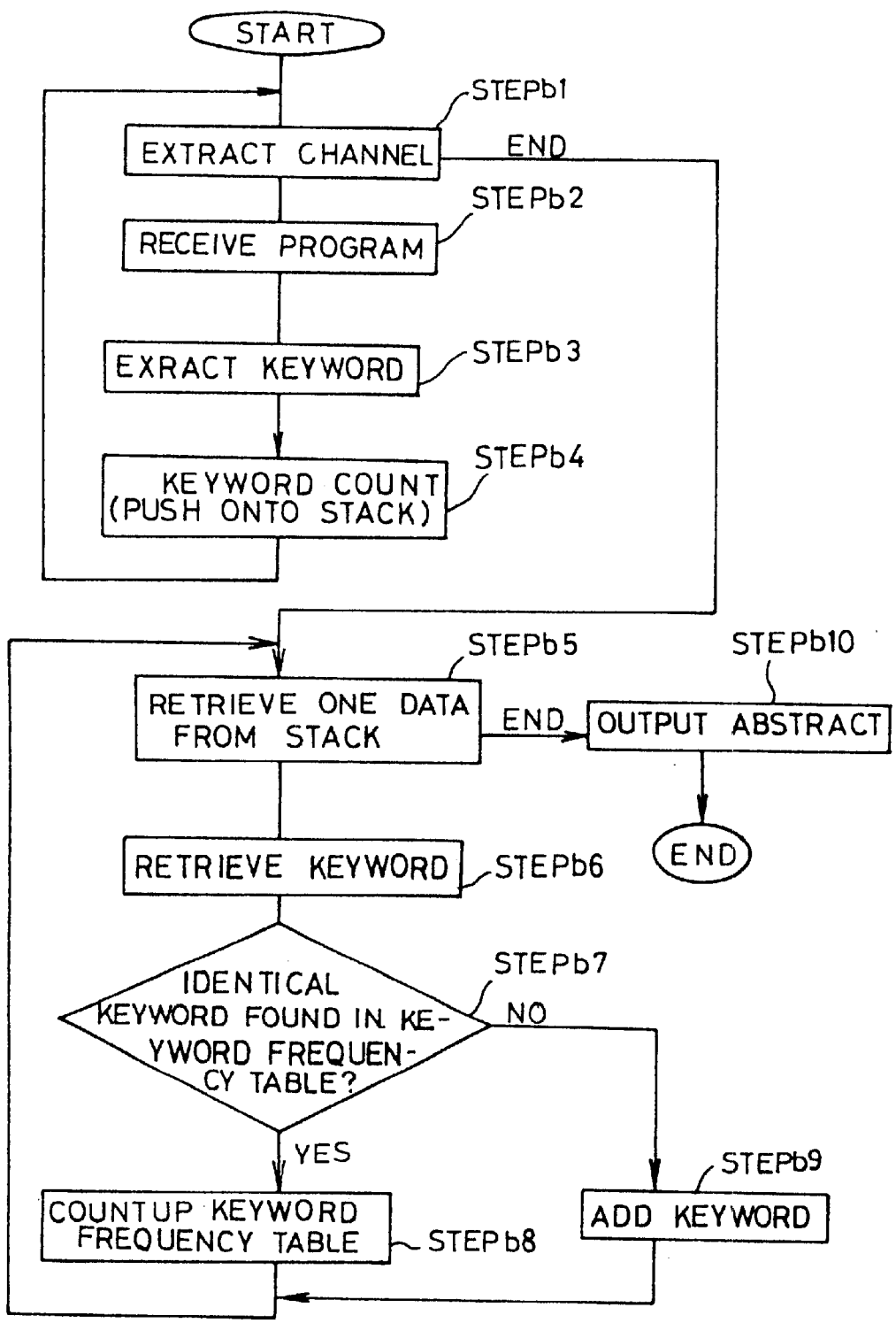
FIG. 9 is a flowchart showing an operating procedure for the teletext broadcast receiving apparatus according to the same embodiment.

The flowchart illustrating the operation of the above-configured information abstracting apparatus and information abstracting method is the same as the flowchart shown in FIG. 9 illustrating the operation of the embodiment of the second invention, except that the steps shown in the flowchart of FIG. 26 are inserted between the steps b3 and b4 in the flowchart of FIG. 9. All the steps involved have already been explained and detailed explanation will not be given here. Note, however, that the step b3 and the steps i1 to i4 are performed in the exception teletext keyword extracting section 101.

Figure 30:
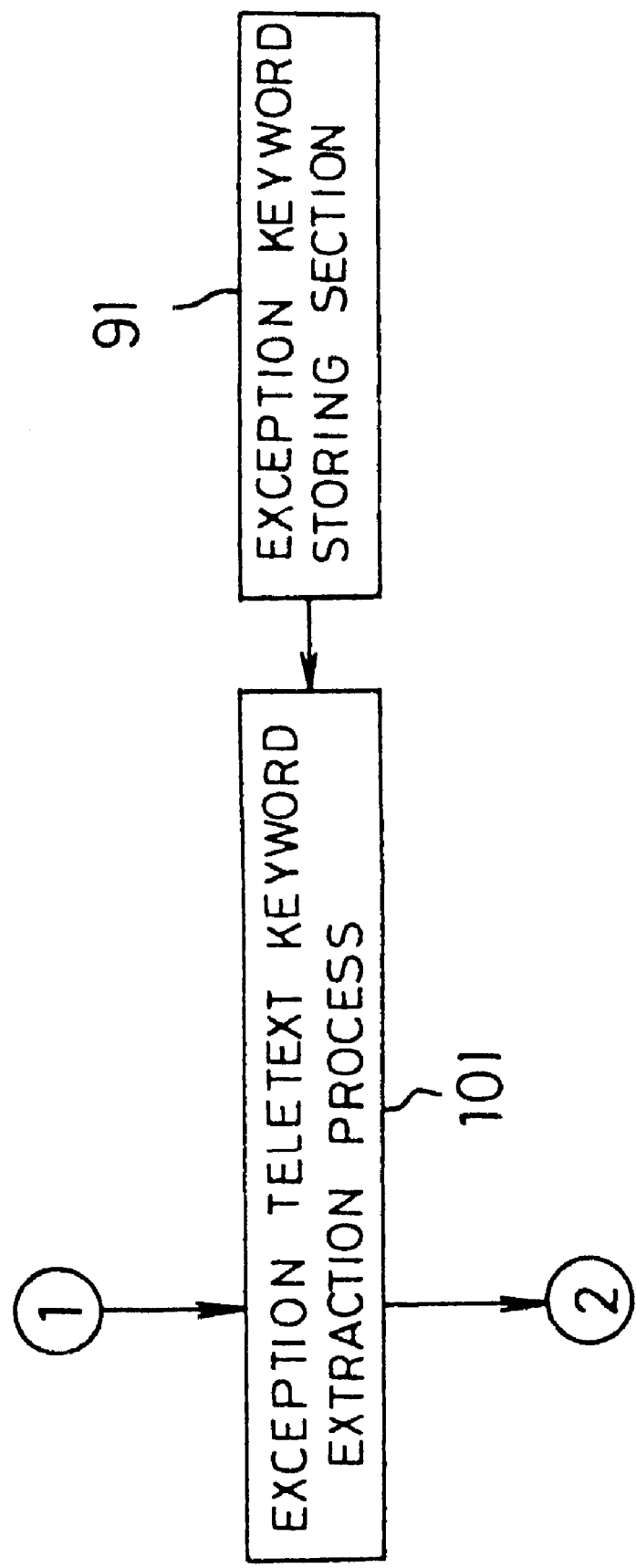
FIG. 30 is a diagram showing a portion of the system configuration according to second, third, and fourth embodiments of the 10th invention.

Next, as a second embodiment of the 10th invention, a system configuration is shown which is fundamentally the same as the system configuration of one embodiment of the fourth invention shown in FIG. 13, except that the teletext keyword extracting section 23 is replaced by the configuration shown in FIG. 30. In this configuration, the teletext broadcast receiving section 21 is connected to the terminal 1 in FIG. 30, and the terminal 2 in FIG. 30 is connected to the teletext keyword associating section 41. The operation of this embodiment comprises the steps shown in the flowchart of FIG. 14, with the steps in FIG. 26 inserted between the steps d3 and d4 in FIG. 14. These additional steps have already been explained and detailed explanation will not be given here. The hardware configuration is the same as that of the first embodiment shown in FIG. 28.

Next, as a third embodiment of the 10th invention, a system configuration is shown which is fundamentally the same as the system configuration of one embodiment of the sixth invention shown in FIG. 18, except that the teletext keyword extracting section 23 is replaced by the configuration shown in FIG. 30. In this configuration, the teletext broadcast receiving section 21 is connected to the terminal 1 in FIG. 30, and the terminal 2 in FIG. 30 is connected to the teletext similarity score calculating section 61. The operation of this embodiment comprises the steps shown in the flowchart of FIG. 19, with the steps in FIG. 26 inserted between the steps f3 and f4 in FIG. 19. These additional steps have already been explained and detailed explanation will not be given here. The hardware configuration is the same as that of the first embodiment shown in FIG. 28.

Next, as a fourth embodiment of the 10th invention, a system configuration is shown which is fundamentally the same as the system configuration of one embodiment of the eighth invention shown in FIG. 22, except that the teletext keyword extracting section 23 is replaced by the configuration shown in FIG. 30. In this configuration,. the teletext broadcast receiving section 21 is connected to the terminal 1 in FIG. 30, and the terminal 2 in FIG. 30 is connected to the teletext keyword associating section 41. The operation of this embodiment comprises the steps shown in the flowchart of FIG. 23, with the steps in FIG. 26 inserted between the steps h3 and h4 in FIG. 23. These additional steps have already been explained and detailed explanation will not be given here. The hardware configuration is the same as that of the first embodiment shown in FIG. 28.

Any of the first, third, fifth, seventh, and ninth inventions can also be applied to audio equipment, electronic mail equipment, and personal computers. The application to audio equipment is for radio text broadcasting services. In this case, a broadcast program example, from the fact that common interest groups, such as scientists in a particular field, exchange information through the Internet, using electronic mail like a bulletin board is one of the benefits of electronic mail. By applying the present invention to information exchanged within such common interest groups, information about what topics are attracting attention in a particular field can be presented in a simple format such as a combination of keywords. As electronic mail facilities further spread in computer networks, etc. in future, the number of users will increase at an explosive pace as compared to the number of users in common interest groups, and the volume of mail to bulletin board facilities like common interest groups will also increase accordingly. As a result, users will have to spend considerable time just to read through all information. The information abstracting function of the present invention will therefore prove extremely effective in such application.

When the invention is applied to personal computers, a document created by using a word processing program or the like is treated as one unit. As for the paragraph, a paragraph in a document may be used as is, but alternatively, one document may be treated as one paragraph. It is also possible to equip a personal computer with a teletext broadcast receiving function; in that case, the transmitted from a radio station is treated as a unit, and each block within a program corresponds to a paragraph; for example, in the case of a news program, the end of an article corresponds to the end of a paragraph. Audio equipment of this type includes, for example, car audio equipment, which can be used to view an abstract of news provided by radio text service while listening to music. In the case of conventional audio equipment, if the user wants to get information about news, he has to stop listening to a music program or the like and tune in to a news program; by contrast, with radio text services, the user can get information about news while listening to a music program. Usually, audio equipment cannot be equipped with a large screen like a television set. Although each piece of news being broadcast by radio text service is composed of short sentences, if there are many pieces of news being broadcast, the whole news program necessarily contains many pages. Therefore, displaying an abstract in a simple format, such as a combination of keywords, offers an enormous advantage.

An electronic mail system provides a facility like a bulletin board on which many users put up their messages. In application to electronic mail equipment, the unit is a message per user. As for the paragraph, a paragraph in a message may be used as is, but alternatively, one message may be treated as one paragraph. As can be seen, for second, fourth, sixth, and eighth inventions can also be applied. Documents created using word processing programs may include, for example, a collection of papers from a scientific society stored as textual information. If the present invention is applied to such textual information, major topics in the scientific society can be presented in a simple format such as a combination of keywords. Patent information is also provided. If the present invention is applied to patent information, changing trends in patent application with time can be grasped easily.

The first, third, fifth, or seventh invention may be carried out in a further preferred mode. An example will be shown below.

The example contemplated herein involves the provision of data designating means that the user can use to designate desired data for viewing. That is, data entered from input means and used to extract keywords therefrom are temporarily stored in a work area.

Then, after outputting an information abstract to output means in the same manner as already described, an input from the data designating means is accepted, and based on this input, a search is made through the data stored in the work area, and the retrieved data is presented to the user for viewing.

Figure 31:
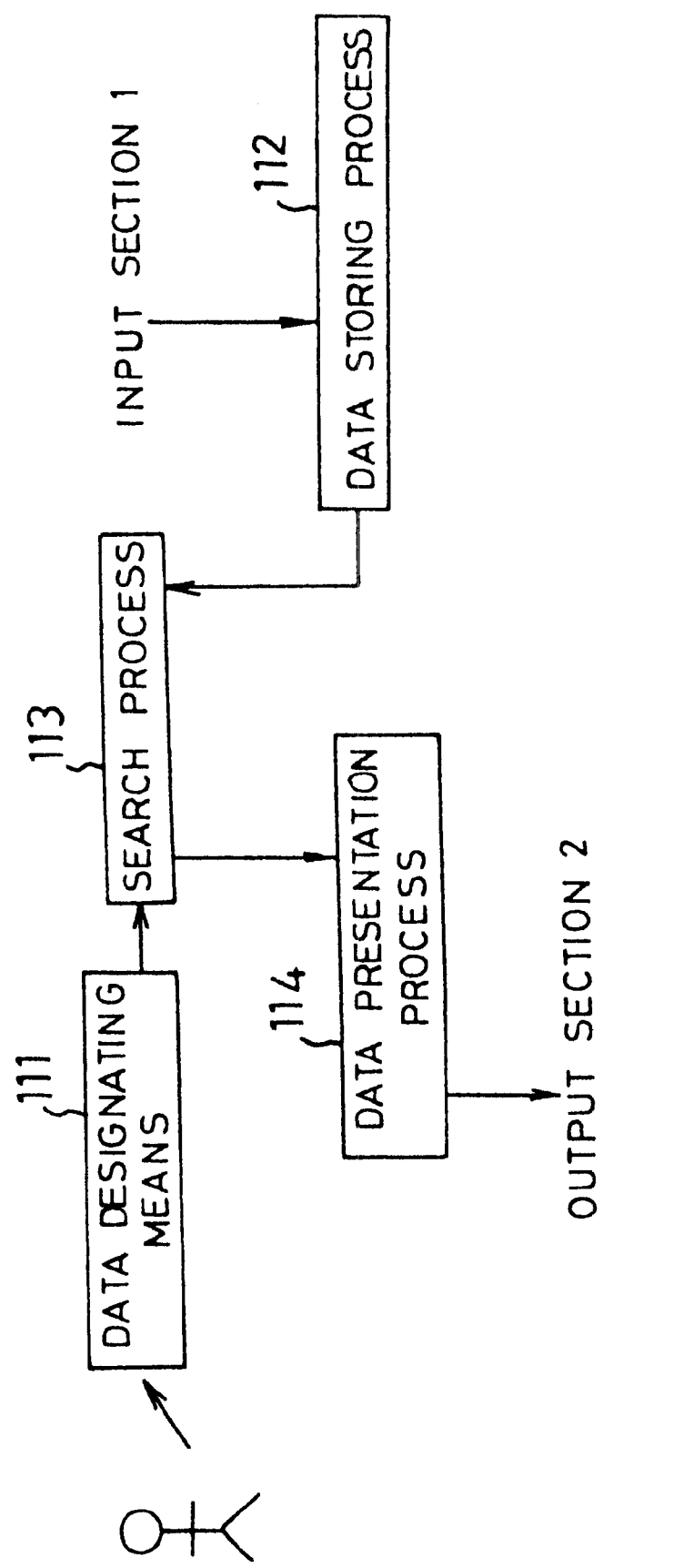
FIG. 31 is a diagram showing a portion of the system configuration for an information abstracting method and an information abstracting apparatus equipped with a data search function.

FIG. 31 shows the newly added portion of the system configuration. In FIG. 31, reference numeral 111 indicates the data designating means for accepting an input for designating data that the user desires for viewing.

More specifically, the user sees the information abstract displayed on the output section, and using the data designating means 111, designates a keyword with which he desires full information to be displayed for viewing. Reference numeral 112 is a data storing section; 113 is a search section for searching through the data stored in the data storing section 112, which is a work area, in accordance with the data-designating input from the user; and 114 is a data presenting section for outputting the data retrieved by the search section 113.

The hardware configuration for implementing the information abstracting method and information abstracting apparatus shown in the above configuration diagram is fundamentally same as the hardware configuration shown in the embodiment of the first, third, fifth, or seventh invention, except that the data designating means is added. Further, the flowchart is fundamentally the same as the flowchart shown in the embodiment of the first, third, fifth, or seventh invention, except that a data storing process for storing data in a work area of the main storage 12 is added after the data input process of step a1, step c1, step e1, or step g1, and that a process for accepting the data-designating input from the data designating means 111, a process for searching through data in accordance with the accepted data-designating input, and a process for displaying the search result are added after the abstract output process shown in step a10, step c14, step e14, or step g15.

In the data storing process, input data is stored as is in the work area. In the data-designating input accepting process, the selection made by the user, using a mouse, direction keys, numeric keys, etc., from the output such as shown in FIG. 6 or 12, is accepted. Any conventional method of selection may be used to make the selection. In the process for searching data in accordance with the accepted data-designating input, a portion of data containing the keyword selected by the user is retrieved from among the data stored in the data storing process. At this time, a predetermined range of data, such as the paragraph, the line, or five lines before and after the line containing the keyword selected by the user, is extracted as the search result. In the search result displaying process, the extracted data portion is displayed on the output section 2. Suppose, for example, that the user selected the keyword " " from the data example shown in FIG. 5. In this case, the first paragraph in unit 1 and the second paragraph in unit 3 are retrieved for output. In FIG. 5, it is assumed that in each unit paragraphs are separated from each other by a blank line.

The above-described data display function can also be combined with the ninth invention.

The second, fourth, sixth, or eighth invention may be carried out in a further preferred mode. An example will be shown below.

The example contemplated herein involves the provision of data designating means that the user can use to designate desired data for viewing. That is, data received by teletext receiving means and used to extract keywords therefrom are temporarily stored in a work area.

Then, after displaying an information abstract on display means in the same manner as already described, an input from the data designating means is accepted, and based on this input, a search is made through the data stored in the work area, and the retrieved data is presented to the user for viewing.

Figure 32:
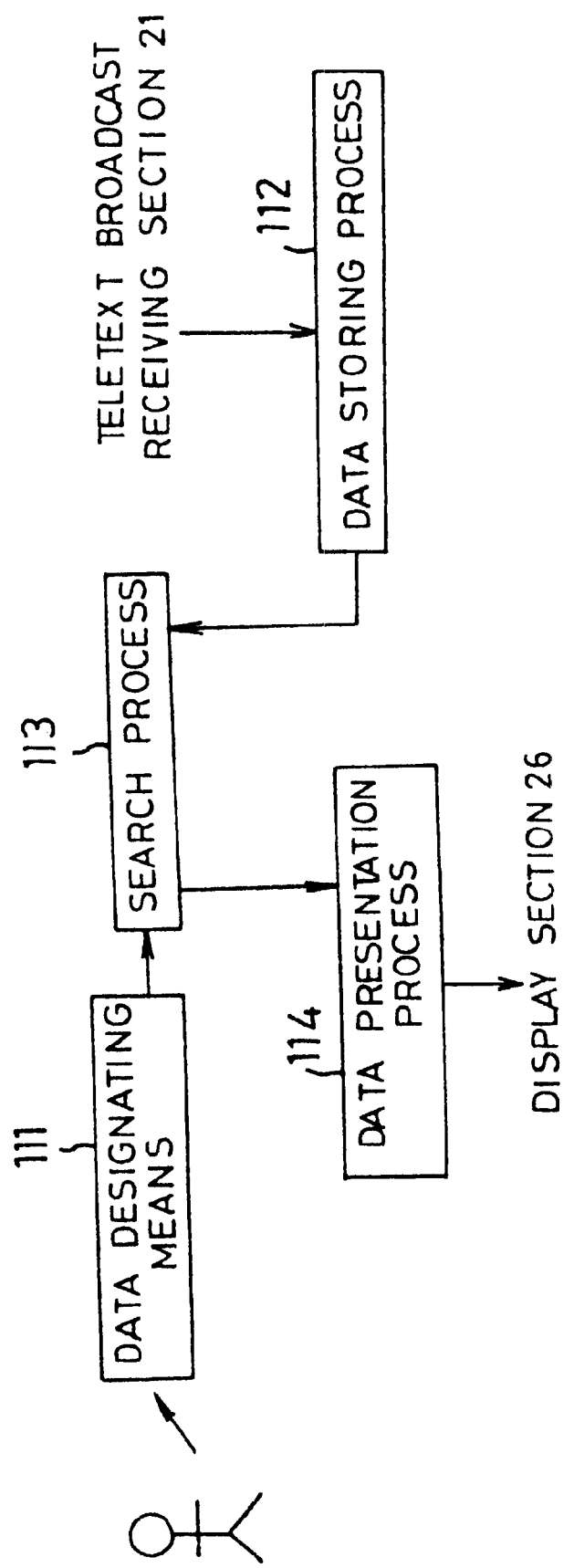
FIG. 32 is a diagram showing a portion of the system configuration for a teletext broadcast receiving apparatus equipped with a data search function.

FIG. 32 shows the newly added portion of the system configuration. The constituent parts shown in FIG. 32 are the same as those shown in FIG. 31, and are therefore designated by the same reference numerals, and explanation of these parts will not be given here. The hardware configuration for implementing the teletext broadcast receiving apparatus shown in the above configuration diagram is fundamentally same as the hardware configuration shown in the embodiment of the second, fourth, sixth, or eighth invention, except that the data designating means is added. Further, the flowchart is fundamentally the same as the flowchart shown in the embodiment of the second, fourth, sixth, or eighth invention, except that a data storing process for storing data of received programs in a work area of the main storage 12 is added after the program receiving process of step b2, step d2, step f2, or step h2, and that a process for accepting the data-designating input from the data designating means 111, a process for searching through data in accordance with the accepted data-designating input, and a process for displaying the search result are added after the abstract output process shown in step b10, step d14, step f14, or step h15. These processes are the same as those performed when the data display function is combined with the first, third, fifth, or seventh invention as described above, and further explanation will not be given here.

Further, the above-described data display function can also be combined with the 10th invention.

The first, third, fifth, or seventh invention may be carried out in a still further preferred mode. An example will be shown below.

The example contemplated herein involves the provision of data designating means which can be used to designate data of interest to the user by using a keyword.

That is, after outputting the result of abstracting to output means in the same manner as already described, an input for designating a keyword is accepted from the data designating means, and after the keyword-designating input is made, when new data is input from the input section 1, a search is conducted to see whether the designated keyword is contained in the input data; if the search result shows that the designated keyword is found, all or part of the data containing the keyword is displayed on the output section 2. Instead of displaying the data itself, a message may be displayed indicating that data containing the designated keyword has been found. Such data or message display is produced when data is input from the input section 1 after the keyword-designating input has been made but only when the contents of the new input data are judged as having been updated from the previously input data.

The keyword that the user designates using the data designating means 111 may be selected from the information abstract displayed on the output section 2 or from among keywords not contained in the information abstract.

As will be described later using FIGS. 34 and 35, the judgement as to whether the data contents have been updated may be performed before (see FIG. 35) or after (see FIG. 34) the step of performing a search to see whether the input data contains the designated keyword.

Figure 33:
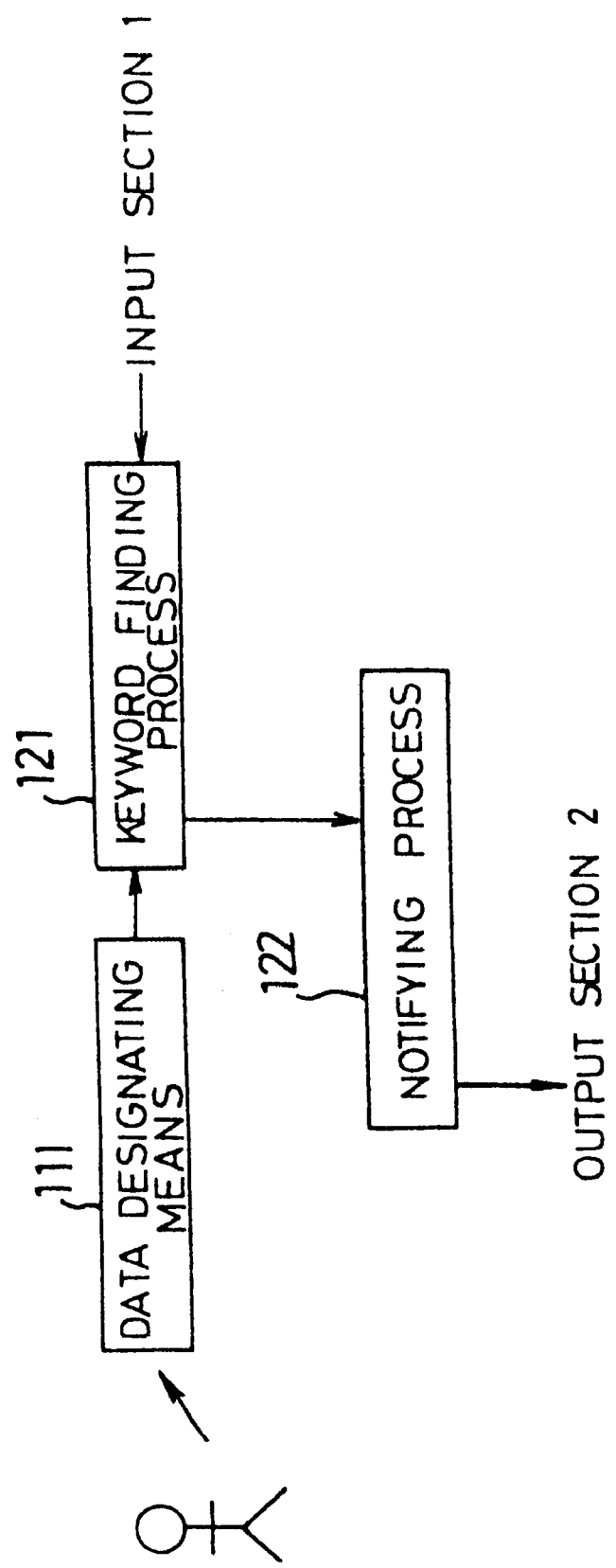
FIG. 33 is a diagram showing a portion of the system configuration for an information abstracting method and an information abstracting apparatus equipped with a data arrival notifying function.

FIG. 33 shows the newly added portion of the system configuration. FIG. 33 includes the same constituent parts as those shown in FIG. 31; therefore, such constituent parts are designated by the same reference numerals and explanation thereof will not be repeated here. Reference numeral 121 is a keyword finding section for searching through data in accordance with the keyword-designating input accepted by the data designating means 111 when new data is input from the input section 1, and 122 is a notifying section for notifying the user that data containing the designated keyword has been found by the keyword finding section 121. The hardware configuration for implementing the information abstracting method and information abstracting apparatus shown in the above configuration diagram is fundamentally the same as the hardware configuration shown in the embodiment of the first, third, fifth, or seventh invention, except that the data designating means is added.

Figure 34:
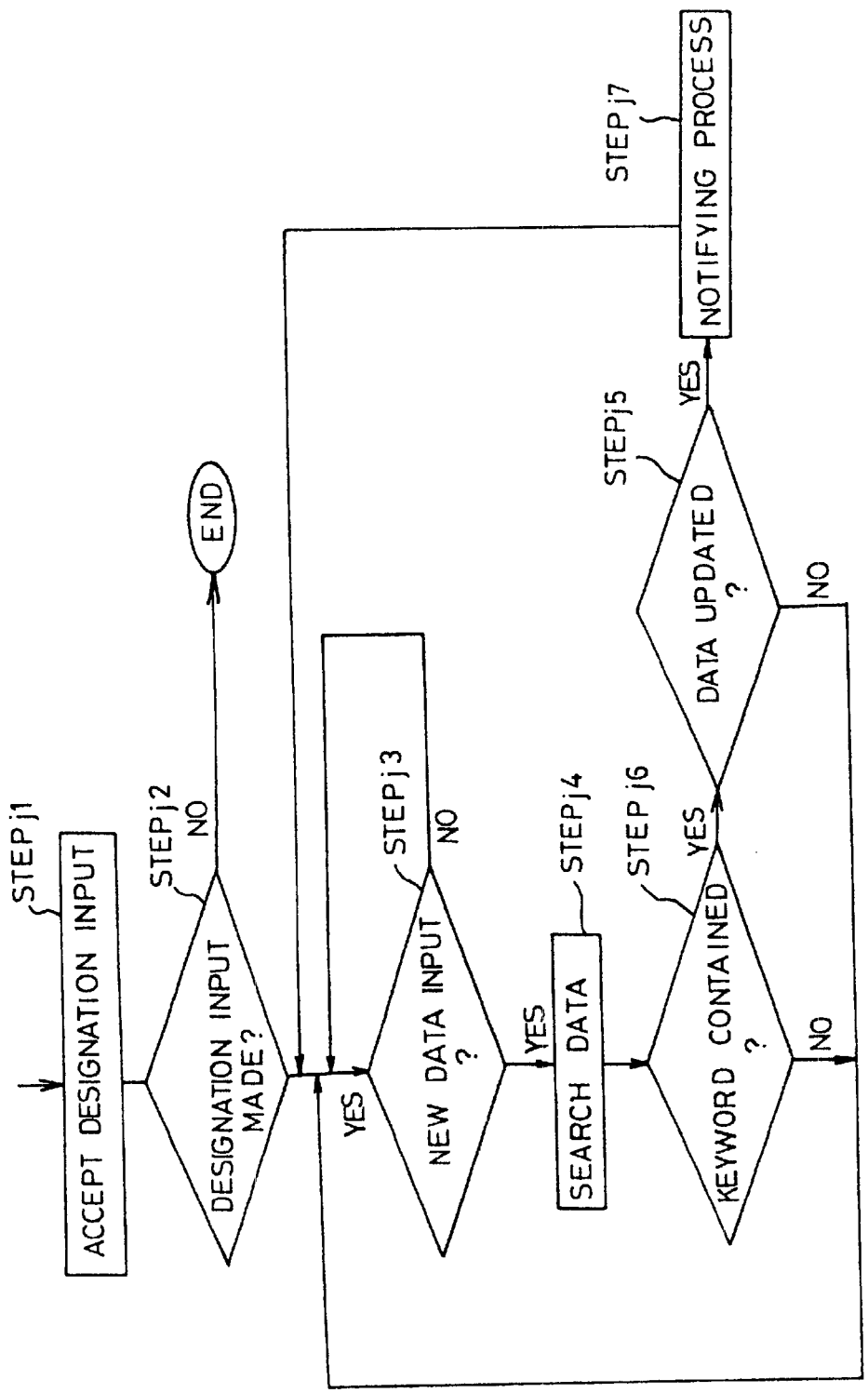
FIG. 34 is a flowchart showing a portion of an operating procedure for the information abstracting method and the information abstracting apparatus equipped with the data arrival notifying function.
Figure 35:
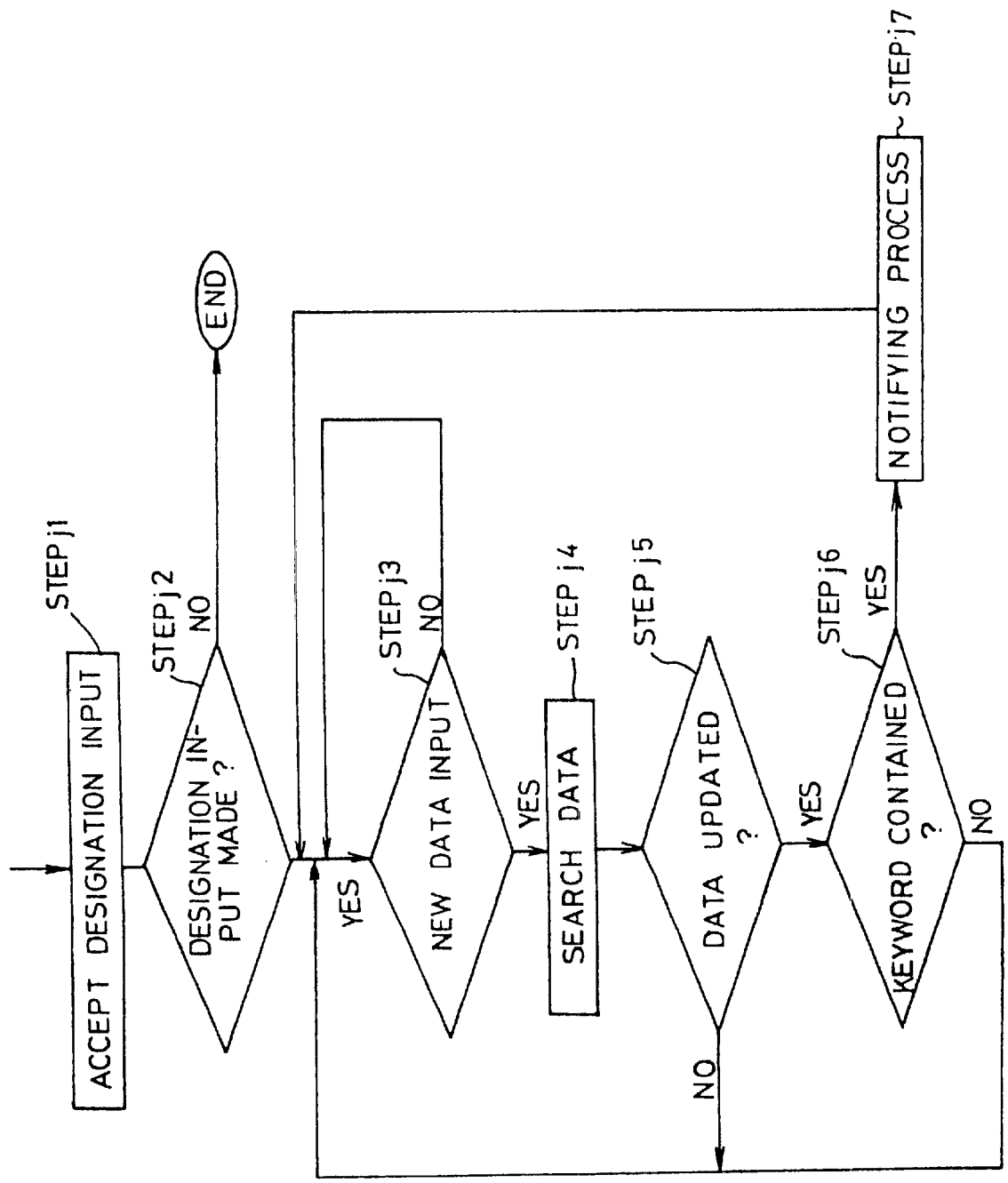
FIG. 35 is a flowchart showing a portion of another operating procedure for the information abstracting method and the information abstracting apparatus equipped with the data arrival notifying function.

Further, the flowchart is fundamentally the same as the flowchart shown in the embodiment of the first, third, fifth, or seventh invention, except that the process steps shown in FIG. 34 or 35 are added after the abstract output process shown in step a10, step c14, step e14, or step g15. Each step will be described below, referring primarily to FIG. 35.

In step j1, the designation of the keyword desired by the user is accepted in the data designating means 111, and the designated keyword is stored. In the designation input accepting process, the designation of the keyword is accepted that the user has selected by using a mouse, direction keys, numeric keys, etc. from the output such as shown in FIG. 6 or 12. Any conventional method of selection may be used to make the selection.

In step j2, it is judged whether a designation input has been made in step j1. If any designation input has been made, the process proceeds to step j3; otherwise, the process is terminated.

In step j3, the keyword finding section 121 judges whether new data has been input from the input section 1. When data are being input constantly, as in the case of a broadcast, in step j3 the input data is not compared with the previously input data, but the comparison/judgement to determine whether the data has been updated is performed in step j5 hereinafter described. When data is input as one cluster of data, such as a mail message, the judgement can be made by detecting the arrival of new data.

In steps j4 to j6, the keyword finding section 121 performs a search to see whether the keyword designated and stored in step j1 is contained in the new and updated data. If the designated keyword is contained, the process proceeds to step j7; otherwise, the process returns to step j3. This search process may also be accomplished by using a conventional keyword matching technique that simply examines whether the designated keyword is contained or not.

Figure 36:
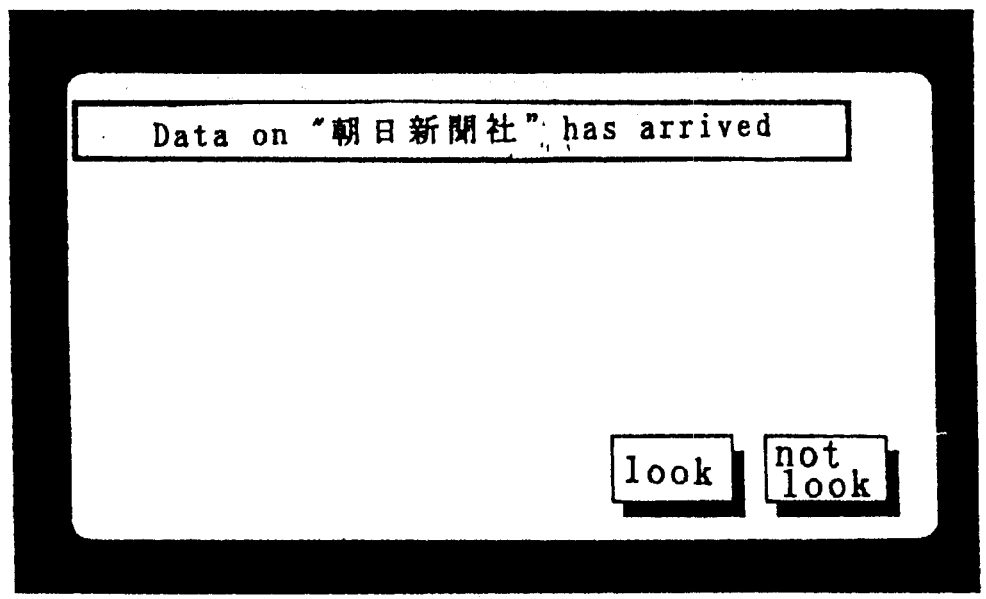
FIG. 36 is a diagram showing an output example notifying a data arrival in the information abstracting method and the information abstracting apparatus equipped with the data arrival notifying function.

In step j7, since the designated keyword was found in the input data as the result of the process in step j4, a portion of that data is displayed on the output section 2. Suppose, for example, that the user input a keyword "朝日新聞社" as the designated keyword in step j1 and that the data example shown in FIG. 5 was input as new data. In this case, the keyword is contained in the first paragraph in unit 1 and the second paragraph in unit 3, and these data are output to the output section 2. In FIG. 5, it is assumed that in each unit paragraphs are separated from each other by a blank line. In an alternative method, the arrival of data containing the keyword is simply displayed as a message, as shown in FIG. 36, and when the user has pressed a separate button, the data portion containing the keyword is brought onto the display. Furthermore, in this process, not only the data is presented for viewing, but it is also possible to store the data containing the keyword. In this manner, as new data containing the keyword of interest is input, the data portion containing the keyword is stored one after another.

The above processing can also be combined with the ninth invention.

In the second, fourth, sixth, or eighth invention, it is also possible to include data designating means for accepting the designation of data of interest from the user. That is, after outputting the result of abstracting to display means, an input for designating a keyword is accepted from the data designating means, and after the keyword-designating input is made, when data received by the teletext broadcast receiving section 21 is updated, a search is conducted to see whether the designated keyword is contained in the received data; if the search result shows that the designated keyword is found, the data portion containing the keyword or a message indicating the arrival of data containing the keyword is displayed on the display section 26. The newly added portion of the system configuration is almost the same as the system configuration shown in FIG. 33, the only difference being that the keyword finding section is connected to the teletext broadcast receiving section 21, not to the input section 1, and the notifying section 122 is connected to the display section 26, not to the output section 2. The hardware configuration for implementing this teletext broadcast receiving apparatus is fundamentally the same as the hardware configuration shown in the embodiment of the second, fourth, sixth, or eighth invention, except that the data designating means is added. Furthermore, the flowchart is fundamentally the same as the flowchart shown in the embodiment of the second, fourth, sixth, or eighth invention, except that the process steps shown in FIG. 35 are added after the abstract output process shown in step b10, step d14, step f14, or step h15. However, of the steps in FIG. 35, in step j5 the data received from the teletext broadcast receiving section 21 is compared with the previously received data to determine whether the received data has been updated or not.

In step j7, since the designated keyword was found in the updated data as the result of the processing in step j4, a portion of that data is displayed on the display section 26. Suppose, for example, that the user input a keyword "朝日新聞社" as the designated keyword in step j1 and that the data example shown in FIG. 5 was received as new updated data. In this case, the keyword is contained in the first paragraph in unit 1 and the second paragraph in unit 3, and these data are displayed on the display section 26. In an alternative method, the arrival of data containing the keyword is simply displayed as a message, as shown in FIG. 36, and when the user has pressed a separate button, the data portion containing the keyword is brought onto the display.

The flowchart shown in FIG. 34 is different from the flowchart of FIG. 35 in the order in which the step of judging whether the contents of data are updated is performed; that is, in FIG. 34, this step is performed after a search is performed in step j6 to determine whether the designated keyword is contained in the input data. In FIG. 34, the steps identical in operation to the steps in FIG. 35 are designated by the same step numbers.

The above processing can also be combined with the 10th invention.

As is apparent from the above description, according to the embodiment of the first invention, when there are a large number of character string data sets given in prescribed units, keywords appearing in common among the data sets and having high frequency of occurrence are extracted to represent a common topic. For the user of the information abstracting apparatus of the invention, the benefit of this is that main topics can be grasped quickly without having to go through large volumes of data.

According to the embodiment of the second invention, by performing information abstracting operations on data, such as a teletext broadcast, occurring in real time, main topics can be extracted from the latest updated data and displayed in the form of an information abstract on the screen. Accordingly, when receiving news programs by teletext, major items from the latest updated news can always be grasped in the form of an abstract. It is therefore possible to get the general content of news in the form of an abstract without having to view large amounts of teletext news.

According to the embodiment of the third invention, when there are a large number of character string data sets given in prescribed units, the general content of the data can be displayed for viewing by selecting keywords with associations between keywords clarified. Rather than presenting a simple listing of keywords, presenting keywords with their associations taken into account has the effect of making it easier to grasp the content of topics.

According to the embodiment of the fourth invention, when extracting major topics in the latest updated data from data given in real time such as a teletext broadcast and displaying them in the form of an information abstract on the screen, keywords representative of each topic are displayed with associations between keywords clarified. As a result, major topics in the latest news can be obtained as a collection of keywords associated with each other. This makes it possible to grasp the general content of news quickly and in the form of an easy-to-understand abstract without having to view large amounts of teletext news.

According to the embodiment of the fifth invention, when handling the frequency of keywords, keywords representing the same thing but expressed differently can be processed accordingly. For example, the name of the same athlete may be written as "伊達選手" at one time and as "伊達公子" at other times. Such keywords expressed differently but used with the same meaning are grouped together as similar keywords and their respective frequencies of occurrence are added together when calculating the frequency of occurrence. Furthermore, since similarity is multiplied when adding the frequencies, when a keyword having a larger similarity is extracted a larger value to match the similarity is added as the frequency. When a keyword having a smaller similarity is extracted, on the other hand, since the similarity is multiplied a smaller value is added as the frequency. As a result, the situation cannot occur that keywords useful in representing the content are excluded from an abstract because they are expressed differently. A more appropriate result of abstracting can thus be obtained.

According to the embodiment of the sixth invention, in teletext or the like where data are provided from different broadcast stations with different people producing the data, differently expressed keywords can be processed accordingly. Specifically, in the case of a broadcast dealing with events happening in the real world, such as news programs, the problem is that there is no predefined terminology, and differently expressed keywords frequently occur. By classifying differently expressed keywords into similar keywords and adding their frequencies together, useful keywords representative of common topics raised by different broadcast stations can be reflected in the abstraction results.

According to the embodiment of the seventh invention, when calculating similarity between differently expressed keywords, macro similarity is used which is calculated by taking into account not only the number of common characters and its proportion between the two keywords but the similarity with other keywords associated with the keywords in question. By so doing, when similar keywords occur such as "伊達選手", "伊達公子", and "伊達政宗", which are equal in the number of common words contained therein, the macro similarity between "伊達選手" and "伊達公子" denoting the name of the same athlete is large, whereas the similarity between "伊達選手" and "伊達政宗" denoting the names of different persons is small.

As a result, keywords expressed differently but expressing the same meaning are considered similar, while keywords appearing similar in terms of characters contained therein but representing different things in different topics are considered not similar. Such similarity or dissimilarity is judged on the basis of the magnitude of numerically expressed macro similarity, and using the frequencies added together on the basis of this judgement, the results of abstracting can be obtained.

According to the embodiment of the eighth invention, in teletext or the like where data are provided from different broadcast stations with different people producing the data, differently expressed keywords can be processed accordingly. In teletext, similar keywords, such as names of conferences, names of persons, names of companies, etc. in a news program, often appear in different topics having no relations with each other. A function is therefore needed by which keywords expressed differently but meaning the same thing and keywords apparently similar but meaning different things are treated as similar keywords and dissimilar keywords, respectively. Macro similarity is used to realize this function.

According to the embodiment of the ninth invention, keywords not appropriate for being included in an abstract are prestored in the exception keyword storing section 91. After excluding the keywords stored in the exception keyword storing section 91, keywords are processed and the abstracting operation is performed based on the frequency of keywords; in this manner, keywords not significant in expressing a topic, such as articles {a, the}, prepositions, etc. in the English language, can be excluded.

According to the embodiment of the 10th invention, in a teletext broadcast, when, for example, English sentences are quoted, the abstracting operation is performed after excluding the keywords stored in the exception keyword storing section 91. In this manner, keywords not significant in representing a topic, such as prepositions, articles, etc. in the English language, can be excluded so that they will not appear in the abstraction results.

As is apparent from the above description, the present invention provides the advantage that, by comparison with the prior art, keywords more appropriate for describing the content can be extracted from data.

TABLE 12

| Keyword or Keyword association | Intra-unit frequency | Inter-unit share count |
| --- | --- | --- |
| 泉佐野 | 3 | 1 |
| 朝日新聞社 | 5 | 3 |
| ヘリ墜落 | 3 | 3 |
| 毎日新聞社 | 1 | 0 |
| (泉佐野, 朝日新聞社) | 4 | 1 |
| (泉佐野, ヘリ墜落) | 2 | 0 |
| (泉佐野, 毎日新聞社) | 1 | 0 |
| (朝日新聞社, ヘリ墜落) | 3 | 2 |
| (朝日新聞社, 毎日新聞社) | 2 | 0 |
| 米朝高官協議 | 5 | 4 |
| 北朝鮮 | 4 | 3 |
| 調印式 | 1 | 0 |
| 核問題 | 3 | 2 |
| 燃料棒 | 1 | 0 |
| (米朝高官協議, 北朝鮮) | 4 | 3 |
| (米朝高官協議, 調印式) | 1 | 0 |
| (米朝高官協議, 核問題) | 3 | 2 |
| (米朝高官協議, 燃料棒) | 1 | 0 |
| (北朝鮮, 調印式) | 1 | 0 |
| (北朝鮮, 核問題) | 2 | 1 |
| (核問題, 燃料棒) | 1 | 0 |
| 平和条約 | 2 | 1 |
| 仮調印 | 2 | 1 |
| イスラエル | 1 | 0 |
| ヨルダン | 1 | 0 |
| (平和条約, 仮調印) | 2 | 1 |
| (平和条約, イスラエル) | 1 | 0 |
| (平和条約, ヨルダン) | 1 | 0 |
| (仮調印, イスラエル) | 1 | 0 |
| (仮調印, ヨルダン) | 1 | 0 |
| (イスラエル, ヨルダン) | 1 | 0 |

TABLE 17

| Keyword | Frequency of occurrence |
| --- | --- |
| 泉佐野 | 1.86 |
| ヘリ墜落 | 1 |
| 大阪府警 | 1 |
| 泉佐野市 | 1.86 |
| 朝日新聞社取材用 | 1 |
| ヘリコプター | 1 |
| 新聞大会開 | 1.62 |
| 第47回新聞大会 | 1.62 |
| 京都市 | 1 |
| 新聞販売 | 1 |
| 正常化 | 1 |
| 特別宣言 | 1 |
| 電動茶 | 2 |

TABLE 17-continued

| Keyword | Frequency of occurrence |
| --- | --- |
| 京都府茶協同組合 | 1 |
| 米朝高官協議合意 | 1.71 |
| 北朝鮮 | 1 |
| 核問題 | 1 |
| 米朝高官会議 | 1.71 |
| ジュネーブ | 1 |
| 調印式 | 1 |

TABLE 19

| Keyword or Keyword association | Intra-unit frequency | Inter-unit share count |
| --- | --- | --- |
| 核問題 | Fi1 | Fe1 |
| 調印式 | Fi2 | Fe2 |
| 米朝高官協議 | Fi3 | Fe3 |
| (核問題, 調印式) | Fi4 | Fe4 |
| (調印式, 米朝高官協議) | Fi5 | Fe5 |
| (核問題, 米朝高官協議) | Fi6 | Fe6 |
| ヨルダン | Fi7 | Fe7 |
| 仮調印式 | Fi8 | Fe8 |
| イスラエル | Fi9 | Fe9 |
| (仮調印式, ヨルダン) | Fi10 | Fe10 |
| (仮調印式, イスラエル) | Fi11 | Fe11 |
| (ヨルダン, イスラエル) | Fi12 | Fe12 |
| . | . | . |
| . | . | . |
| . | . | . |

What is claimed is:

1. A teletext broadcast receiving apparatus comprising:
    teletext broadcast receiving means for receiving a teletext broadcast;
    channel storing means for storing a plurality of channels of prescribed programs;
    keyword extracting means for extracting a keyword from each of said prescribed programs received by said teletext broadcast receiving means on said channels stored in said channel storing means;
    weighting means for weighting said extracted keyword by taking into account a state of occurrence, in the other prescribed programs, of keywords that are identical to said extracted keyword;
    keyword selecting means for selecting keywords from said extracted keywords on the basis of the weighted result; and
    display means for displaying all or part of said selected keywords as an information abstract relating to said teletext broadcast.

2. A teletext broadcast receiving apparatus according to claim 1, wherein said extracted keyword is weighted by using at least one of the number of prescribed programs from which the keyword to be weighted was extracted, the frequency of occurrence of said keyword in each prescribed program, and the number of characters of said keyword.

3. A teletext broadcast receiving apparatus comprising:
    teletext broadcast receiving means for receiving a teletext broadcast;
    channel storing means for storing a plurality of channels of prescribed programs;
    keyword extracting means for extracting a keyword from each of said prescribed programs received by said teletext broadcast receiving means on said channels stored in said channel storing means;

keyword associating means for generating a keyword association by associating one keyword with another among keywords obtained from the same paragraph in the same program;

weighting means for weighting said extracted keyword by taking into account a state of occurrence, in the other prescribed programs, of keywords that are identical to said extracted keyword, and for weighting said generated keyword association by taking into account a state of occurrence, in the other prescribed paragraphs, of keyword associations that are identical to said generated keyword association;

selecting means for selecting keywords and keyword associations from said extracted keywords and said generated keyword associations on the basis of the weighted results; and display means for displaying all or part of said selected keywords and keyword associations as an information abstract relating to said teletext broadcast.

4. A teletext broadcast receiving apparatus according to claim 3, wherein said weighting means weights said extracted keyword by using at least one of the number of prescribed programs from which the keyword to be weighted was extracted, the frequency of occurrence of said keyword in each prescribed program, and the number of characters of said keyword, and said generated keyword by using at least one of the number of prescribed paragraphs from which the keyword association to be weighted was obtained, the frequency of occurrence of keywords constituting said keyword association in each prescribed paragraph, and the number of characters of the keywords constituting said keyword association.

5. A teletext broadcast receiving apparatus comprising:

teletext broadcast receiving means for receiving a teletext broadcast;

channel storing means for storing a plurality of channels of prescribed programs;

keyword extracting means for extracting a keyword from each of said prescribed programs received by said teletext broadcast receiving means on said channels stored in said channel storing means;

similarity calculating means for calculating similarity between keywords thus extracted;

weighting means for weighting said extracted keyword by taking into account a state of occurrence, in the other prescribed programs, of keywords that are identical or similar to said extracted keyword;

keyword selecting means for selecting keywords from said extracted keywords on the basis of the weighted result; and display means for displaying all or part of said selected keywords as an information abstract relating to said teletext broadcast. account a state of occurrence, in the other prescribed units, of keywords that are identical or similar to said extracted keyword, and also weighting said generated keyword association by taking into account a state of occurrence, in the other prescribed paragraphs, of keyword associations that are identical to said generated keyword association.

6. A teletext broadcast receiving apparatus according to claim 5, wherein said keyword is weighted by using at least one of the number of units from which keywords whose similarity with the keyword to be weighted is greater than a predetermined reference were extracted, the frequency of occurrence in each prescribed unit of keywords whose similarity with said keyword is greater than said predetermined reference, and the number of characters of said keyword.

7. A teletext broadcast receiving apparatus comprising:

teletext broadcast receiving means for receiving a teletext broadcast;

channel storing means for storing a plurality of channels of prescribed programs;

keyword extracting means for extracting a keyword from each of said prescribed programs received by said teletext broadcast receiving means on said channels stored in said channel storing means;

keyword associating means for generating a keyword association by associating one keyword with another among keywords obtained from the same paragraph in the same program;

similarity calculating means for calculating similarity between keywords thus extracted, on the basis of a plurality of factors including said keyword association;

weighting means for weighting said extracted keyword by taking into account a state of occurrence, in the other prescribed programs, of keywords that are identical or similar to said extracted keyword, and for weighting said generated keyword association by taking into account a state of occurrence, in the other prescribed paragraphs, of keyword associations that are identical to said generated keyword association;

selecting means for selecting keywords and keyword associations from said extracted keywords and said generated keyword associationson the basis of the weighted results; and display means for displaying all or part of said selected keywords and keyword associations as an information abstract relating to said teletext broadcast.

8. A teletext broadcast receiving apparatus according to claim 7, wherein the larger the number of paragraphs containing said keyword association constituted by the keywords having said larger similarity between the keywords is, the larger the weight which is to be assinged to the keyword association becomes.

9. A teletext broadcast receiving apparatus comprising:

teletext broadcast receiving means for receiving a teletext broadcast;

channel storing means for storing a plurality of channels of prescribed programs;

keyword extracting means for extracting a keyword from each of said prescribed programs received by said teletext broadcast receiving means on said channels stored in said channel storing means;

keyword associating means for generating a keyword association by associating one keyword with another among keywords obtained from the same paragraph in the same program;

weighting means for weighting said generated keyword association by taking into account a state of occurrence, in the other prescribed paragraphs, of keyword associations that are identical to said generated keyword association;

selecting means for selecting keyword associations from said generated keyword associations on the basis of the weighted result; and display means for displaying an information abstract, generated based on the selection results, relating to said teletext broadcast.

10. A teletext broadcast receiving apparatus comprising:

teletext broadcast receiving means for receiving a teletext broadcast;

channel storing means for storing a plurality of channels of prescribed programs;

keyword extracting means for extracting a keyword from each of said prescribed programs received by said teletext broadcast receiving means on said channels stored in said channel storing means;

keyword associating means for generating a keyword association by associating one keyword with another among keywords obtained from the same Paragraph;

similarity calculating means for calculating similarity between keywords thus extracted;

keyword association/similarity calculating means for, by using said similarity calculated between keywords constituting said generated keyword association and keywords constituting another keyword association, calculating similarity between the keyword associations;

weighting means for weighting said generated keyword association by taking into account a state of occurrence, in the other prescribed paragraphs, of keyword associations that are identical or similar to said generated keyword association;

selecting means for selecting keyword associations from said generated keyword associations on the basis of the weighted result; and display means for displaying all or part of said selected keyword associations as an information abstract relating to said teletext broadcast.

11. A teletext broadcast receiving apparatus according to claim 1, 3, 5, 7, 2, 4, 9, or 10, further including keyword designating means for designating a keyword, and a work area for storing data of said teletext broadcast received by said teletext broadcast receiving means, wherein after said information abstract is displayed by said display means, when a keyword is designated by said keyword designating means from among the keywords constituting said displayed information abstract, all or part of said teletext broadcast data containing said designated keyword is displayed by said display means by using said designated keyword.

12. A teletext broadcast receiving apparatus according to claim 1, 3, 5, 7, 2, 4, 9, or 10, further including keyword input means for inputting an arbitrary keyword, and data storing means for storing data, wherein after said information abstract is displayed by said display means, when data contents of a paragraph in said program are updated and when said input keyword is found in said updated data, then the whole or part of said data containing said keyword is displayed by said display means or stored in said data storing means, or information indicating the existence of said data containing said keyword is displayed by said display means or stored in said data storing means.

13. A teletext broadcast receiving apparatus according to claim 1, 3, 5, 7, 2, 4, 9, and 10, further including keyword designating means for designating a keyword, and data storing means for storing data, wherein after said information abstract is displayed by said display means, when a keyword is designated by said keyword designating means from among the keywords constituting said displayed information abstract and when data contents of a paragraph in said program are thereafter updated and said designated keyword is found in said updated data, then the whole or part of said data containing said keyword is displayed by said display means or stored in said data storing means, or information indicating the existence of said data containing said keyword is displayed by said display means or stored in said data storing means.

14. A teletext broadcast receiving- apparatus according to claim 7, wherein said keyword is weighted by using at least one of the number of units from which keywords whose similarity with the keyword to be weighted is greater than a predetermined reference were extracted, the frequency of occurrence in each prescribed unit of keywords whose similarity with said keyword is greater than said predetermined reference, and the number of characters of said keyword.

* * * * *

UNITED STATES PATENT AND TRADEMARK OFFICE
CERTIFICATE OF CORRECTION

PATENT NO.    : 6,502,065 B2
DATED         : December 31, 2002
INVENTOR(S)   : Imanaka et al.

It is certified that error appears in the above-identified patent and that said Letters Patent is hereby corrected as shown below:

<u>Column 51,</u>
Delete lines 59-65, beginning with "account".

<u>Column 52,</u>
Line 35, "associationson" should read -- associations on --.
Line 44, "assinged" should read -- assigned --.

<u>Column 53,</u>
Line 15, "Paragraph" should read -- paragraph --.

Signed and Sealed this

Twenty-second Day of April, 2003

JAMES E. ROGAN
*Director of the United States Patent and Trademark Office*